(12) United States Patent
Kanome et al.

(10) Patent No.: US 7,007,943 B2
(45) Date of Patent: Mar. 7, 2006

(54) ABSORPTION BELT, IMAGE FORMING APPARATUS WITH ABSORPTION BELT AND METHOD FOR PRODUCING ABSORPTION BELT

(75) Inventors: Osamu Kanome, Kanagawa (JP); Kazutaka Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/670,566

(22) Filed: Sep. 26, 2003

(65) Prior Publication Data

US 2004/0060467 A1 Apr. 1, 2004

(30) Foreign Application Priority Data

Sep. 26, 2002  (JP) ........................ 2002-281897

(51) Int. Cl.
*B65H 3/16* (2006.01)

(52) U.S. Cl. ................. 271/18.1; 399/328; 156/218
(58) Field of Classification Search ............ 101/480, 101/483; 156/218; 361/230, 234; 399/328; 271/18.1
See application file for complete search history.

(56) References Cited

U.S. PATENT DOCUMENTS

| 3,690,646 | A | * | 9/1972 | Kolibas | 198/691 |
|---|---|---|---|---|---|
| 4,244,465 | A | | 1/1981 | Hishikawa et al. | 198/691 |
| 4,864,461 | A | * | 9/1989 | Kasahara | 361/234 |
| 5,202,179 | A | * | 4/1993 | Kasahara | 428/323 |
| 5,944,930 | A | | 8/1999 | Takeuchi et al. | 156/218 |
| 5,994,930 | A | * | 11/1999 | Park | 327/116 |
| 6,167,761 | B1 | | 1/2001 | Hanzawa et al. | 347/55 |
| 6,312,543 | B1 | * | 11/2001 | Takeuchi et al. | 156/218 |
| 6,375,184 | B1 | * | 4/2002 | Hayashi | 271/18.1 |
| 6,595,515 | B1 | * | 7/2003 | Numata et al. | 271/193 |
| 6,708,014 | B1 | * | 3/2004 | Miyaguchi et al. | 399/266 |
| 2002/0142120 | A1 | | 10/2002 | Takeuchi et al. | 428/36.9 |

FOREIGN PATENT DOCUMENTS

| EP | 0 693 381 A1 | 1/1996 |
|---|---|---|
| EP | 1 193 047 A1 | 4/2002 |
| JP | 52-58872 | 12/1982 |
| JP | 8-187773 | 7/1996 |
| JP | 11-151842 | 6/1999 |
| JP | 2000-95376 | 4/2000 |

* cited by examiner

*Primary Examiner*—Daniel J. Colilia
*Assistant Examiner*—Marissa Ferguson
(74) *Attorney, Agent, or Firm*—Fitzpatrick, Cella, Harper & Scinto

(57) ABSTRACT

The absorption belt capable of absorbing an object such as a printing medium P includes an insulating layer, a plurality of positive electrodes and a plurality of negative electrodes arranged alternately on the insulating layer, and a plurality of absorption layers for covering the electrodes. The absorption layers have different volume resistivities.

26 Claims, 38 Drawing Sheets

ABSORPTION BELT, IMAGE FORMING APPARATUS WITH ABSORPTION BELT AND METHOD FOR PRODUCING ABSORPTION BELT

This application claims priority from Japanese Patent Application No. 2002-281897 filed Sep. 26, 2002, which is incorporated hereinto by reference.

BACKGROUND OF THE INVENTION

1. Field of the Invention

The present invention relates to an absorption belt capable of highly accurately attracting and holding an object, more particularly to an absorption belt suitable for the transfer of a printing media in a copying machine, a laser beam printer, a facsimile, an ink jet printer or a multifunction machine having functions of these apparatuses, an image forming apparatus with such an absorption belt and a method for producing such an absorption belt.

2. Description of the Related Art

Conventionally, in a copying machine, a laser beam printer, a facsimile, an ink jet printer or a multifunction machine having functions of these apparatuses, an absorption belt capable of attracting and holding a printing medium has been used as a means for transferring the printing medium such as paper, OHP film or the like. As an example of such absorption belt, a single-layer or a multi-layer resin belt having a properly set resistance value is known. In transferring the printing medium by this kind of absorption belt, both the surface and the back of the absorption belt is electrically charged so that the printing medium can be attracted thereto.

However, in the case of the above-mentioned image forming apparatus, the increase in the transfer speed of the printing medium sometimes has caused the printing medium to run afloat above the resin belt due to the resistance of the air that affects the flow of the printing medium while being transferred. Such floating of the printing medium can be considered to result from (1) the effect of the physical external force such as the vibration of the belt or the like and (2) the temporary decrease in the surface electric charge and the resulting inability of the belt for maintaining the surface electric charge at a necessary level owing to the temporary decrease in the surface resistance of the belt due to the cause such as the drop of the ink onto the belt in the case of the ink jet printer or the like.

A known technique for resolving such a problem is an absorption belt including a pair of pectinate electrodes disposed on the surface or inside the resin belt (Refer to Japanese Patent Application Publication No.57-058872 (1982)). In the absorption belt, the pectinate electrodes are disposed opposing and alternately to each other leaving predetermined interposing gaps. In order for letting the absorption belt exert a necessary attractive force on any object to be attracted, each of the paired opposing pectinate electrodes needs to have either positive or negative electric charge applied thereto. The object can be locally charged to be attracted by the absorption belt owing to the effect of the static electric charge. Further, in general, the absorption belt having a pair of pectinate electrodes is respectively provided with feeding terminals at both ends thereof so that each of the pectinate electrodes is fed with either a positive voltage or a negative voltage. In another case, the feeding terminals are provided on the side of one of longitudinal edges of the belt in order to reduce the width of the belt (Refer to Japanese Patent Application Laid-Open No.2000-095376).

The statically charged absorption belt, having the pectinate electrodes as described above, is capable of attracting the object more stably and strongly compared with the resin belt designed to attract the object by electrically charging the resin belt. Thus, this kind of static absorption belt is advantageous when used as the printing medium transfer means for the full-line type ink jet printing apparatus employing the line-type print head having a plurality of discharge ports arranged along the direction of the width of the printing medium, and, in this way, the printing operation at higher speeds can be made possible (Refer to Japanese Patent Application Laid-Open No.11-151842 (1999)).

On the other hand, known as the conventional method for producing the absorption belt are (1) a thermal extrusion molding process as a representative inflation process and (2) a casting process for obtaining desired belt by first applying a predetermined quantity of molten resin on both the outer surface and the inner surface of a cylindrical mold and then by removing the applied resin after undergoing the solvent removing process.

Further, known as another method for producing the absorption belt is (3) a process for manufacturing the belt from a thermoplastic sheet placed between a core member and a cylindrical member (Refer to Japanese Patent Application Laid-Open No. 8-187773 (1996)). In the method (3), first the thermoplastic sheet is wound on the core member until the both ends of the thermoplastic sheet properly overlap with each other, and then the core member is inserted into the cylindrical member whose thermal expansion coefficient is lower than that of the core member. Then, these members are heated to reduce the gap between the core member and the cylindrical member, and the both ends of the thermoplastic sheet are fused to join with each other.

In manufacturing the absorption belt having the pectinate electrodes placed on the surface or inside thereof, among the applicable methods there are a process wherein the desired absorption belt is manufactured by combining the sheet containing the preformed electrode pattern with any one of the method (1) through (3), and the other process wherein after the body of the belt is manufactured by one of the methods (1) through (3), the electrode pattern is formed in the belt by one of various processes.

However, the absorption belts produced by the conventional processes have some drawbacks as are described in the following. For instance, in the conventional absorption belt, a relatively large leakage current is apt to occur between the adjacent electrodes having the polarities opposite to each other, thereby causing the deterioration of the absorption belt and the resulting negative effect on the reliability thereof. Further, the conventional absorption belt has a shortcoming such that a large power consumption is needed for obtaining a sufficient attractive force, and it has been considered that such a large power consumption have room for further reduction of the total power consumption by the apparatus.

In addition, for the further compactness of the image forming apparatus, it is also necessary to reduce the size (width) of the absorption belt, but, even if both the feeding terminal for the application of the positive voltage and the feeding terminal for the application of the negative voltage arranged only on the side of one of the longitudinal edges like in one of the cases of the conventional absorption belts, it is necessary to provide an insulators for preventing the feeding terminals for different polarities from coming into contact with one another. Thus, in order to reduce the size of the absorption belt, it is necessary to adopt some appropriate measures for satisfying such requirement.

On the other hand, there are problems as are described in the following concerning the manufacturing process of the absorption belt. For instance, the absorption belt manufacturing process characterized by first manufacturing the resin belt by one of the methods (1) through (3) followed by the process for forming the electrode pattern on the resin belt is more costly than the belt manufacturing process characterized by using the sheet with preformed electrode pattern followed by the manufacture of the absorption belt by one of the methods (1) through (3).

Further, when the above described method (1), i.e., the thermal fusion molding process (extrusion molding process and inflation process) is employed, it is necessary to take up the absorption belt which is molded continuously, and the belt is apt to be depressed or bent while being taken up, and such depression or bend of the belt adversely affect the object of the transfer, i.e., the printing medium. In order to resolve such a problem, it becomes necessary to provide a long molding line and a long space therefore that ends up with a higher manufacturing cost. Further, the casting method corresponding to the above-mentioned method (2) involves a number of problems to be resolved such as the problems concerning the concentration control of the solution, the control of the atmosphere for drying, the solution treatment cost during the drying process or the like. Therefore, in order to obtain an absorption belt capable of providing a satisfactory attraction, a high reliability and a high energy-saving ability, the above-mentioned method (3) may be more useful if improved further.

The present invention is directed to overcome one or more of the problems as set forth above.

SUMMARY OF THE INVENTION

The object of the present invention is to provide an absorption belt having high reliability and high energy-saving ability, an image forming apparatus with such an absorption belt for enabling the printing medium to be transferred accurately and a method for producing such an absorption belt at low cost and with high accuracy.

The object is achieved with absorption belts, an image forming apparatuses, methods for producing an absorption belt according to independent claims. Preferred embodiments are defined in the depending claims.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
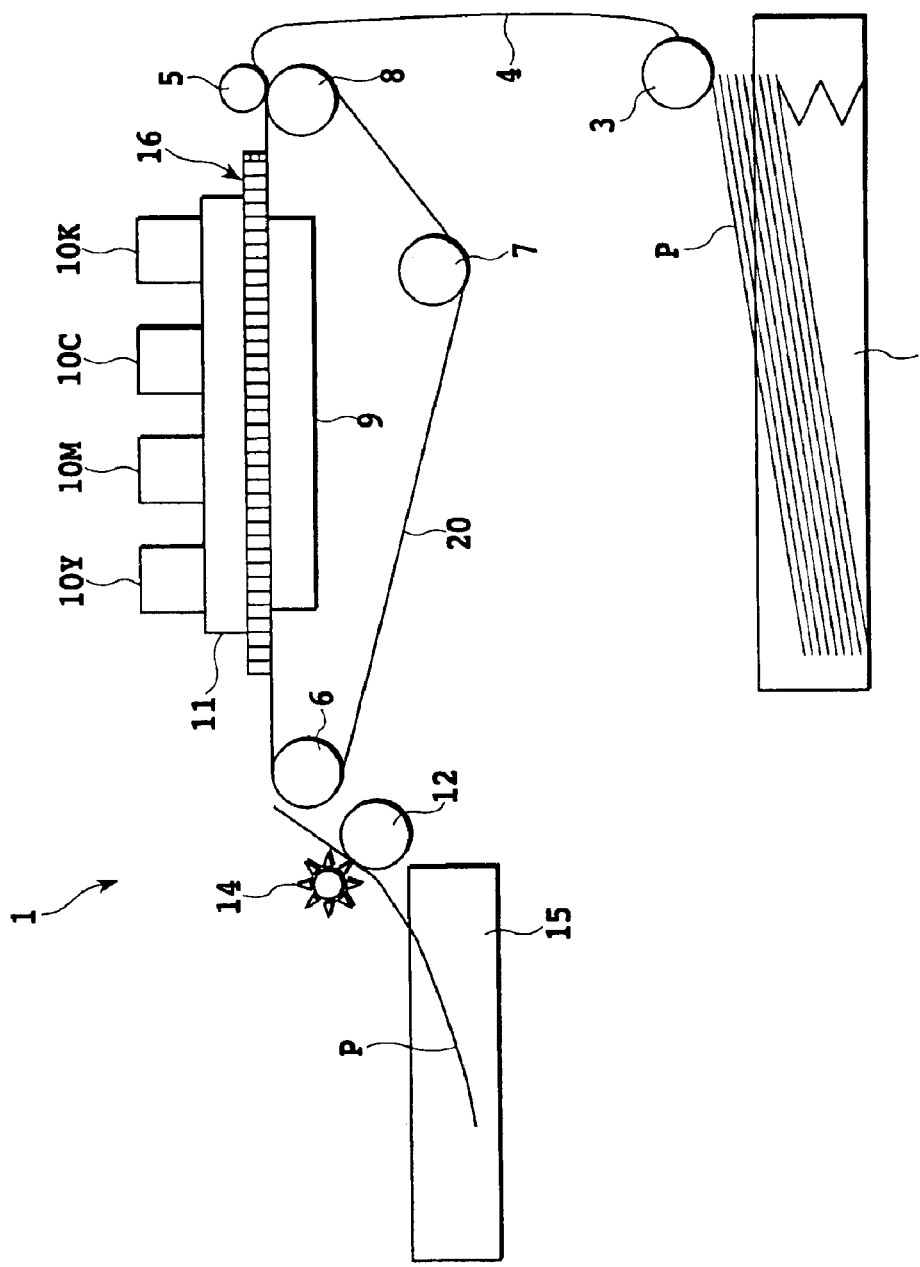
FIG. 1 is a schematic diagram showing the image forming apparatus according to the first embodiment of the present invention.

An absorption belt according to the present invention includes a plurality of absorption layers for covering a plurality of electrodes arranged so that the positive electrodes and the negative electrodes come alternately relative to the insulating layer, and at least two of the absorption layers have different volume resistivities. Thus, it can be made possible to make the leakage current from each electrode orient to each absorption layer on each electrode to substantially increase the resistance between adjacent electrodes by properly setting the volume resistivity of each of the plurality of absorption layers.

In this way, the leakage current between each adjacent electrodes having opposite polarities can be reduced, whereby the deterioration of the belt resulting from the presence of the leakage current and the increase in the power consumption can be prevented while maintaining a satisfactory attracting ability. Consequently, with the absorption belt according to the present invention both the improved reliability of the belt itself and the saving of the energy can be enjoyed.

Preferably, the plurality of absorption layers include a first absorption layer directly disposed on the plurality of electrodes and a second absorption layer disposed above said first absorption layer. The second absorption layer has a volume resistivity Ra2 smaller than a volume resistivity Ra1 of the first absorption layer. If the volume resistivity of a resin which is main ingredient of the second absorption layer before a control of resistance is over $1.0 \times 10^{16}$ Ω·cm, the quantity of the control agent added to the resin must be increased in order to control the resistance. In such a case, the control agent may exist unevenly within the resin and this causes the leak current. Accordingly, the volume resistivity of the resin which is a main ingredient of the second absorption layer before the control of the resistance is preferably set as $1.0 \times 10^{16}$ Ω·cm or less.

Of course, the first absorption belt of the present invention may include three or more absorption layers. In such a case, volume resistivities of the plurality of attractive layers disposed on each of said electrodes are preferably set to decrease in accordance with a distance from each of the electrodes. In the scope of the present invention, it is not limited to add another layer having other functions on the layers of the absorption. In order to provide an inexpensive absorption belt, it is important to reduce steps of manufacturing the belt, thus the inexpensive absorption belt preferably includes two absorption layers.

Preferably, the plurality of absorption layers include a first absorption layer directly disposed on the plurality of electrodes and a second absorption layer disposed above the first absorption layer. The second absorption layer has a volume resistivity Ra2 smaller than a volume resistivity Ra1 of the first absorption layer. An uppermost layer of the absorption layers preferably includes a fluoride resin. By employing the uppermost layer of the absorption belt including the fluoride resin, a change of the leakage current may be controlled small even if ink, water and the like adhere on the surface of the absorption belt due to a certain cause, change of leak current can be made small. Further, by employing the uppermost layer of the absorption belt including the fluoride resin, a resistance to being soiled of the absorption belt and an ease of cleaning the belt may be improved.

The volume resistivities of the plurality of absorption layers laid over each of the electrodes are preferably set so as to decrease in proportion to the distance from each electrode. Further, the volume resistivity Ra1 of the first absorption layer to be directly laid on each electrodes is desired to be within the range of $1.0 \times 10^{11}$ Ω·cm–$1.0 \times 10^{14}$ Ω·cm, whereas the volume resistivity of the second absorption layer placed above the first absorption layer is desired to be within the range of $1.0 \times 10^{8}$ Ω·cm–$1.0 \times 10^{12}$ Ω·cm. Preferably, the volume resistivity Ra1 of the first absorption layer is within the range of $1.0 \times 10^{12}$ Ω·cm–$1.0 \times 10^{14}$ Ω·cm.

If the volume resistivity of the insulating layer between electrodes is small, the life of the absorption belt may become short and excessive energy may be consumed, because the leakage current between electrodes will become large. Thus, a volume resistivity Ri of the insulating layer positioned between the electrodes is preferably set to $1.0 \times 10^{13}$ Ω·cm or more, a volume resistivity Rb of the base layer is preferably set within the range of $1.0 \times 10^{11}$ Ω·cm–$1.0 \times 10^{13}$ Ω·cm, and the relationship that Ri≧Rb>Ra1>Ra2 is preferably satisfied. The relationship is important so as to make it easy to efficiently pass the micro current in the following order, the micro current coming out from the electrode and being required to absorb an object.

Order: certain electrode→first absorption layer directly disposed on the electrode→second absorption layer above the first absorption layer→absorbed object→second absorption layer above an adjacent first absorption layer→first absorption layer directly disposed on an adjacent electrode→adjacent electrode.

Further, the insulating layer, each electrode and a plurality of absorption layers are preferably formed from the thermoplastic sheet material. It is also preferable to provide the feeding terminals for applying the positive and negative voltages alternately to a plurality of electrodes.

An image forming apparatus according to the present invention for forming an image on a printing medium may include the above described absorption belt of the present invention as a means for transferring the printing medium. As mentioned above, the absorption belt provides a good attracting ability while reducing the deterioration of the belt owing to the leakage current and the power consumption. Thus, this image printing apparatus is capable of raising the image quality by highly accurately transferring the printing medium. The present invention also relates to a method for producing above mentioned absorption belt.

In another absorption belt of the present invention, an absorption layer whose volume resistivity differing from that of an insulating layer is laid on a plurality of electrodes, of which positive and negative electrodes are arranged alternately with one another. Thus, by properly setting the volume resistivity of the absorption layer on he electrode, the leakage current from each electrode is oriented to the absorption layer on each electrode thereby to substantially increase the resistance between adjacent electrodes.

In this way, the leakage current between the adjacent electrodes, having opposite polarities, can be reduced, whereby the deterioration of the belt and the increase in the power consumption resulting from the leakage current can be suppressed while maintaining a good attracting ability. Consequently, the absorption belt can contribute not only to the improvement in the reliability of the absorption belt itself but also to the saving of the power consumption.

In the above described absorption belt, the volume resistivity of the absorption layer is preferable to be smaller than the volume resistivity of the insulating layer. Further, the volume resistivity of the absorption layer is preferably set within the range of $1.0 \times 10^{8}$ Ω·cm–$1.0 \times 10^{14}$ Ω·cm, while the volume resistivity of the insulating layer is desired to be $1.0 \times 10^{13}$ Ω·cm or more.

Further, the insulating layer sheet, each electrode and the absorption layer are preferably formed from the thermoplastic sheet material. Also, it is preferable to provide the feeding terminals to apply the positive power and the negative power alternately to the plurality of electrodes.

Another image forming apparatus according to the present invention for forming an image on a printing medium may include the above described absorption belt of the present invention. As described above, the absorption belt not only provides a good attracting ability but also capable of suppressing the deterioration of the belt resulting from the leakage current and the power consumption, which lead to high reliability and energy saving. Thus, this image printing apparatus can contribute to the improvement in the image quality by transferring the printing medium accurately. The present invention also relates to a method for producing above mentioned absorption belt.

In still another absorption belt of the present invention, an under-electrode layer, having a volume resistivity smaller than that of an insulating layer but larger than that of an absorption layer, is accumulated under each of electrodes, so that the absorption belt is capable of exerting the attractive force even on the opposite side of the absorption surface. Thus, in using this absorption belt as a means for transferring various objects, if the predetermined member (e.g., a platen or the like in the case of the image forming apparatus) is placed opposing to the under-electrode layer, the absorption belt can be kept in an extremely ideal position (for the transfer of the object).

Further in the above described absorption belt, the absorption layer, having the volume resistivity smaller than that of the insulating layer, is laid on a plurality of electrodes, of which the positive electrodes and the negative electrodes are arranged alternately with one another, while the under-electrode layer, having the volume resistivity larger than that of the absorption layer is laid. Thus, the leakage current from each electrode is oriented to the absorption layer on each electrode and also to the under-electrode layer, thereby substantially increasing the resistance between adjacent electrodes. In consequence, in the absorption belt, the leakage current between the adjacent electrodes having the opposite polarities to each other, is reduced, and so the deterioration of the belt resulting from the leakage current and the increase in the power consumption can be suppressed while maintaining a good attracting ability. As a result, the absorption belt, when adopted, is capable of contributing not only to assure a higher reliability of the belt itself but also to further saving of the energy while maintaining its performance at a satisfactory level and accuracy.

In the above described absorption belt, the volume resistivity of the absorption layer is preferably set within the range of $1.0\times10^8$ Ω·cm–$1.0\times10^{12}$ Ω·cm, the volume resistivity of the under-electrode layer is preferably set within the range of $1.0\times10^{10}$ Ω·cm–$1.0\times10^{14}$ Ω·cm, the volume resistivity of the insulating layer is preferably set as $1.0\times10^{13}$ Ω·cm or more. Further, the insulating layer, each electrode, absorption layer and under-electrode layer are preferable to be formed from the thermoplastic sheet materials. Further, the plurality of the electrodes are preferable to be provided with the feeding terminals so that the positive power and the negative power can be supplied alternately.

Still another image forming apparatus according to of the present invention may include the above described absorption belt as being the printing medium transfer means. As discussed previously, the absorption belt is designed for being capable of suppressing the deterioration of the belt resulting from the effect of the leakage current and the power consumption while maintaining its performance and the attracting ability at a satisfactory level and accuracy. Thus, this image printing apparatus is also capable of reproducing the image of higher quality by incorporating the printing medium transfer means capable of operating at higher accuracy.

In another absorption belt of the present invention, each of feeding terminals, connected with each of electrodes, whose positive and negative electrodes are arranged alternately with one another, is disposed on the side of one of the (longitudinal) edges of the belt. Further, out of the feeding terminals, those for applying the positive voltage are extended towards either the surface or the back of the belt, while the feeding terminals for applying the negative voltage are extended towards another surface.

More specifically, in the absorption belt, the feeding terminal for applying the positive voltage and the feeding terminals for applying the negative voltage are insulated from each other in vertical direction (in the direction of the belt thickness) with the insulating layer or the like, and so, unlike the case of the conventional absorption belt, it is not necessary for the present absorption belt to have the positive voltage application feeding terminal and the negative voltage application feeding terminal separated in the direction of the belt width. Consequently, it becomes possible for the present absorption belt to easily reduce the overall width thereof.

The absorption layer preferably includes a first lamination, including a feeding terminal layer laid on the electrode, the absorption layer and the under-electrode layer laid under the electrode, and a second lamination, including the electrode, the absorption layer laid on the electrode, the feeding terminal layer laid under the electrode and the under-electrode layer; the insulating layer is provided with a plurality of openings, and the first lamination and the second lamination are preferable to be alternately fitted with such openings of the insulating layer. Further, where the volume resistivity of the insulating layer is given as Ri, the volume resistivity of the electrode given as Re, the volume resistivity of the absorption layer given as Ra, and the volume resistivity of the under-electrode layer given as R1, it is preferable that the relationship, i.e., Ri≧R1>Ra>Re can be established. Further, the insulating layer, each electrode, the absorption layer and the under-electrode layer are preferred to be formed from the thermoplastic sheet materials.

The image forming apparatus according to the present invention for forming any desired image on the printing medium includes the above described absorption belt for transferring the printing medium. As discussed previously, the absorption belt is designed so that the overall width thereof can be reduced with ease. Then, the feeding means for making the electrical contact with each feeding terminal for applying the positive voltage is disposed on either the surface or the back of the belt, whereas the feeding means for making the electrical contact with each feeding terminal for applying the negative voltage is disposed on either the surface or the back, not used for the positive voltage, thereby making it possible that the feeding means for applying the positive and negative voltages are disposed only on the side of one edge of the absorption belt. Thus, the present image printing apparatus can easily be made more compact. The present invention also relates to a method for producing above mentioned absorption belt.

Preferred embodiments of the absorption belt, the image forming apparatus with the absorption belt and the method for producing the absorption belt according to the present invention will be described in detail with reference to the accompanying drawings.

[The First Embodiment]

FIG. 1 is a schematic diagram of the image forming apparatus according to the present invention. FIG. 1 shows an ink jet printing apparatus as an example of the embodiments of the image forming apparatus according to the present invention. The ink jet printing apparatus 1 shown in FIG. 1 includes, for instance, a feed sheet tray 2 for loading the printing medium P such as the A4 size sheets, a sheet feeding roller 3 for transferring the printing medium P piece by piece from the feed sheet tray 2. The printing medium P sent out from the feed sheet tray 2 by the sheet feeding roller 3 is guided to a lower transfer guide 4 and inserted tightly between a pinch roller and an endless absorption belt 20.

The absorption belt 20 is extended with tension over a drive roller 6, a driven roller 7 and a pressure roller 8 and is made to circulate over these rollers by being driven by the drive roller 6. The printing medium P is attracted and held by the absorption belt 20 to be transferred onto the printing start position on a platen 9. The platen 9 is provided for setting the printing medium P to the printing position, and the print heads 10K, 10C, 10M and 10Y are disposed above the platen 9.

Each of the print heads 10K, 10C, 10M and 10Y is a full-line type print head including a plurality of printing elements so as to be able to fully cover the width of the printing medium P. The print heads 10K, 10C, 10M and 10Y correspond to the black color (10K), the cyanine (10C), the magenta (10M) and the yellow (10Y) respectively. The print heads 10K, 10C, 10M and 10Y are mounted on a head holder 11, and are positioned at predetermined intervals and in the order given here, i.e., in the order from the upstream side in transferring the printing medium P. The printing medium P with the images printed thereon by the print heads 10K, 10C, 10M and 10Y is held between an ejection roller 12 and a spur 14 to be transferred and ejected into and stored in the ejection tray 15.

Figure 2:
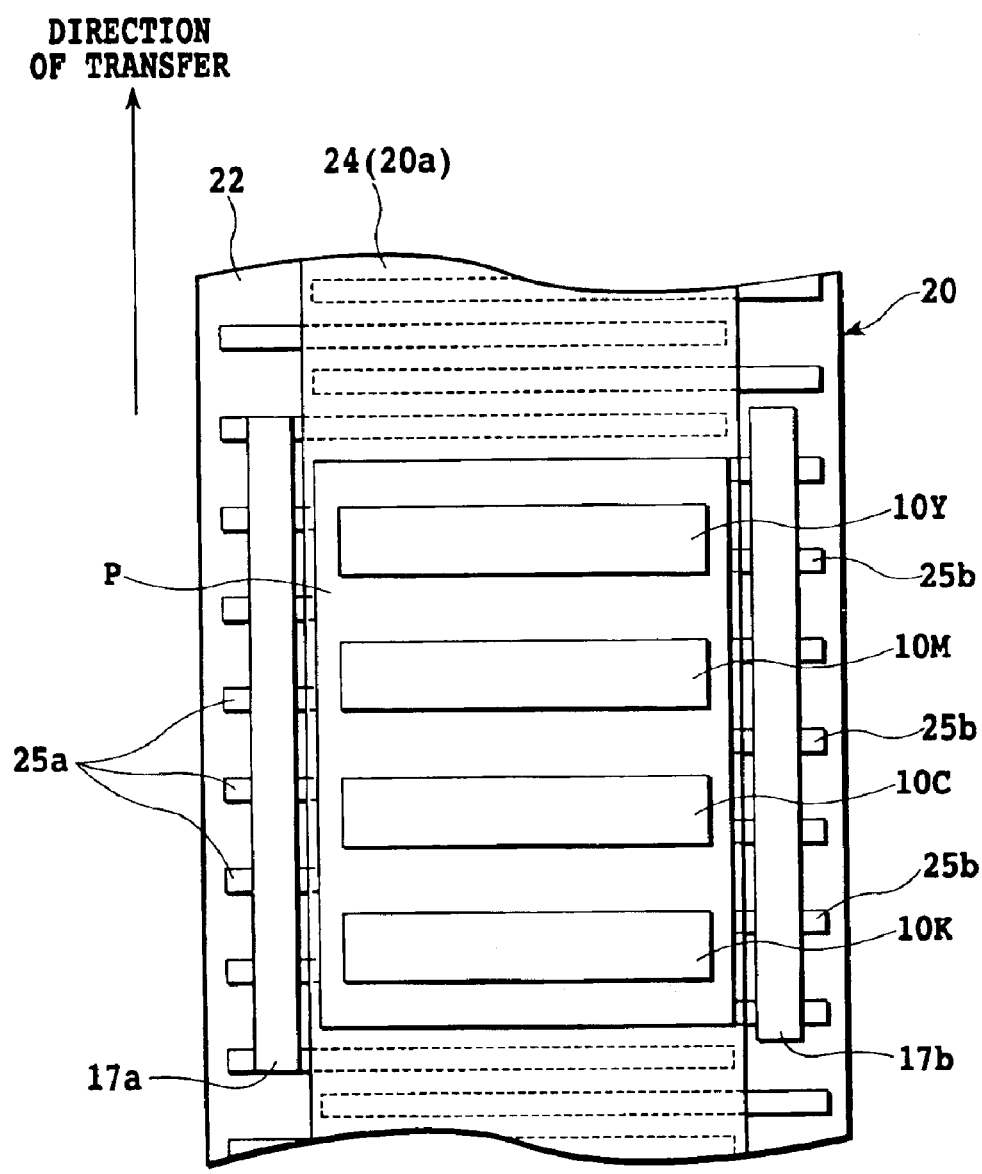
FIG. 2 is a partially enlarged view of the image forming apparatus shown in FIG. 1.

As shown in FIG. 2, the ink jet printing apparatus 1 is provided with a charged brush unit 16 for generating an electrostatic force by applying a high voltage to the absorption belt 20. The charged brush unit 16 includes feeding members 17a and 17b, disposed on both sides of the series of print heads 10K, 10C, 10M and 10Y (head holder 11), a grounding plate (not shown), a power source or the like. A positive voltage, for instance, is applied to the feeding member 17a, while a voltage having a polarity opposite to that applied to the feeding member 17a, i.e., a negative voltage, is applied to the feeding member 17b, and the grounding plate is grounded.

In the ink jet printing apparatus 1, the image is printed on the printing medium P by the print heads 10K, 10C, 10M and 10Y while the printing medium P is attracted and transferred by the absorption belt 20, which is electrically charged by the charged brush unit 16. In this case, when a voltage of ±1.0 kV is applied to the absorption belt 20, an embodiment of the present invention, the steady-state current after the lapse of 10 seconds, i.e., the value of the current during the period in which the printing medium P is not attracted, is at the level of about 0.1 μA, the detection limit. In other words, the ink jet printing apparatus 1 including the absorption belt 20 as an embodiment of the present invention is capable of realizing a high degree of energy saving.

Figure 3:
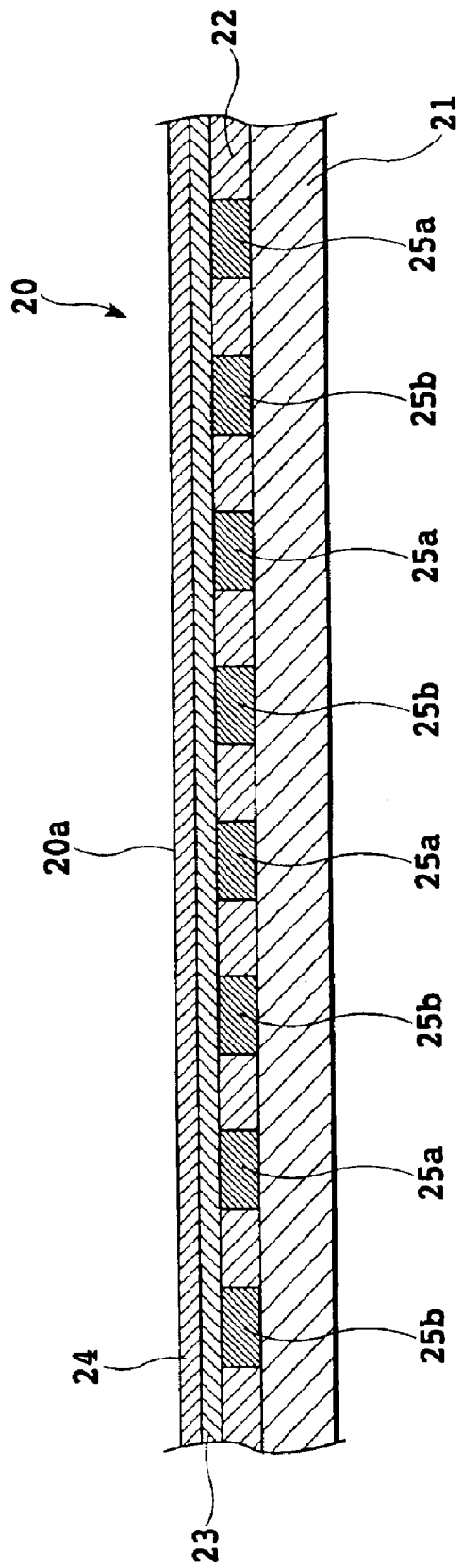
FIG. 3 is a sectional view of the absorption belt incorporated into the image forming apparatus shown in FIG. 1.

FIG. 3 is a partial sectional view of the absorption belt 20 incorporated into the above-mentioned ink jet printing apparatus 1. As shown in FIG. 3, the absorption belt 20 includes a base layer 21, an insulating layer 22, a first absorption layer 23 and a second absorption layer 24, all of which are formed from a thin thermoplastic resin sheet material.

The base layer 21 and the insulating layer 22 have an equal width (the length orthogonal to the longitudinal direction of the belt) and are in close contact with each other by being heated. That is, the base layer 21 and the insulating layer 22 are substantially integrated into a single layer and serves as the main body of the absorption belt 20. Further, as seen from FIG. 3, positive electrodes 25a and negative electrodes 25b are arranged (embedded) into the insulating layer 22 alternately and along the longitudinal direction of the belt. The surfaces of the insulating layer 22, the positive electrodes 25a and the negative electrodes 25b are arranged so as to be substantially flush with one another, thereby permitting the first absorption layer 23 and the second absorption layer 24 to be accumulated thereon in the order mentioned. Then, in the absorption belt 20, the surface of the second absorption layer 24 provides an absorption surface 20a for attracting the printing medium P.

As seen from FIG. 2, the positive electrodes 25a are arranged closer to one of the two longitudinal edges (left-hand side edge in FIG. 2) of the absorption belt 20. In contrast, the negative electrodes 25b are arranged closer to the other longitudinal edge (right-hand side edge in FIG. 2) of the absorption belt 20.

The first absorption layer 23 and the second absorption layer 24 are equal in width (length orthogonal to the longitudinal length of the belt), but their widths are smaller than those of the base layer 21 and the insulating layer 22. Further, the first absorption layer 23 and the second absorption layer 24 are accumulated on substantially central portion with respect to the belt width. By being arranged in this manner, as shown in FIG. 2, when viewed from the side of the absorption surface 20a, the positive electrodes 25a are exposed from the second absorption layer 24 (and the first absorption layer 23) on the side closer to one edge of the belt (on the left-hand side in FIG. 2), while the negative electrodes 25b are exposed from the second absorption layer 24 (and the first absorption layer 23) on the side closer to the other edge (on the right-hand side in FIG. 2).

In this way, it becomes possible to apply positive voltages to the exposed portions (feeding terminals) of the positive electrodes 25a from a feed member 17a, while it is possible to apply the negative voltages to the exposed portions (feeding terminals) of the negative electrodes 25b from a feed member 17b. More specifically, the positive power and the negative power from the charged brush unit 16 are supplied alternately to the electrodes 25a and the electrodes 25b.

Further, in the absorption belt 20, the volume resistivities of the layers 21, 22, 23 and 24 and the electrodes 25a and 25b are set so as to have a relationship given below.

$R_{22} \geq R_{21} \geq R_{23} > R_{24} > R_{25a}$ and $R_{25b}$, and at least a plurality of the volume resistivities of the absorption layers 23 and 24 are set to decrease in proportion to the distance from the electrodes 25a and 25b.

Next, the method for producing the above mentioned absorption belt 20 will be described. In manufacturing the absorption belt 20, there need to be supplied a base layer sheet 21S to constitute the base layer 21, an insulating layer sheet 22S to constitute the insulating layer 22, a first absorption layer sheet 23S to constitute the first absorption layer 23, a second absorption layer sheet 24 to constitute the second absorption layer 24, and a sheet 25S to form the electrodes 25a and 25b. In the present embodiment, the polyvinylidene fluoride resin (hereinafter referred to as "PVdF resin") formed into film is used for forming the sheets 21S, 22S, 23S, 24S and 25S. The fluoride resin is excellent in controllability of the resistance and solvent resistance. Thus, the fluoride resin is advantageously employed as a material to form the absorption layer, the electrode layer, the base layer and the insulating layer. Particularly, PVdF resin is excellent in formability so that it is more advantageously employed as a material to form the layers.

In the present embodiment, the base layer sheet 21S is about 100 μm thick, 945 mm in full length (length in longitudinal direction of the belt) and 270 mm wide (length orthogonal to the longitudinal direction of the belt). The base layer sheet 21S has a volume resistivity of about $1.0 \times 10^{14}$ Ω·cm. Further, the insulating layer sheet 22S is 50 μm thick, 945 mm in full length (length in longitudinal direction of the belt) and 270 mm wide (all in approximate values). Further, the insulating layer sheet 22S has a volume resistivity of $1.0 \times 10^{14}$ Ω·cm, which is similar to that of the base layer sheet 21S.

Figure 4:
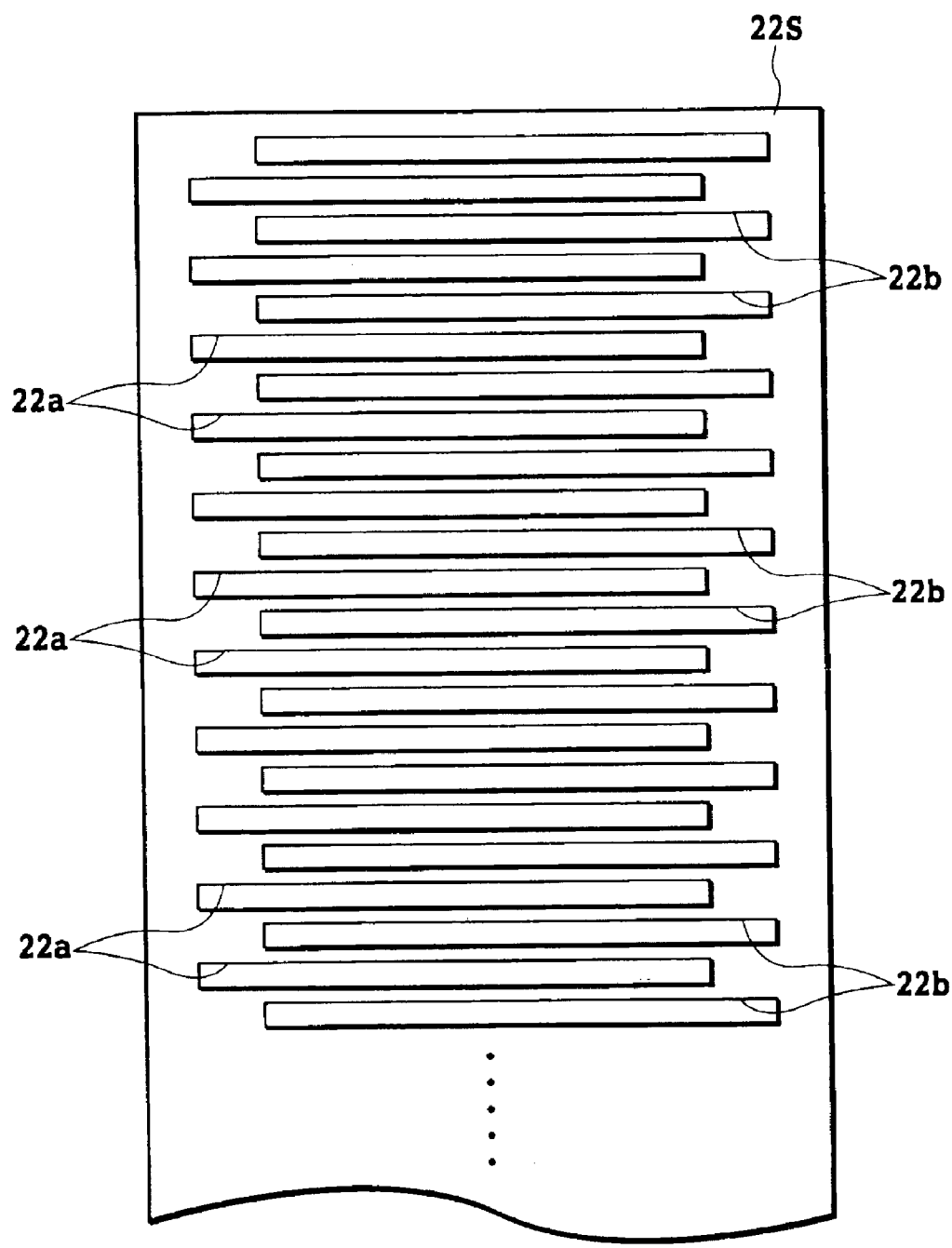
FIG. 4 is a plan showing an insulating layer sheet included in the absorption belt shown in FIG. 3.

Further, as shown in FIG. 4, the insulating layer sheet 22S is provided with a plurality of oblong openings 22a and a plurality of oblong openings 22b, the both extending alternately in the direction of the width thereof. Each of sets of the openings 22a and the openings 22b is 6 mm wide (length in the longitudinal direction of the belt) and about 200 mm in full length (the length in direction of the width of the belt, all in approximate values). The openings 22a and 22b are formed by means of a punching tool and a film setting jig (not shown).

As seen from FIG. 4, the openings 22a are arranged closer to one of the longitudinal edges of the insulating layer sheet 22S (closer to the left-hand side in FIG. 4). On the other hand, as seen from FIG. 4, the opening 22b are arranged closer to the other longitudinal edge of the insulating layer sheet 22S (closer to the right-hand side in FIG. 4). Further, in the present embodiment, the distance between the adjacent openings 22a and 22b is set to about 3 mm.

The electrode sheet 25S is formed into a belt form of about 50 μm in thickness, about 6 mm in width and about 200 mm in full length. Further, the electrode sheet 25S has a volume resistivity of about $1.0 \times 10^{2}$ Ω·cm. Further, both the first absorption layer sheet 23S and the second absorption layer sheet 24S are 25 μm thick, 945 mm in full length (length in the longitudinal direction of the belt) and 190 mm wide (the length orthogonal to the longitudinal direction of the belt) respectively (all in approximate values). However, the first absorption layer sheet 23S has a volume resistivity of about $1.0 \times 10^{12}$ Ω·cm, while the second absorption layer sheet 24S has a volume resistivity of about $1.0 \times 10^{10}$ Ω·cm.

Figure 5:
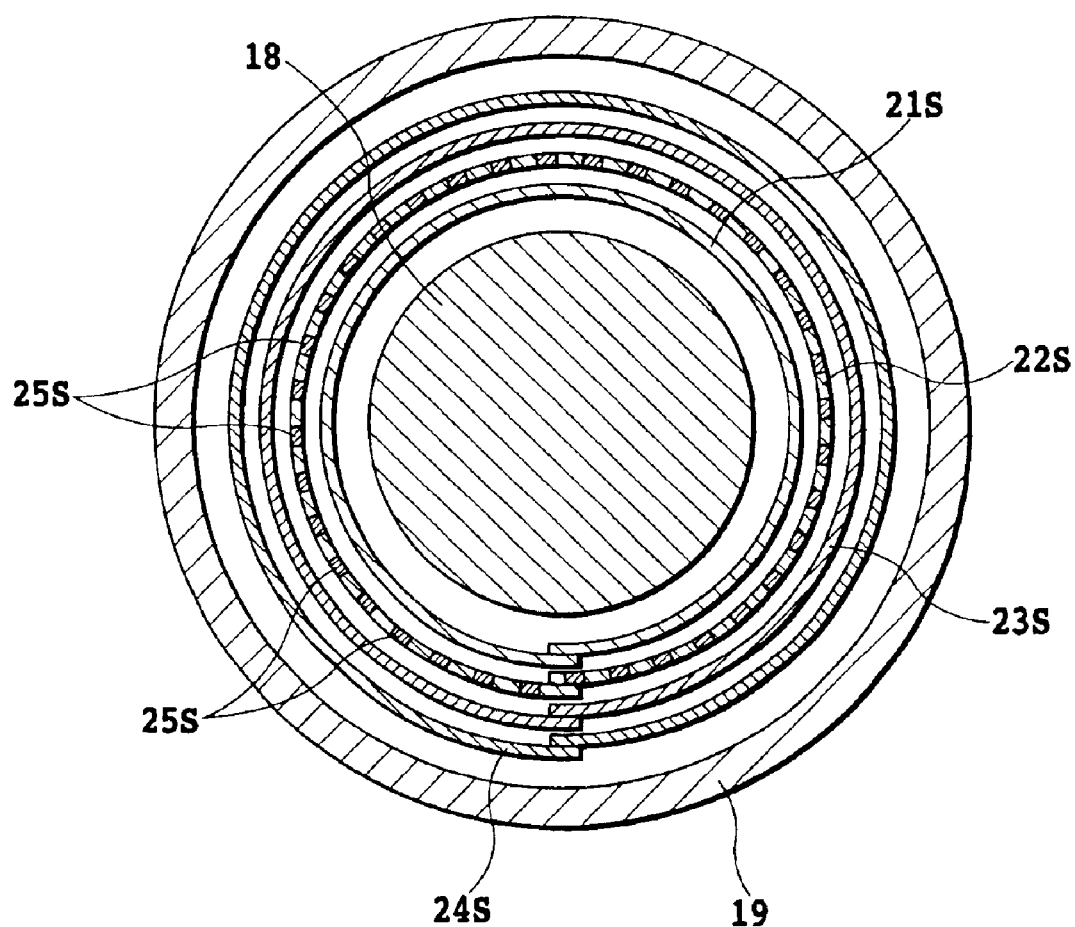
FIG. 5 is a sectional view showing a manufacturing process of the absorption belt shown in FIG. 3.

Each of the sheets, ranging from 21S to 24S and having the above-mentioned dimensions and volume resistivities, are subjected to the heating process and the cooling process by using a columnar member (a core member) 18 and a cylindrical member 19 (Refer to FIG. 5 for the both). By undergoing these processes the sheets 21S through 24S are joined with one another and formed into an endless belt. The columnar member 18 serves as a core member around which each of the thermoplastic sheets, 21S through 24S, is wound; in the case of the present embodiment, a solid aluminum columnar member 18, having a diameter of 300.0 mm, a full length of 300.0 mm and a thermal expansion coefficient of $2.4 \times 10^{-5}$ (/° C.) is used. The cylindrical member 19 has an internal diameter large enough for permitting the insertion of the columnar member 18 or the like. In the case of the present embodiment, for the cylindrical member 19, a stainless steel cylindrical member having an internal diameter of 300.80 mm, an outside diameter of 320 mm, a full length of 300 mm and a thermal expansion coefficient of $1.5 \times 10^{-5}$ (/° C.) is used.

In the present embodiment, in order to have the sheets 21S through 24S joined firmly and securely to be formed into an endless belt, the thermal expansion coefficient of the columnar member 18 (made of aluminum in the case of the present embodiment) is set to be larger than that of the cylindrical member 19 (made form the stainless steel in the case of the present embodiment). However, a cylindrical member maybe substituted for the solid columnar member.

Further, in the case of the present embodiment, as well as in the embodiments which will be described later, the combination of the material of the columnar member 18 and the materials of the cylindrical member 19 is not limited to the combination of the aluminum and the stainless steel. For instance, the combination of the resin materials such as the polytetrafluoroethylene or the combination of the glass materials may be substituted for previously known combination of the materials for the columnar member 18 and the cylindrical member 19.

Figure 6:
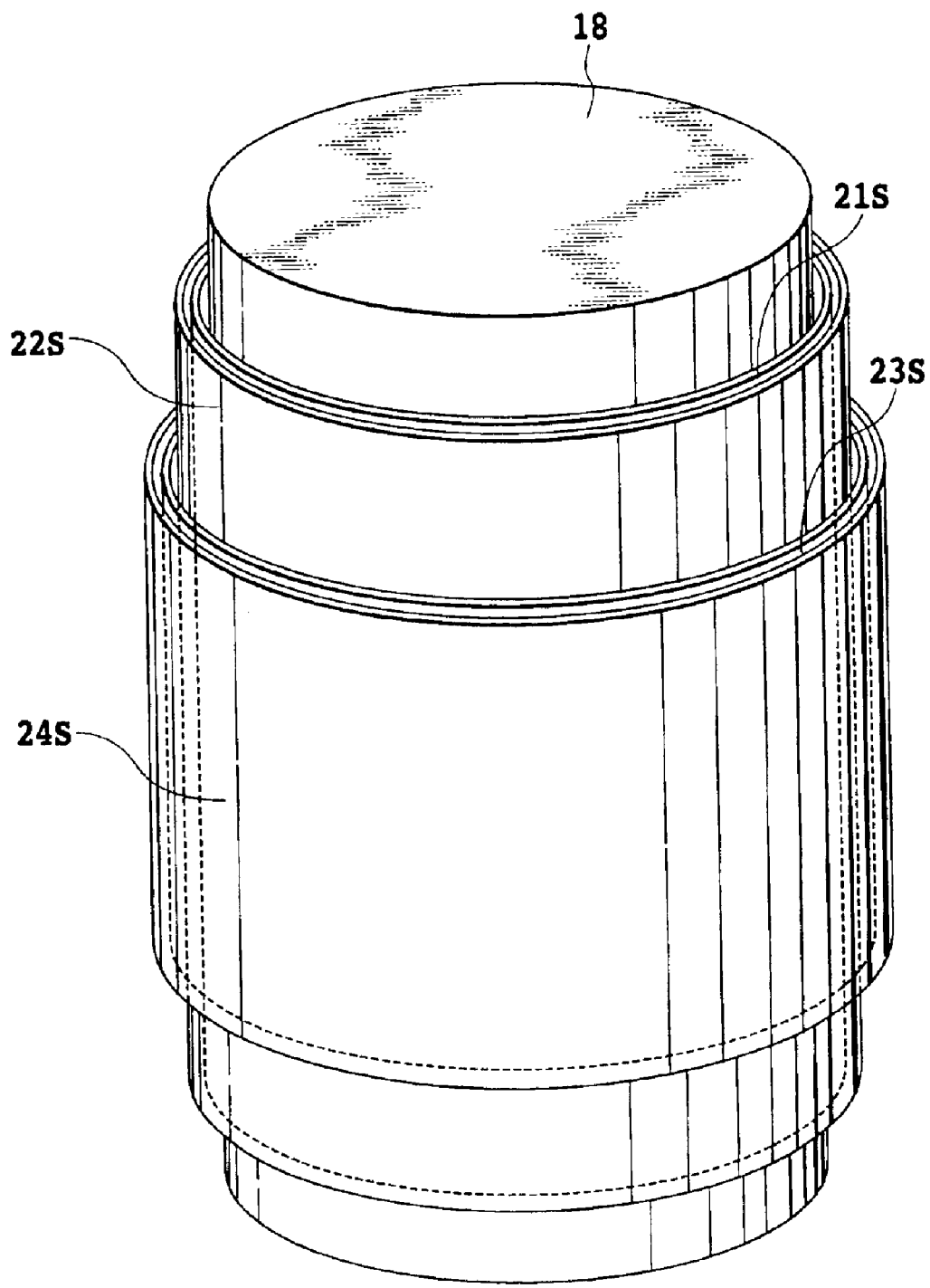
FIG. 6 is a perspective view showing a manufacturing process of the absorption belt shown in FIG. 3.

To specifically describe the manufacturing process of the absorption belt 20, as shown in FIGS. 5 and 6, first, base layer sheet 21S is wound (about once) around the outer circumferential surface of the columnar member 18 so that the both ends thereof overlap each other. Then, the insulating layer sheet 22S is wound (about once) on the previously wound base layer sheet 21S until the both ends thereof overlap with each other.

Next, the oblong electrode sheets 25S are respectively set into the openings 25a and 25b of the insulating layer sheet 22S wound on the base layer sheet 21S (around the columnar member 18), and a plurality of the electrode sheets 25S are positioned with respect to the insulating layer sheet 22S. Then, the first absorption layer sheet 23S is wound (about once) on the insulating layer sheet 22S (and the electrode sheets 25S) until the both ends there of overlap with each other. Further, the second absorption layer sheet 24S is wound on the first absorption layer sheet 23S until both ends thereof overlap with each other. As shown in FIG. 6, the first absorption layer sheet 23S and the second absorption layer sheet 24S are wound around substantially central area of the insulating layer sheet 22S with respect to the width thereof.

In the method for producing the absorption belt according to the present invention, the above described electrode sheets 25s are inserted in the opening 25a, 25b of the insulating sheet 22S, instead of printing or applying conductive paste on a resin film to forming electrodes. Thus, when the electrode sheet 25s are inserted in the opening 25a, 25b of the insulating sheet 22S, the thickness of the whole belt becomes almost constant. Accordingly, projections due to the electrodes do not appear in the surface of the fabricated absorption belt. Further, in the present invention, all components for the absorption belt are held in a melted condition and are integrated each other by a subsequent cooling process. Thus, it is possible to acquire the absorption belt with high reliability and long life according to the present invention. Further, since the change in the boundary between components is controlled, the flexibility of the absorption belt is very uniform.

FIG. 5 shows an example where in the overlapped portions of the sheets 21S through 24S almost coincide with one another, but the present invention is not limited to this. In other words, the overlapped portions of the sheets 21S through 24S may set freely. Especially, when the thickness of the absorption belt 20 is required to be uniform all over, the overlapped portions are preferred to be distributed by differentiating their respective positions, for example, by 180° so as to prevent overlapped portions from coinciding with one another. In FIGS. 5 and 6, for the ease of understanding, the sheets 21S through 24S are described as if there are gaps among those sheets, but actually there are little gaps among different wound sheets.

Upon completion of winding the sheets 21S through 24S, on the columnar member 18, the columnar member 18 and the sheets 21S through 25S wound thereon are almost coaxially inserted into the cylindrical member 19. In this way, the insulating layer sheet 22S, the electrode sheets 25S, the second absorption layer sheet 24S or the like are covered with the cylindrical member 19 as shown in FIG. 5. Then, the cylindrical member 19, the sheets 21S through 25S and the columnar member 18 are placed in a heating apparatus (or heating furnace) to undergo a heat treatment.

Figure 8:
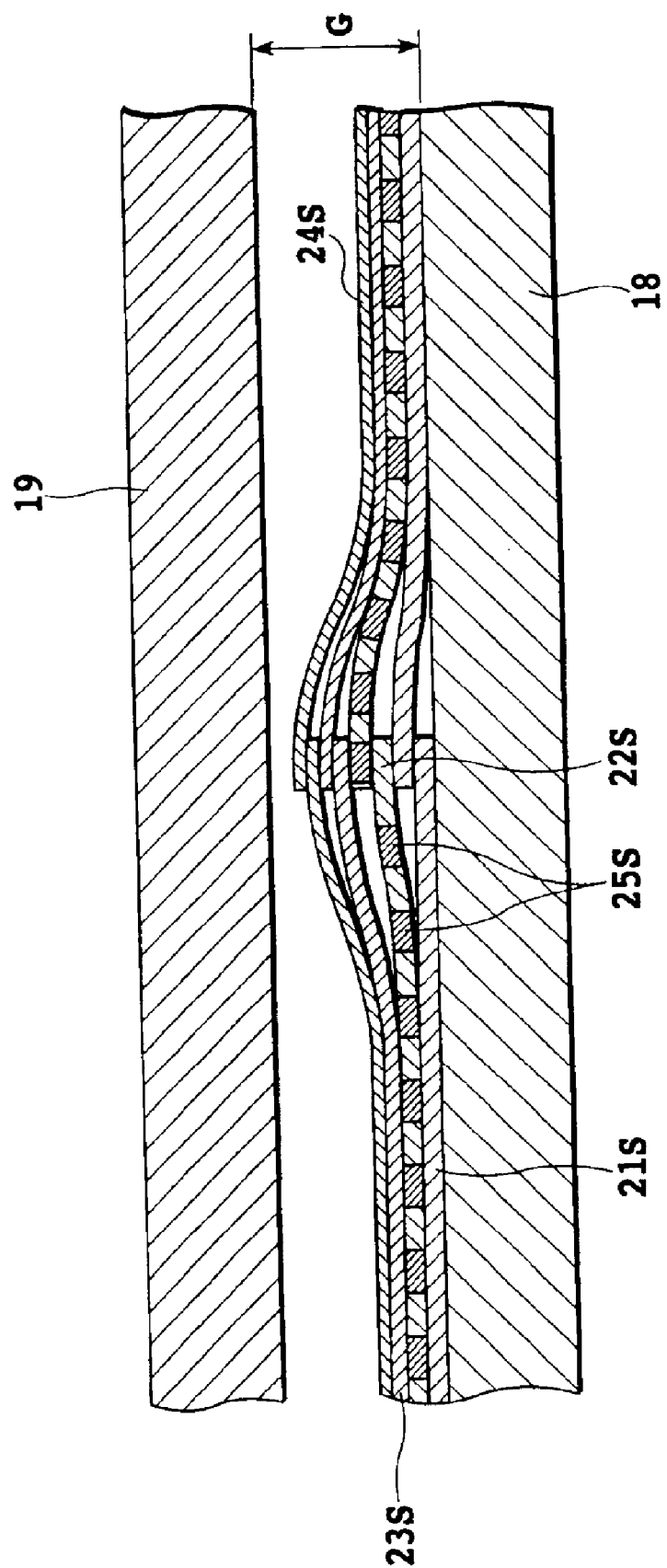
FIG. 8 is a sectional view illustrating the manufacturing process of the absorption belt shown in FIG. 3.
Figure 9:
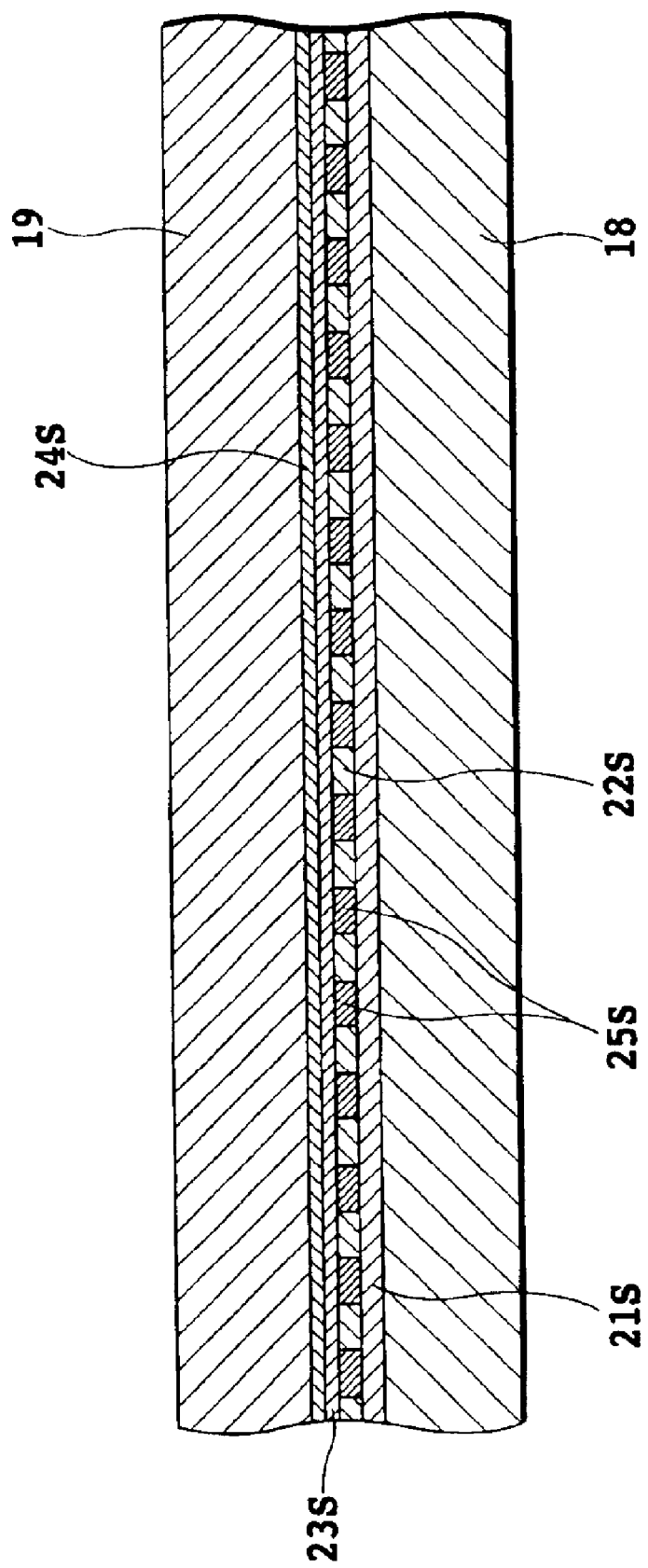
FIG. 9 is a sectional view illustrating the manufacturing process of the absorption belt shown in FIG. 3.

In the case of the present embodiment, as the heating conditions in using the heating apparatus 100, the heating temperature is set to 210±5° C., while heating time is set to 60±1 min. The heating time is dependent on the melting temperature of the thermoplastic sheet and the thermal deterioration of the films. While undergoing the heating process by the heating apparatus 100 the conditions of the sheets 21S through 25S vary from as shown in FIG. 8 and 9. Further, fore brevity, in FIGS. 8 and 9, the columnar member 18, sheets, 21S through 25S, and the cylindrical member 19 are illustrated without taking their respective curvatures into consideration.

In the present embodiment, the sheets 21S through 25S are placed between the columnar member 18 and the cylindrical member 19 when set in the heating apparatus 100. Further, the initial gap G (see FIG. 8) between the columnar member 18 and the cylindrical member 19 is about 400 $\mu$m. In this state, when the heating in the heating apparatus 100 is started, the temperatures of the cylindrical member 19, the sheets 21S through 25S, and the columnar member 18 start to rise respectively.

As a result, the columnar member 18 and the cylindrical member 19 start to expand according to their respective thermal expansion coefficients, while the sheets, 21S through 25S, begin to be softened gradually as the temperature rises. In this process, since the thermal expansion coefficient of the aluminum constituting the columnar member 18 is larger than the thermal expansion coefficient of the stainless steel constituting the cylindrical member 19, the columnar member 18 expands more than the cylindrical member 19. Thus, the gap between the outer circumferential surface of the columnar member 18 and the inner circumferential surface of the cylindrical member 19 decreases gradually with the progress of the heating.

As the temperature rises the gap between the (outer) circumferential surface of the columnar member 18 and the (inner) circumferential surface of the cylindrical member 19 becomes smaller, while the sheets 21S through 25S between these two members are softened further. Then, as shown in FIG. 9, as the sheets 21S through 25S soften, the overlapped portions of the sheets 21S through 24S are extended along the outer circumferential surface of the columnar member 18 to be fused and finally joined with one another. Since the sheets 21S through 24S and the electrode sheets 25 are made from the same thermoplastic sheets, they fuse to be joined closely with one another. As a result, the adjacent sheets and the overlapped portion of each sheet can be joined with one another through this heating process.

Further, the gap between the columnar member 18 and the cylindrical member 19 finally become almost equal to the desired thickness of the belt, thereby eliminating the unevenness in the thickness among overlapped portion, the electrode sheet (see FIG. 9). Further, the heating apparatus 100 to be used for the heating process need not be limited to the previously mentioned heater. In other words, for reducing the time required for heating, an induction heater, a lamp heater or the like may be used.

Figure 10:
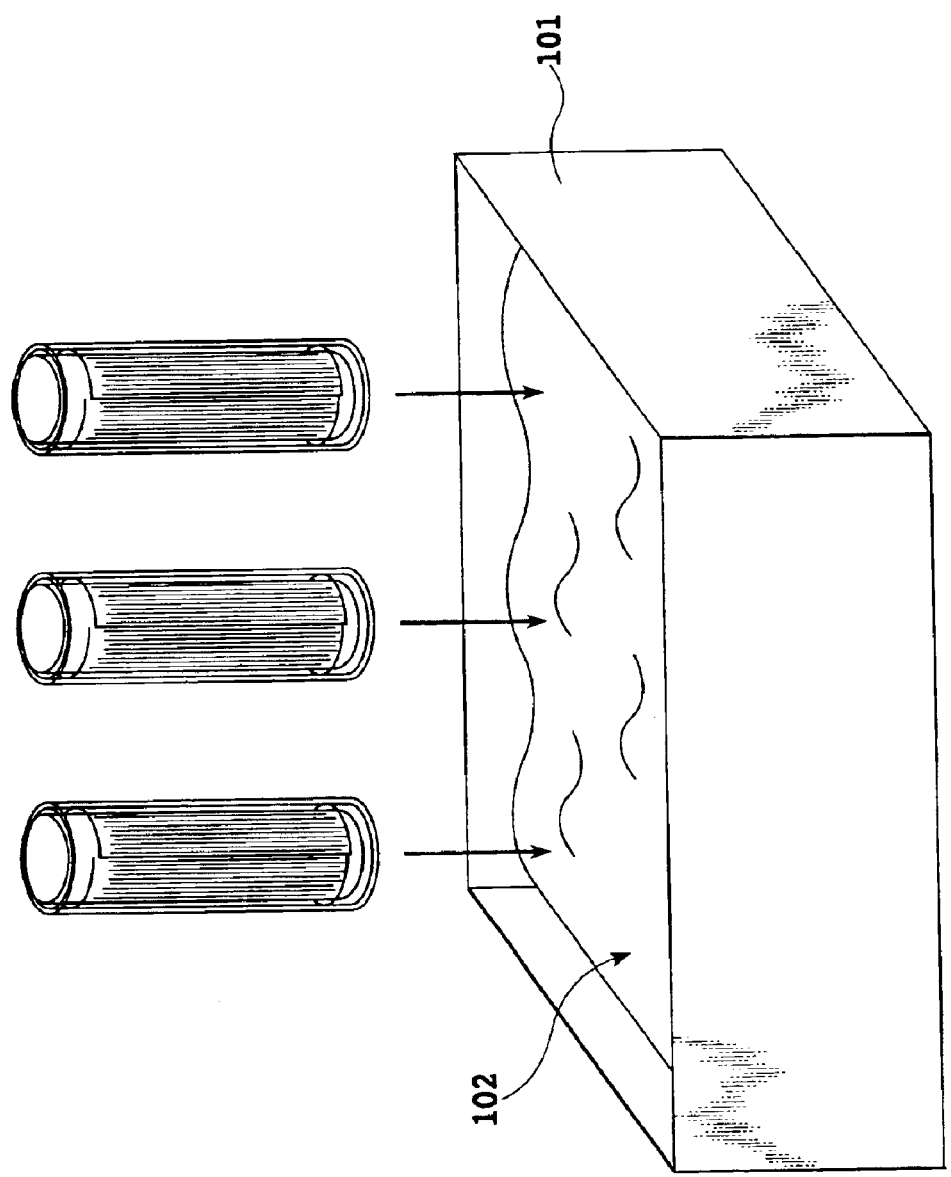
FIG. 10 is a perspective view illustrating the manufacturing process of the absorption belt shown in FIG. 3.

When the above-mentioned heating time (about 60 min.) has lapsed, the heating is stopped, and the cylindrical member 19, the integrated sheets 21S through 25S, and the columnar member 18 undergo the cooling process. Instead of applying this cooling treatment (cooling process), the cylindrical member 19, the integrated sheets 21S through 25S and the columnar member 18 may be left for natural cooling. In the case of the present embodiment, the cylindrical member 19, the integrated sheets 21S through 25S and the columnar member 18 taken out from the heating apparatus 100 are immersed in a predetermined refrigerant 102 (coolant) contained in a cooling tank 101 to be rapidly cooled at a rate of 200° C./min. as shown in FIG. 10. In this way, the time required for cooling can be reduced substantially.

Then, the cylindrical member 19, the integrated sheets 21S through 25S and the columnar member 18 are taken out from the cooling tank 101 and are left in the normal temperature (room temperature), and the integrated sheets 21S through 25S as being the absorption belt 20 having the structure as is illustrated in FIGS. 2 and 3 is taken out from the gap between the columnar member 18 and the cylindrical member 19. The endless type absorption belt 20 obtained through the above-mentioned method is free of unevenness of the surface resulting from the overlapped portion, and the constituting sheets 21S through 25S are joined securely and firmly. Then, the thickness throughout the absorption belt 20 is uniformly about 150 $\mu$m (±10 $\mu$m in overlapped portion).

The absorption belt 20 as this embodiment manufactured by the above-mentioned method is provided with a plurality of absorption layers 23 and 24 for covering a plurality of electrodes 25a and 25b, and the absorption layers 23 and 24 have different volume resistivities. More specifically, in the case of the absorption belt 20 of the present embodiment, the volume resistivities of the plurality of absorption layers 23 and 24 are set properly so as to decrease in proportion to the distance from each of the electrodes 25a and 25b ($R_{22} \geq R_{21} \geq R_{23} > R_{24} > R_{25a,\ 25b}$). In this way, the leakage currents from the electrodes 25a and 25b can be oriented to the absorption layers 23 and 24, thereby substantially increasing the resistance between (each of) the adjacent electrode 25a and electrode 25b.

Thus, in the absorption belt 20, the leakage current between the adjacent electrode 25a and the electrode 25b can be reduced, so that the deterioration of the belt 20 owing to the leakage current and the increase in the power consumption can be suppressed while maintaining a good attractive ability of the absorption belt. As a result, the absorption belt 20 can contribute to the improvement in the reliability of the belt itself and the saving of the energy. In addition, when the present absorption belt 20 is employed as a transfer means for the printing medium P in the ink jet printing apparatus 1, the printing medium P can be transferred highly accurately thereby contributing to the improvement in the quality of the printed image. Further, according to the method of the present embodiment, it is possible to produce the absorption belt 20 capable of suppressing the deterioration of the belt resulting from the leakage current and the increase in the power consumption at low cost, with ease and efficiently while maintaining a good attracting ability.

Further, in the case of the present embodiment, the volume resistivities of the first absorption layer sheet 23S and the second absorption layer sheet 24S are set as given in Table 1, and the absorption belt was prepared on a trial basis according to the method of the first embodiment. Then, each belt manufactured on experimental basis was subjected to the voltage of ±1.0 kV, and the steady current after the lapse of 10 seconds from a standstill, that is, the state in which the printing medium P is not attracted, was measured. Further, the manufacturing conditions for the first absorption layer sheet 23S and the second. absorption layer sheet 24S other than the volume resistivities were set equal to those the above-mentioned case.

TABLE 1

| | The first absorption layer sheet | The second absorption layer sheet | Current value |
|---|---|---|---|
| Experimentally manufactured Belt X1 | $1.0 \times 10^{11}$ Ω · cm | $1.0 \times 10^{8}$ Ω · cm | 0.18 μA |
| Experimentally manufactured Belt Y1 | $1.0 \times 10^{13}$ Ω · cm | $1.0 \times 10^{12}$ Ω · cm | Less than 0.1 μA |
| Experimentally manufactured Belt Z1 | $1.0 \times 10^{12}$ Ω · cm | $1.0 \times 10^{11}$ Ω · cm | 0.1 μA |

As is obvious from the results of the experiments given in Table 1, all the belts manufactured on experimental basis have shown to have an electric current of small value when not attracting the printing medium thereby proving to have an energy saving ability. This result indicates that a good result for practical use can be obtained when the volume resistivity of the first absorption layer 23 (the first absorption layer sheet 23S) to be laid to cover the electrodes 25a and 25b is within the range of $1.0 \times 10^{11}$ Ω·cm–$1.0 \times 10^{13}$ Ω·cm, and the volume resistivity of the second absorption layer 24 (the second absorption layer sheet 24S) to be laid on the first absorption layer sheet is within the range of $1.0 \times 10^{8}$ Ω·cm–$1.0 \times 10^{12}$ Ω·cm.

Moreover, if the volume resistivity of the resin which is a main ingredient of the second absorption layer 24 before a control of resistance is over $1.0 \times 10^{16}$ Ω·cm, the quantity of the control agent added to the resin must be increased in order to control the resistance. In such a case, the control agent may exist unevenly within the resin and this causes the leak current. Accordingly, the volume resistivity of the resin which is a main ingredient of the second absorption layer 24 before the control of the resistance is preferably set as $1.0 \times 10^{16}$ Ω·cm or less.

In the manufacturing process described above, the first absorption layer sheet 23S and the second absorption layer sheet 24S are wound, in the order mentioned, on the columnar member 18, but the process is not limited to this particular process. More specifically, the first absorption layer sheet 23S and the second absorption layer sheet 24S may be temporarily joined with each other until being integrated into a single sheet by means of the hot fusing process or the hot press process and formed to the predetermined dimensions before being wound on the columnar member 18 over the insulating layer sheet 22S. By employing such a process, the positional disagreement among the sheets, 22S through 24S, can be controlled, thereby not only reducing the occurrence of substandard products but also enabling the manufacturing cost of the absorption belt 20 to be reduced.

Further, in the above-mentioned embodiment, the base layer sheet 21S and the insulating layer sheet 22S, the both having the same volume resistivities, are integrated into one, but the present invention is not limited to this. In other words, a single sheet having a plurality of indents corresponding to the openings 22a and 22b of the previously mentioned insulating layer sheet may be used.

Further, for the thermoplastic resins to be used to form the sheets 21S, 22S, 23S, 24S and 25S in the case of the present embodiment and in the embodiments which will be described later, usable, besides the previously mentioned PVdF resin, are the polyethylene, polypropylene, polymethylpentene-1, polystyrene, polyamide, polycarbonate, polysulfone, polyallylate, polyethylene terephthalate, polybutylene terephthalate, polyphenylene sulfide, polyether sulfone, polyether nitrile, various fluororesins, thermoplastic polyimide-base materials, polyether ketone, thermotropic liquid crystal polymer, polyamide acid or the alloy resins to be obtained by mixing at least two of these thermoplastic resins. Further, in order to effectively control the electrical conductivity or the like (of the absorption belt), quaternary ammonium salt or carbon black selected from the group consisting of Tetraalkylammonium Sulphate and Tetraalkylammonium Sulfite may be added to the thermoplastic resin as the control agent for controlling the electrical conductivity. In this case, it is most appropriate to blend ionic conduction polymers into the control agent.

For the above described reasons, the resin to be used to form the uppermost layer (24) of the present invention can be selected from the group of PTFE (Polytetrafluoroethylene), PFA (Tetrafluoroethylene-Per-Fluoro-Alkylvinylether Copolymer), FEP (Tetrafluoroethylene-Hexafluoropropylene Copolymer), ETFE (Ethylene-Tetrafluoroethylene Copolymer), PTCFE (Polychlorotrifluoroethylene), ECTFE (Ethylene-Chlorotrifluoroethylene), PVdF, Acrylic resin including fluoride, urethane resin including fluoride and fluoride resin such as blend polymer or copolymer of various fluoride resins. In the absorption belt of the present invention, one of the absorption layers constitutes the uppermost one; however, the present invention is not limited to this. That is, the uppermost layer of the absorption belt of the present invention may be another layer having other function.

Further, in order to provide the above-mentioned resin materials with additional heat resistance, conductivity or the like, at least a kind of fine organic or inorganic powder may be added to the resin materials as a control agent. For this purpose, it is desirable to adopt the organic powder such as the condensation polyimide, the inorganic spheroidal powders such as the carbon black powder, magnesium oxide powder, magnesium fluoride powder, silicon oxide powder, aluminum oxide powder, titanium oxide powder, the fibrous particles such as the carbon fiber, glass fiber or the like, and whisker-like powder such as the hexadic potassium titanate, octadic potassium titanate, silicon carbide, silicon nitride or the like.

[The Variation of the First Embodiment]

Absorption belts having three layered structure were prepared on a trial basis according to the method of the first embodiment. Each of the absorption belts included a first absorption layer of 20 μm in thickness, a second absorption layer of 20 μm in thickness, electrode sheets of 40 μm in thickness, and an intermediate layer between the first and second layers of 20 μm in thickness. The volume resistivities of the first absorption layer sheet, the second absorption layer sheet and the intermediate sheet are set as given in Table 1'. Then, each belt manufactured on experimental basis was subjected to the voltage of ±1.0 kV, and the steady current after the lapse of 10 seconds from a standstill, that is, the state in which the printing medium P is not attracted, was measured.

As is obvious from the results of the experiments given in Table 1', all the belts manufactured on experimental basis have shown to have an electric current of small value when not attracting the printing medium thereby proving to have an energy saving ability. This result indicates that a good result for practical use can be obtained when the volume resistivity Ra1' of the first absorption layer 23 (the first absorption layer sheet 23S) to be laid to cover the electrodes 25a and 25b is within the range of $1.0 \times 10^{11}$ Ω·cm–$1.0 \times 10^{13}$ Ω·cm, and the volume resistivity RaC' of the intermediate absorption layer to be laid on the first absorption layer sheet is within the range of $1.0 \times 10^{10}$ Ω·cm–$1.0 \times 10^{12}$ Ω·cm, and the volume resistivity Ra2' of the second absorption layer 24 (the second absorption layer sheet 24S) is within the range of $1.0 \times 10^{8}$ Ω·cm–$1.0 \times 10^{12}$ Ω·cm, and the relationship that Ra1'≧RaC'>Ra2' is satisfied, and volume resistivities of the attractive layers are so strong that they are close to the electrode.

TABLE 1'

| | The first absorption layer sheet | The intermediate absorption layer sheet | The second absorption layer sheet | Current value |
|---|---|---|---|---|
| Experimentally manufactured Belt X1' | $1.0 \times 10^{11}$ Ω·cm | $1.0 \times 10^{10}$ Ω·cm | $1.0 \times 10^{8}$ Ω·cm | 0.16 μA |
| Experimentally manufactured Belt Y1' | $1.0 \times 10^{13}$ Ω·cm | $5.0 \times 10^{12}$ Ω·cm | $1.0 \times 10^{12}$ Ω·cm | Less than 0.1 μA |
| Experimentally manufactured Belt Z1' | $1.0 \times 10^{12}$ Ω·cm | $5.0 \times 10^{11}$ Ω·cm | $1.0 \times 10^{11}$ Ω·cm | Less than 0.1 μA |

[The Second Embodiment]

Next, the second embodiment of the present invention will be described. The absorption belt 30 relating to the second embodiment of the present invention can directly be substituted for the absorption belt 20 in the previously mentioned ink jet printing apparatus 1 and is capable of attracting the printing medium P on the absorption surface thereof. When the voltage of ±1.0 kV is impressed to the absorption belt 30 of the ink jet printing apparatus 1, the value of the current after the lapse of 10 seconds from a standstill (of the belt), that is, at the state in which the printing medium P is not attracted, is about 0.1 μA, the detection limit. In other words, the absorption belt 30 can also contribute to the energy saving when incorporated into the ink jet printing apparatus 1.

As seen from FIG. 11 through FIG. 14, the absorption belt 30 of the second embodiment includes a base layer 31 and an insulating layer 32, which are formed from thin thermoplastic sheet materials of a thermoplastic resin. The base layer 31 and the insulating layer 32 are of the same width (the length orthogonal to the longitudinal direction of the belt) and are thermally joined with each other. More particularly, the base layer 31 and the insulating layer 32 are substantially integrated into a single layer to serve as the body of the absorption belt 30. Further, as seen from FIG. 12, etc., a plurality of positive electrodes 33a and a plurality of negative electrodes 33b are embedded alternately along the longitudinal direction of the belt.

The thickness of the electrodes 33a and the thickness of the electrodes 33b are smaller than the thickness of the insulating layer 32, and the absorption layer 34 is laid on each of the electrodes 33a and each of the electrodes 33b. The surface of the insulating layer 32 and the surfaces of the absorption layer 34 are substantially flush with one another, whereby the insulating layer and the absorption layer appear alternately with one another along the longitudinal direction of the belt as seen from FIGS. 11 and 12. Further, the electrodes 33a and 33b, and the absorption layers 34 are formed from the thin thermoplastic sheets.

Figure 11:
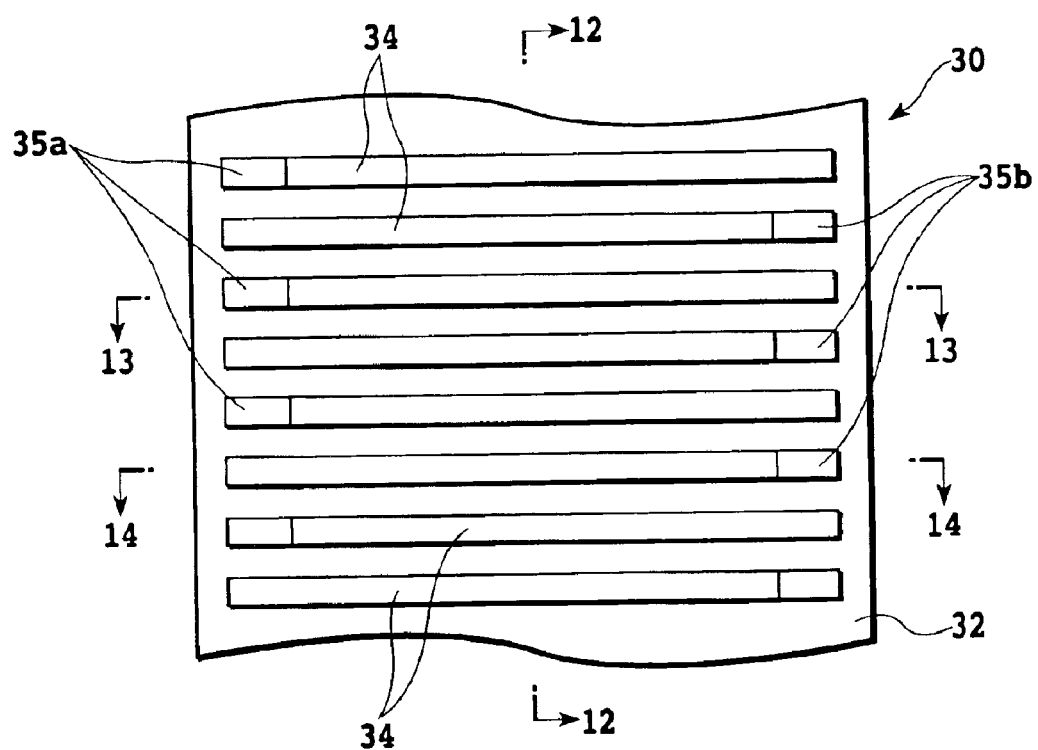
FIG. 11 is a plan showing the absorption belt relating to the second embodiment of the present invention.
Figure 12:
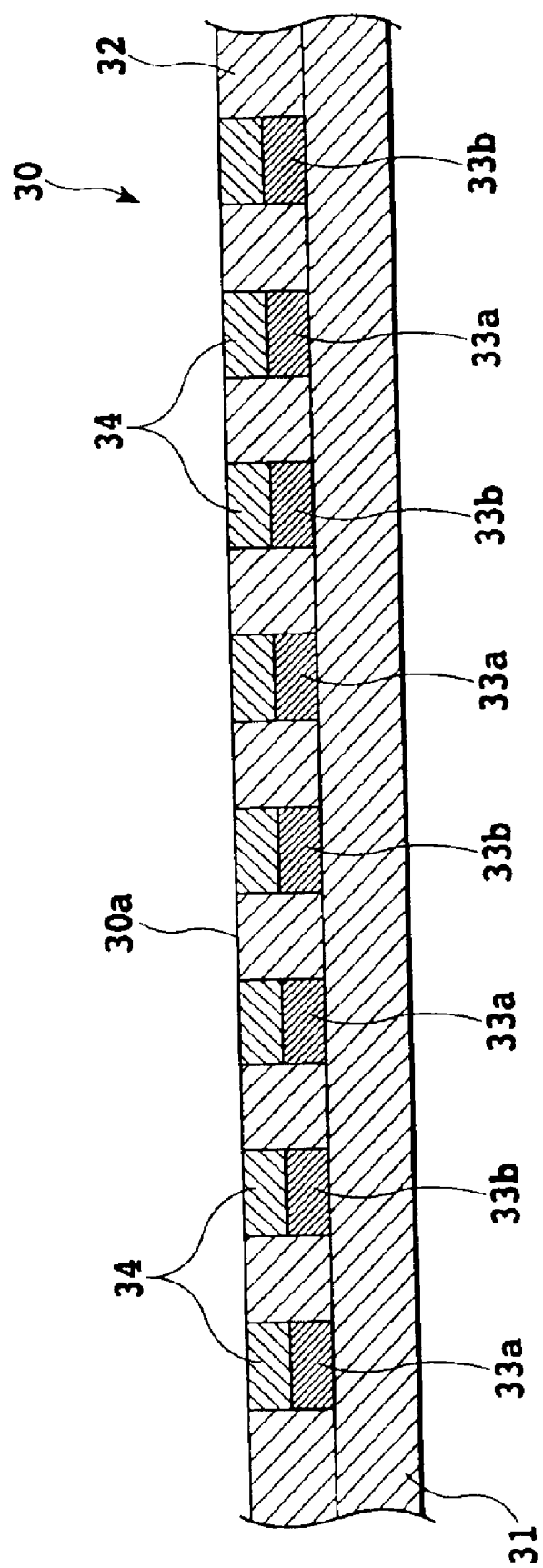
FIG. 12 is a sectional view taken on line 12—12 of FIG. 11.
Figure 13:
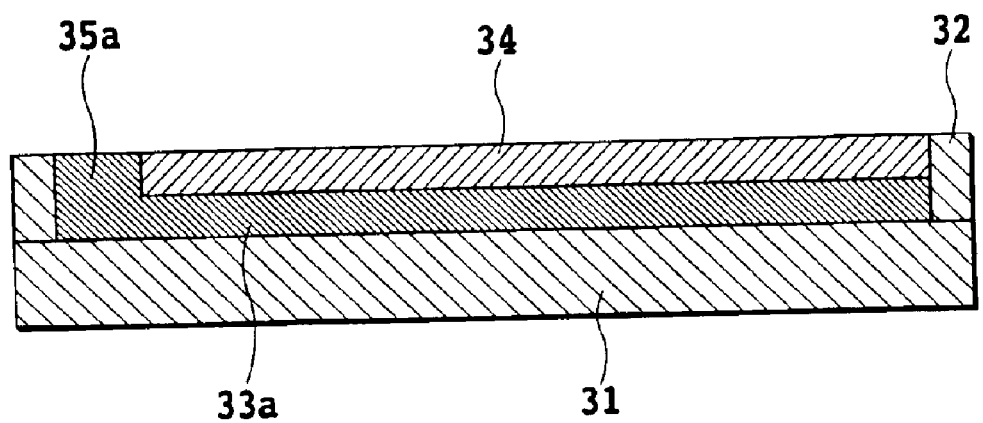
FIG. 13 is a sectional view taken on line 13—13 of FIG. 11.
Figure 14:
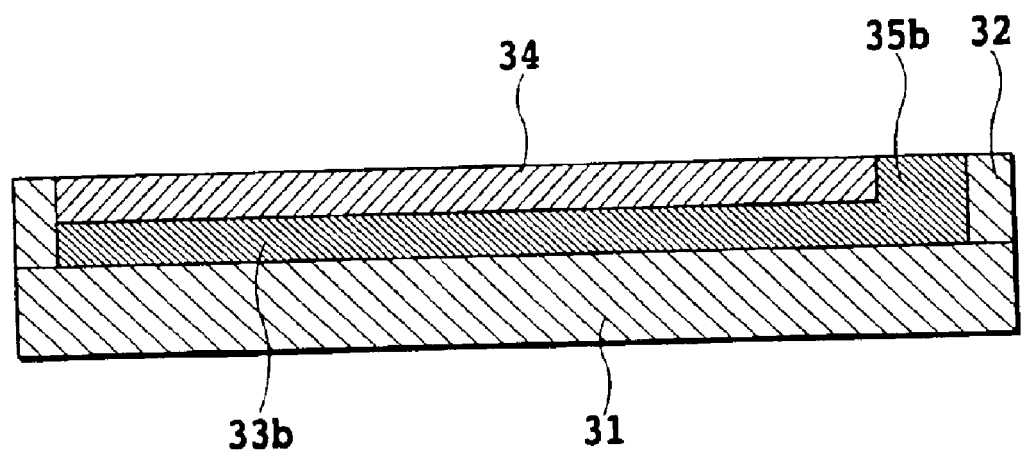
FIG. 14 is a sectional view taken on line 14—14 of FIG. 11.

As seen from FIG. 11, FIGS. 13 and 14, the thickness of one end of each electrode 33a and the thickness of one end of each electrode 33b are made larger than those of the remaining portions, thereby providing each of the electrodes 33a and each of the electrodes 33b with the positive power feeding terminal 35a or the negative power feeding terminal 35b. Then, the full length of the each absorption layer 34 is made shorter by the length of the positive power feeding terminal or the length of the negative power feeding terminal so that each of the positive feeding terminals and each of negative power feeding terminal can be made to be exposed outside.

Then, as seen from FIG. 11, each positive power feeding terminal 35a of each positive electrode 33a is exposed outside on the side (the left-hand side in FIG. 11) of one of the two longitudinal edge sides of the absorption belt 30. On the other hand, each negative power feeding terminal 35b of each negative electrode 33b is exposed outside on side (the right-hand side in FIG. 11) of one of the two longitudinal edge sides of the absorption belt 30. In this manner, it becomes possible that the positive voltage can be applied to each positive power feeding terminal 35a of each positive electrode 33a from the power feeding member 17a (FIG. 2), while the negative voltage can be applied to each negative power feeding terminal 35a of each negative electrode 33b from the power feeding member 17b (FIG. 2). More specifically, the positive power and the negative power are supplied alternately to each of the electrodes 33a and 33b in the absorption belt 30 through the charged brush unit 16 (FIG. 2).

Further, in the case of the absorption belt 30, the volume resistivities of the layers 31, 32 and 34, and the electrodes 33a and 33b are set for the following relationship:

$R_{32} \geq R_{31} > R_{34} > R_{33a, 33b}$, and at least the volume resistivity $R_{34}$ of the absorption layer 34 differs from the volume resistivity $R_{32}$ of the insulating layer 32.

Next, the method for producing the above-mentioned absorption belt 30 will be described in the following. In manufacturing the absorption belt 30, first there need to be provided a base layer sheet 31S to constitute the base layer 31, an insulating layer sheet 32S to constitute the insulating layer 32, an electrode sheet 33S to constitute the positive electrode 33a and the negative electrode 33b, and an absorption layer sheet 34S to constitute the absorption layer 34. In the present embodiment, the sheets 31S, 32S, 33S and 34S are made from the PVdF resin films.

In the present embodiment, the base layer sheet is 100 μm thick, 945 mm in full length (in longitudinal direction of the belt) and 270 mm wide (in the direction orthogonal to the longitudinal direction of the belt, all in approximate values). Then, the base layer sheet 31S has a volume resistivity of about $1.0 \times 10^{14}$ Ω·cm. Further, the insulating layer sheet 32S is 100 μm thick, 945 mm in full length (in longitudinal direction of the belt) and 270 mm wide (all in approximate values). Then, the insulating layer sheet 32S has, similarly to the base layer sheet 31S, the volume resistivity of $1.0 \times 10^{14}$ Ω·cm.

Figure 15:
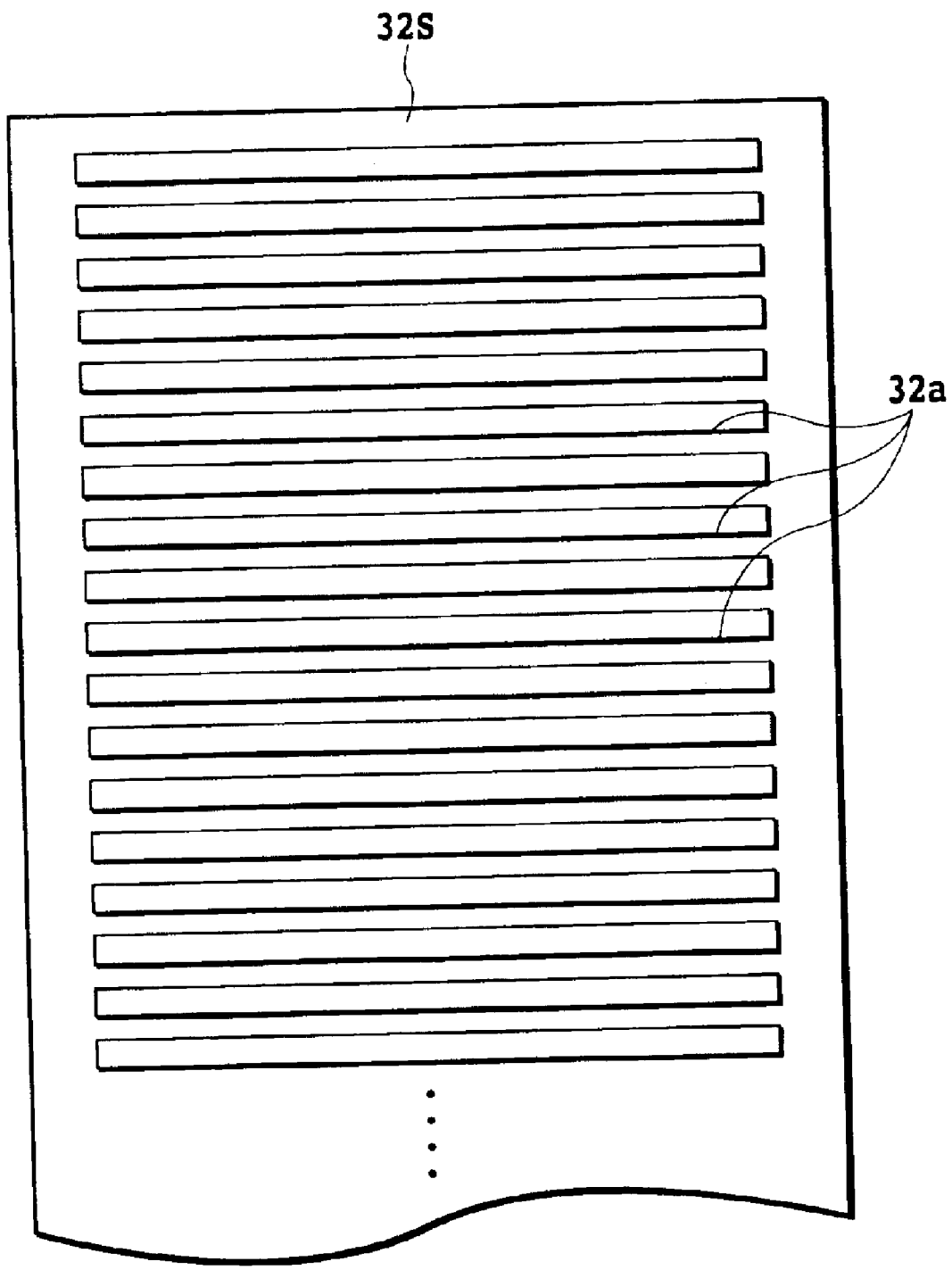
FIG. 15 is a plan showing the insulating layer sheet included in the absorption belt shown in FIG. 11.

On the other hand, as shown in FIG. 15, a plurality of oblong openings 32*a*, extending in the direction of the width, are provided in the insulating layer sheet 32S. The openings 32*a* are aligned in the longitudinal direction of the sheet so that the both ends thereof are aligned. Each of the openings 32*a* is about 6 mm wide (in longitudinal direction of the belt) and about 200 mm in full length (in the direction of the width of the belt). The distance between adjacent openings 32*a* is set to about 3 mm. The openings 32*a* are provided by using the punching pattern and film setting jig (not shown).

The electrode sheet 33S is basically formed into a strip of about 6 mm wide and about 200 mm in full length. Further, the electrode sheet 33S has a volume resistivity of about $1.0 \times 10^2$ Ω·cm. However, in order to form the positive power feeding terminal or the negative power feeding terminal, the thickness of the corresponding part of the electrode sheet 33S, having a predetermined length (about 15 mm in the case of the present embodiment) on one side thereof, is about 100 μm, while the thickness for the remainder is about 50 μm (see FIGS. 13 and 14).

The portion having a larger thickness for the positive power feeding terminal 35*a* or the negative power feeding terminal 35*b* may be formed by partially depressing the thermoplastic resin of about 100 μm thick. Besides, for the same purpose, another shorter thermoplastic sheet may be fused with a narrow thermoplastic sheet to be used as a basic sheet. In this a case, a narrow thermoplastic sheet to be used as a base layer sheet and a shorter thermoplastic sheet to be fused together are desired to have the same volume resistivity, but the minor difference in the volume resistivity does not matter.

The absorption layer sheet 34S has a belt form and is about 50 μm thick, about 6 mm wide and about 185 mm (200 mm−15 mm) in full length. The absorption layer sheet 34S has a volume resistivity of about $1.0 \times 10^{10}$ Ω·cm.

Figure 16:
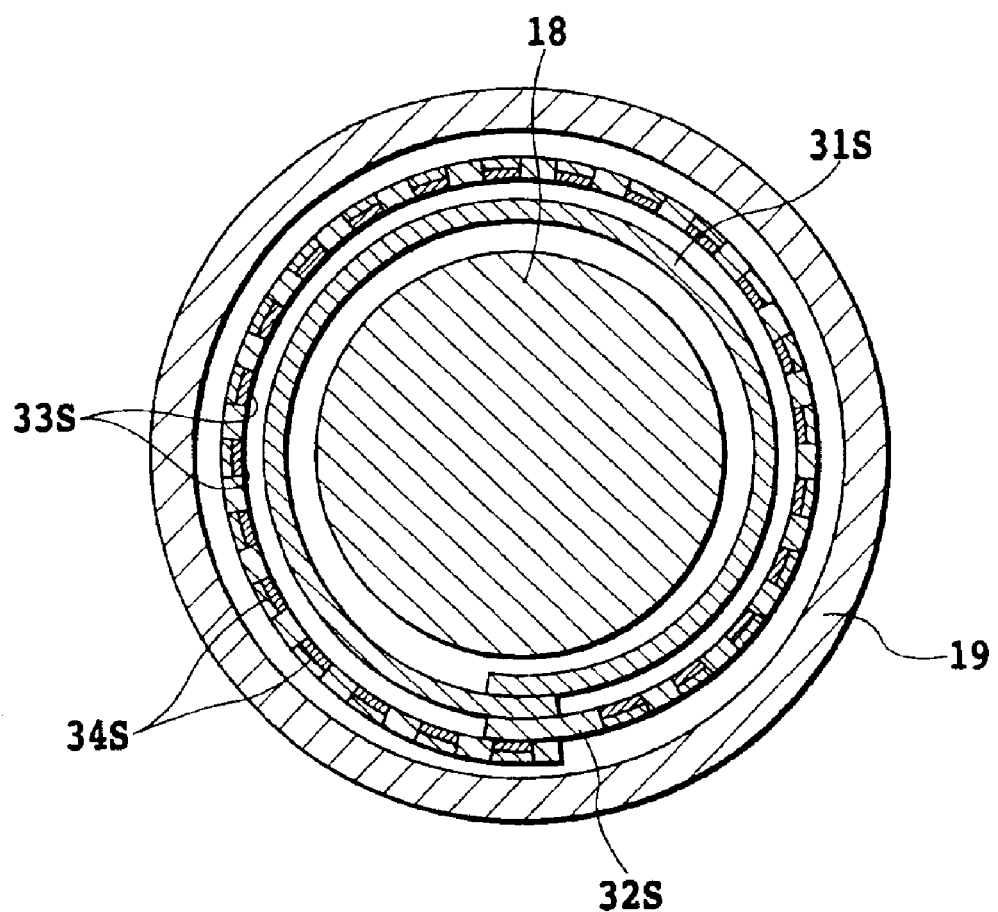
FIG. 16 is a sectional view illustrating a manufacturing process of the absorption belt shown in FIG. 11.

The sheets 31S through 34S having the above-mentioned dimensions and volume resistivities, undergo the heat treatment and cooling treatment by using the columnar member 18 and the cylindrical member 19 (Refer to FIG. 16 for the both). In this way, the sheets 31S through 34S are joined with one another and into an endless form. In the second embodiment, a solid aluminum columnar material having the diameter of 300.0 mm, full length of 300.0 mm and a volume resistivity of $2.4 \times 10^{-5}$ (/° C.) is also used as a columnar member 18. Further, the cylindrical member 19 is a stainless steel cylindrical member having an inside diameter sufficient for permitting the insertion of the columnar member 18. In the present embodiment, used for the cylindrical member 19 is a cylindrical stainless steel member having the inside diameter of 300.8 mm, the outside diameter of 320 mm, the full length of 300 mm and the volume resistivity of $1.5 \times 10^{-5}$ (/° C.).

In the present embodiment, in order for the sheets 31S through 34S to be joined securely and firmly, the thermal expansion coefficient of the columnar member 18 (formed from the aluminum in the present embodiment) is set to a value larger than the thermal expansion coefficient of the cylindrical member 19 (formed from the stainless steel in the present embodiment). Further, a cylindrical member may be substituted for the solid columnar member (i.e., columnar member 18).

To specifically describe the manufacturing process of the absorption belt 30, as illustrated in FIG. 16, first the above-mentioned base layer sheet 31S is wound (about once) on the columnar member 18 until the both ends thereof overlap with each other. Further, the insulating layer sheet 32 is wound (about once) on the base layer sheet, which has previously been wound on the columnar member 18, until the both ends thereof overlaps with each other.

Next, the above-mentioned electrode sheet 33S is fit into the openings 32*a* of the insulating layer sheet 32S by being wound on the insulating layer sheet 32S, which has been wound previously on the columnar member 18, and the positions of a plurality of electrode sheets 33S are set with respect to the insulating layer sheet 32S. In this case, the portions larger in thickness than the remainder of the electrode sheet 33S are fit in the openings 32*a* so as to be alternately disposed on both sides of the longitudinal edges of the insulating layer sheet 32S. Further, the absorption layer sheets 34S in the previously described narrow strip form are fit in the openings 32*a* so that each absorption layer sheet 34S is disposed on the portion of the electrode sheet 33S other than the portion having larger thickness.

FIG. 16 shows an embodiment wherein the overlapped end of the sheet 31S and the overlapped end of the sheet 32S are located at substantially the same place, but the present invention is not limited to this. In other words, the locations of the overlapped portions of the sheets, 31S and 32S, may be set freely. However, when the strict uniformity of the thickness throughout the absorption belt 30 is required, the locations of the overlapped portions may be shifted by a predetermined angle (e.g., by 180°) in order to avoid the concentration of the overlapped portions of the sheets. Further, FIG. 16 shows as if there is a gap between the sheet 31S and the sheet 32S; actually, however, the sheets 31S and 32S are wound overlapping with each other without leaving any substantial gap.

Figure 17:
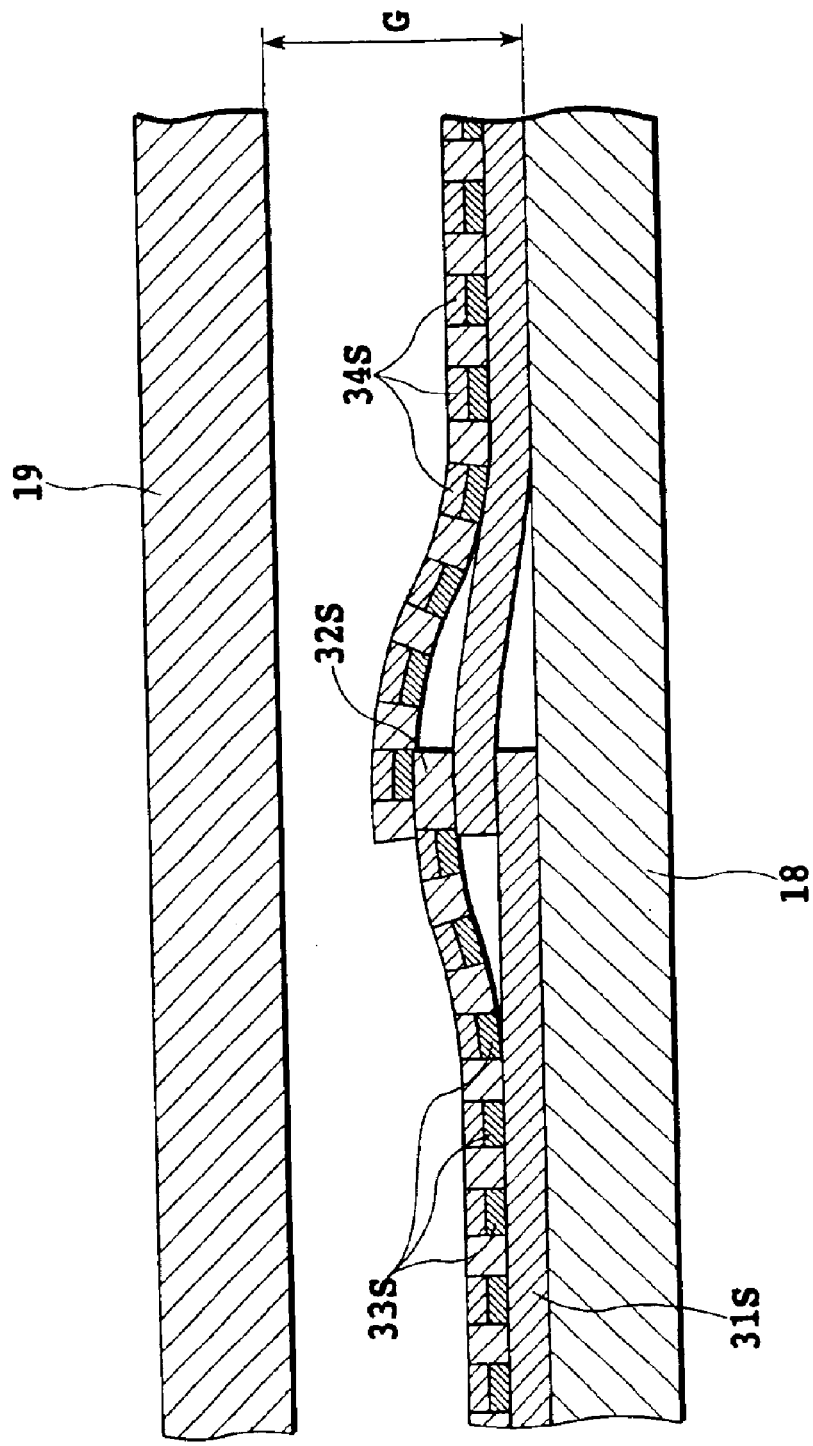
FIG. 17 is a sectional view illustrating the manufacturing process of the absorption belt shown in FIG. 11.

When the sheets 31S and the sheet 34S are wound on the columnar member 18, the sheets 31S and the sheet 34S, substantially wound coaxially, are inserted into the cylindrical member 19. In this way, the insulating layer sheet 32S and the absorption layer sheet 34S are covered with the cylindrical member 19 as shown in FIG. 16. Then, the cylindrical member 19, the sheets 31S through 34S, and the columnar member 18 are placed in the heating apparatus 100 (heating furnace) shown in FIG. 17 for undergoing the heat treatment.

In the present embodiment, as the heat treatment conditions by the heating apparatus 100, the heating temperature is set to 210±5° C., and the heating time is set to 60±1 min. The heating time is decided in consideration of the fusing temperature of the thermoplastic sheets and the degree of thermal deterioration of the film. By undergoing the heating process in the heating apparatus 100 the sheets 31S through 34S change from the state illustrated in FIG. 17 to the state illustrated in FIG. 18. For brevity, in both FIGS. 17 and 18, the details of the curvatures of the columnar member 18, the sheets, 31S through 34S, and the cylindrical member 19 are disregarded.

In the present embodiment, when placed in the heating apparatus 100, the sheets 31S through 34S are placed in the gap between the columnar member 18 and the cylindrical member 19. Further, the initial gap G between the columnar ember 18 and the cylindrical member 19 is about 400 μm (Refer to FIG. 17). Under these conditions, the temperatures of the cylindrical member 19, the sheets 31S through 34S, and the columnar member 18 respectively rise by being heated in the heating apparatus 100.

In this way, the columnar member 18 and the cylindrical member 19 begin to expand according to their respective thermal expansion coefficients, while the sheets 31S through 34S begin to soften as the temperature rises. In this situation, since the thermal expansion coefficient of the aluminum constituting the columnar member 18 is larger than the thermal expansion coefficient of the stainless steel constituting the cylindrical member 19, the columnar member 18 expands more than does the cylindrical member 19. Thus, the gap between the columnar member 18 and the cylindrical member 19 reduces gradually as the heating time progresses.

Figure 18:
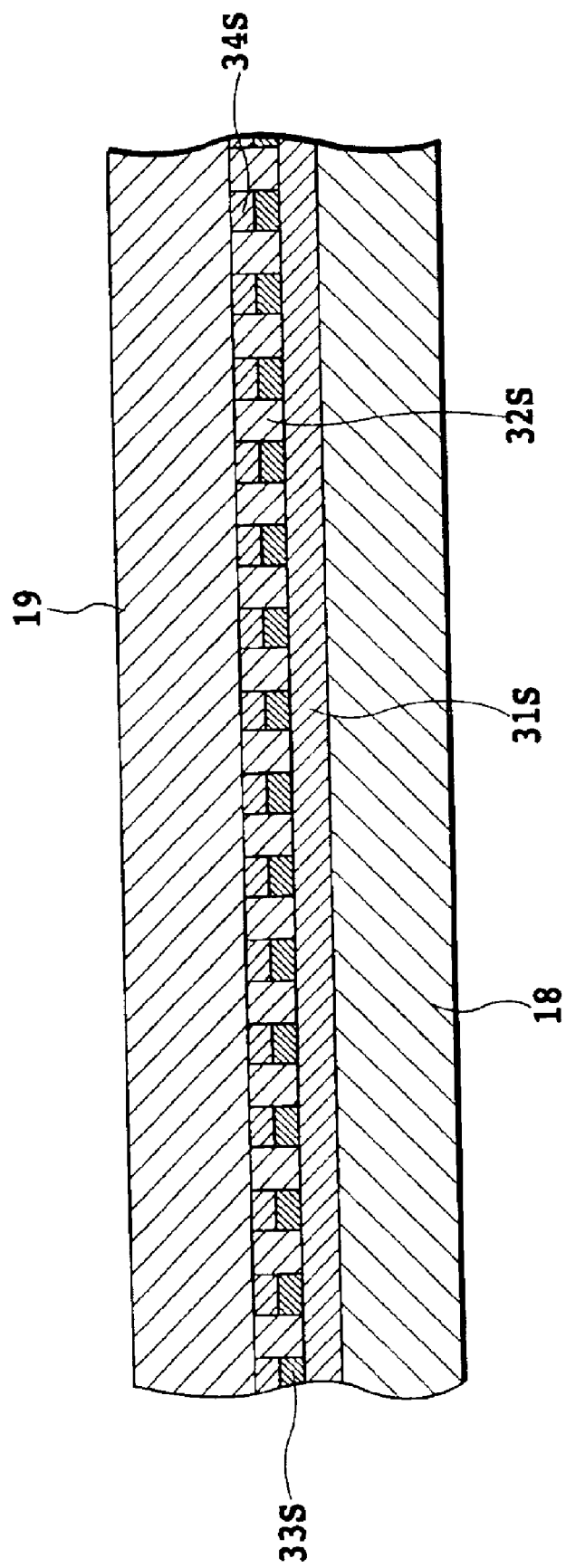
FIG. 18 is a sectional view illustrating the manufacturing process of the absorption belt shown in FIG. 11.

As the gap between the columnar member 18 and the cylindrical member 19 reduces with the progress of the heating, the interposed sheets 31S through 34S soften further. Then, as shown in FIG. 18, as the softening of the sheets 31S through 34S progresses, the overlapped portions of the sheets 31S through 34S are extended along the circumferential surface of the columnar member 18 and fused to join with one another. Since the sheets 31S through 34S are of the same thermoplastic sheet, the sheets fuse to join closely with one another. Consequently, the adjacent sheets among the sheets 31S through 34S and the overlapped portion of the sheet 31S and the sheet 32S are joined. Further, the gap between the columnar member 18 and the cylindrical member 19 finally become substantially equal to the desired thickness of the belt, and the unevenness of the surface resulting from the overlapping of the sheets and the overlapping of the electrode sheet 33S is eliminated (FIG. 18). For this heating process, an induction heating apparatus or a lamp heater may be substituted.

When the above-mentioned heating time (about 60 minutes) is over, the heating is stopped, and the cylindrical member 19, the integrated sheets 31S through 34S and the columnar member 18 undergoes the cooling process. The cooling treatment (cooling process) to be applied to the cylindrical member 19, the integrated sheets 31S through 34S and the columnar member 18 may be left for the natural cooling, but, in the case of the present embodiment, these members are immersed in the refrigerant 102 contained in a cooling tank 101 and cooled rapidly at the rate of 200° C./min. In this way, the cooling time can be reduced substantially.

Then, the cylindrical member 19, the integrated sheets 31S through 34S and the columnar member 18 are taken out of the cooling tank 101 and left in the normal temperature (room temperature) for a certain period of time; then, the integrated sheets 31S through 34S, that is, an absorption belt 30 having the structure as is shown in FIGS. 11 through 14 is taken out. The endless absorption belt 30 obtained through the above described method is free of the unevenness owing to the overlapped portions and have the sheets 31S through 34S joined securely and firmly. And, the thickness throughout the absorption belt 30 is about 150 μm (±10 μm in overlapped portions), almost uniform throughout.

In the absorption belt 30 of the second embodiment produced through the above described method, the absorption layer 34, differing from the insulating layer 32 in the volume resistivity, is laid over each of the plurality of electrodes 33a and 33b. Thus, when the volume resistivity of the absorption layer 34, laid over the electrodes 33a and 33b, is set properly, that is, when the volume resistivity of the absorption layer 34 is set smaller than the volume resistivity of the insulating layer 32 (i.e., $R_{32} \geq R_{31} > R_{34} > R_{33a, 33b}$), the leakage current from each of the electrodes 33a and 33b can be oriented to the absorption layer 34 laid over the electrodes 33a and 33b to thereby substantially increase the resistance between the adjacent electrodes among the electrodes 33a and 33b.

In this way, in the absorption belt 30, the leakage current between the adjacent electrodes having opposite polarities among the electrodes 33a and 33b can be reduced, thereby suppressing the deterioration of the belt caused by the leakage current and the increase in the power consumption while maintaining a good attracting ability of the belt. As a result, the absorption belt 30 acquires a higher reliability and the energy saving ability. Thus, when the present absorption belt 30, as a transfer means for the printing medium P, is incorporated into the ink jet printing apparatus 1, the quality of the image can be improved by enabling the printing medium P to be transferred with higher accurately. Further, the manufacturing process of the present embodiment not only provides the absorption belt 30 that is capable of suppressing the deterioration of the belt caused by the leakage current and the increase in the power consumption while maintaining a good attracting ability but also permits manufacture of the absorption belt 30 at low cost and efficiently.

Further, for the second embodiment of the present invention, absorption belts were experimentally manufactured by setting the volume resistivities of the insulating layer sheet 32S and the absorption layer sheet 34S as given in Table 2. In this experimental case, the voltage of ±1.0 kV is applied to each of the belts manufactured on experimental bases to measure the steady current after the lapse of 10 seconds from a standstill; in other words, the value of the current at the time when the absorption belt is not attracting the printing medium P was measured. Further, in this experiment, the manufacturing conditions, not including the volume resistivities, of the insulating layer sheet 32S and the absorption layer sheet 34S are set equal to those of the previously mentioned case.

TABLE 2

| | Insulation layer | Absorption layer | Value of current |
|---|---|---|---|
| Experimentally manufactured Belt X2 | $1.0 \times 10^{13}$ Ω · cm | $1.0 \times 10^{8}$ Ω · cm | 0.15 μA |
| Experimentally manufactured Belt Y2 | $1.0 \times 10^{15}$ Ω · cm | $1.0 \times 10^{13}$ Ω · cm | Less than 0.1 μA |
| Experimentally manufactured Belt Z2 | $1.0 \times 10^{15}$ Ω · cm | $1.0 \times 10^{11}$ Ω · cm | 0.1 μA |

As seen from the results given in Table 2, all the experimentally manufactured belts show small values of current when not attracting the printing medium, thereby indicating energy saving ability thereof. These results indicate that the volume resistivity of the absorption layer disposed over the electrodes 33a and 33b is within the range of $1.0 \times 10^{8}$ Ω·cm–$1.0 \times 10^{14}$ Ω·cm, while the volume resistivity of the insulating layer 32 is $1.0 \times 10^{13}$ Ω·cm or more, thereby indicating that these results of the experiment are good enough for practical application.

Further, in the method mentioned above, the electrode sheet 33S and the absorption layer sheet 34S are fit in the openings 32a of the insulating layer sheet 32S in the mentioned order, but the present invention is not limited to this. More specifically, the electrode sheet 33S and the absorption layer sheet 34S may be temporarily joined into an integrated laminate form by being thermally fused by means of the hot press before being fit in the openings 32a of the insulating layer sheet 32S. By employing such a process, the positional disagreement among the sheets 32S through 34S can be controlled, thereby contributing not only to the reduction of defective products but also to the production at low cost.

In the embodiment described above, the body of the belt is formed by integrating the base layer sheet 31S and the insulating layer sheet 32S, the both having the same volume resistivity, but the present invention is not limited to this. In other words, a single sheet having a plurality of indents equivalent to the openings 32a of the above-mentioned insulating layer sheet 32S may be used as a sheet material to constitute the belt body.

[The Third Embodiment]

The third embodiment of the present invention will be described in the following. The absorption belt 40 of the third embodiment of the present invention can be incorporated into the ink jet printing apparatus 1 of the first embodiment as a substitute for the belt 20 and is capable of attracting the printing medium P on the absorption surface 40a thereof. When the voltage of ±1.0 kV is applied to the absorption belt 40 incorporated into the ink jet printing apparatus 1, the value of the steady current in the belt, in a condition not attracting the printing medium P and measured after the laps of 10 seconds from a standstill, is about $0.1\,\mu A$, the detection limit. In other words, the energy saving merit can also be enjoyed when the absorption belt 40 of the present embodiment is incorporated into the ink jet printing apparatus 1.

The absorption belt 40 according to the third embodiment includes the insulating layer 41, which is formed from a thin thermoplastic sheet material made from the thermoplastic resin. As shown in FIG. 20, the positive electrodes 42a and the negative electrodes 42b are arranged (embedded) alternately at predetermined intervals in the insulating layer 41. Further, the absorption layer 44 in the form of narrow strip is laid over each of the positive electrodes 42a and each of the negative electrodes 43b. The surface of the insulating layer 41 and the surfaces of the individual absorption layers 44 are made flush with one another, whereby the insulating layer 41 and the absorption layer 44 appear alternately with one another along the longitudinal direction of the belt on the surface of the absorption belt 40, i.e., the absorption surfaces 40a, as shown in FIGS. 19 and 20.

On the other hand, under each of the positive electrodes 44a and each of the negative electrodes 42b, an under-electrode narrow strip layer 45 is accumulated. The back of the insulating layer 41 and the (back) of each under-electrode layer 45 are substantially flush with one another, whereby the insulating layer 41 and the under-electrode layer 45 appear alternately on the back of the absorption belt 40 or the opposite side of the absorption surface 40a along the longitudinal direction of the belt as seen from FIG. 20.

Figure 19:
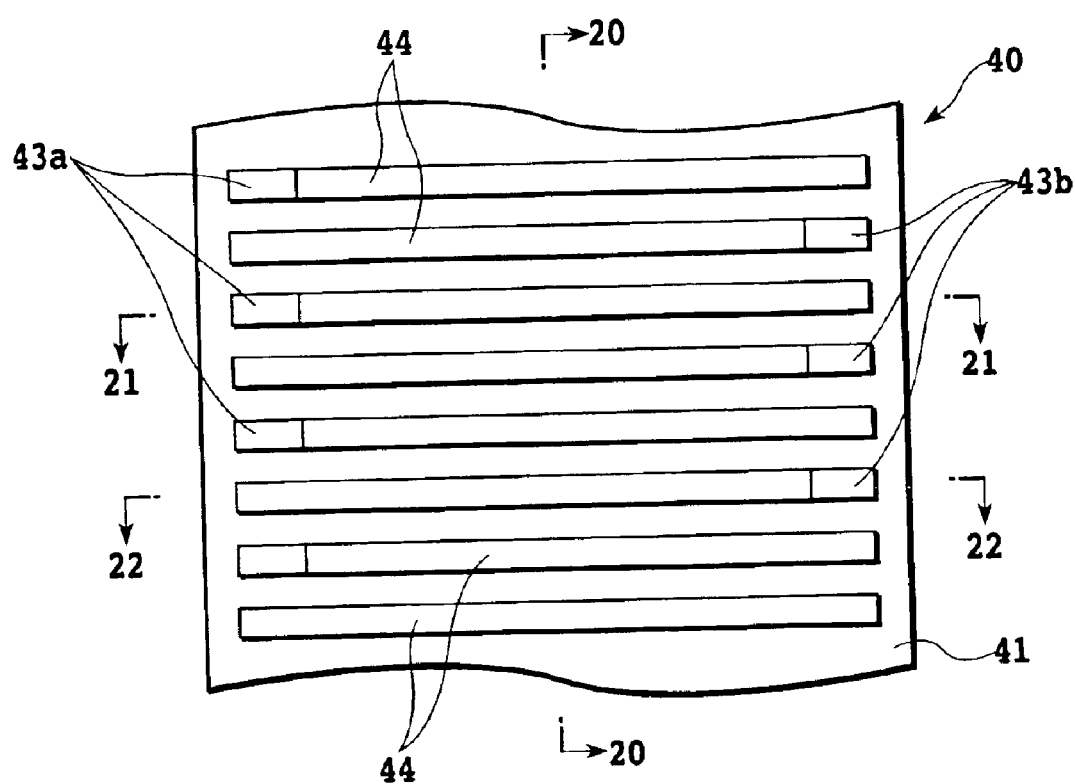
FIG. 19 is a plan illustrating the absorption belt relating to the third embodiment of the present invention.
Figure 20:
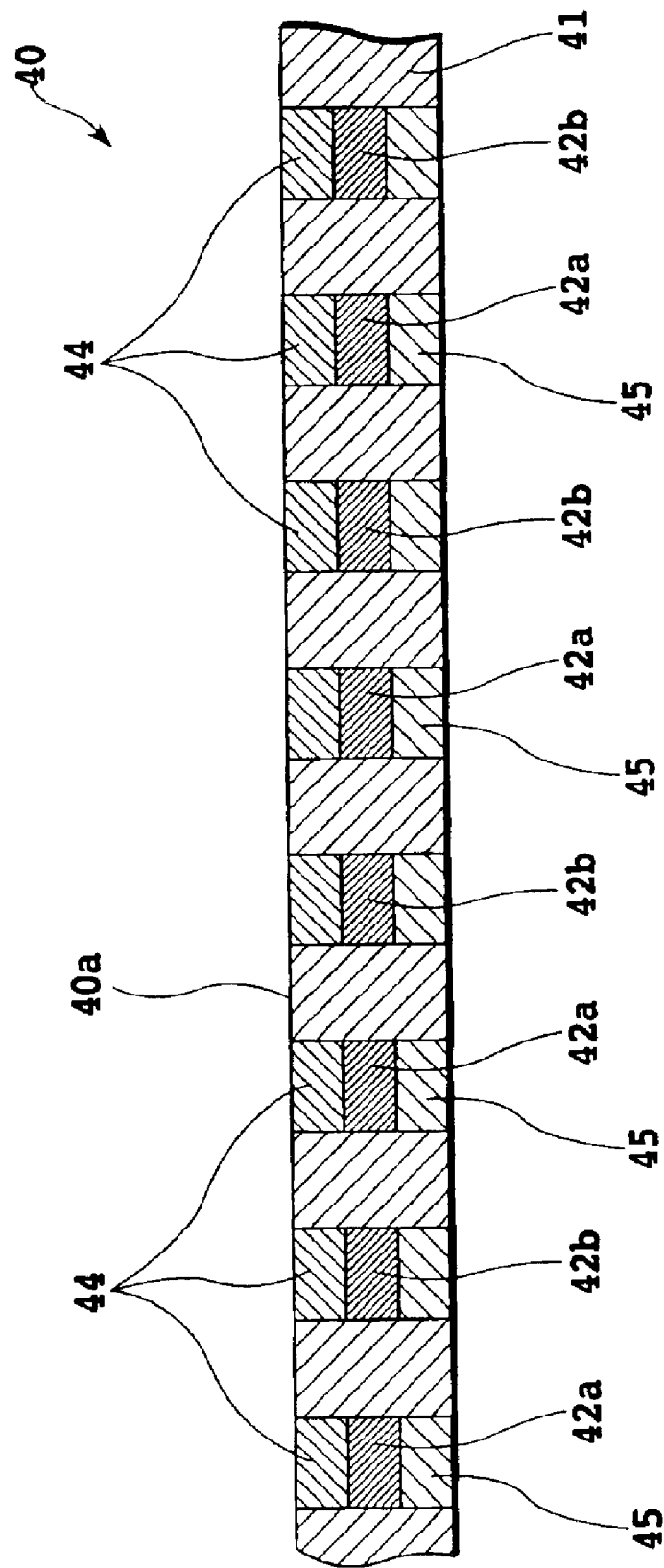
FIG. 20 is a sectional view taken on line 20—20 of FIG. 19.
Figure 21:
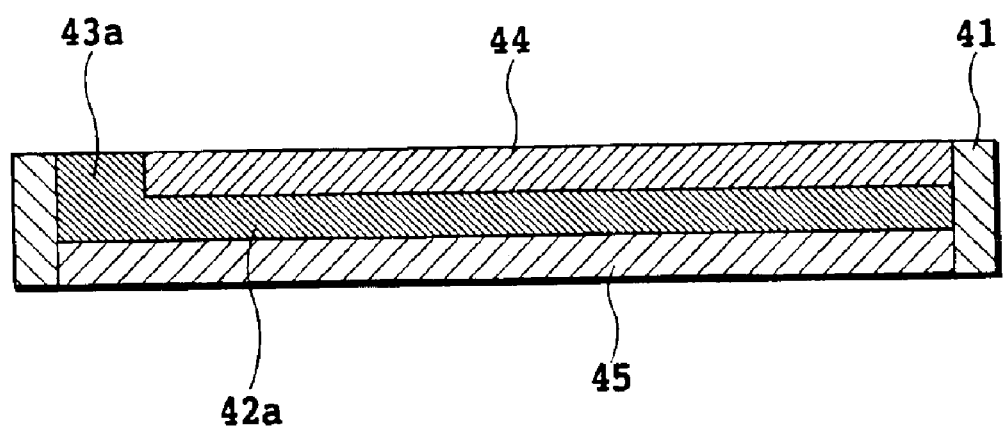
FIG. 21 is a sectional view taken on line 21—21 of FIG. 19.
Figure 22:
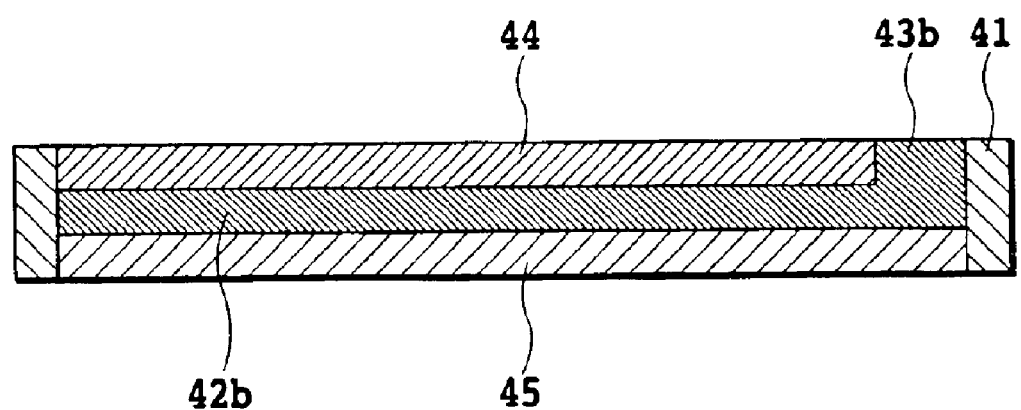
FIG. 22 is a sectional view taken on line 22—22 of FIG. 19.
Figure 23:
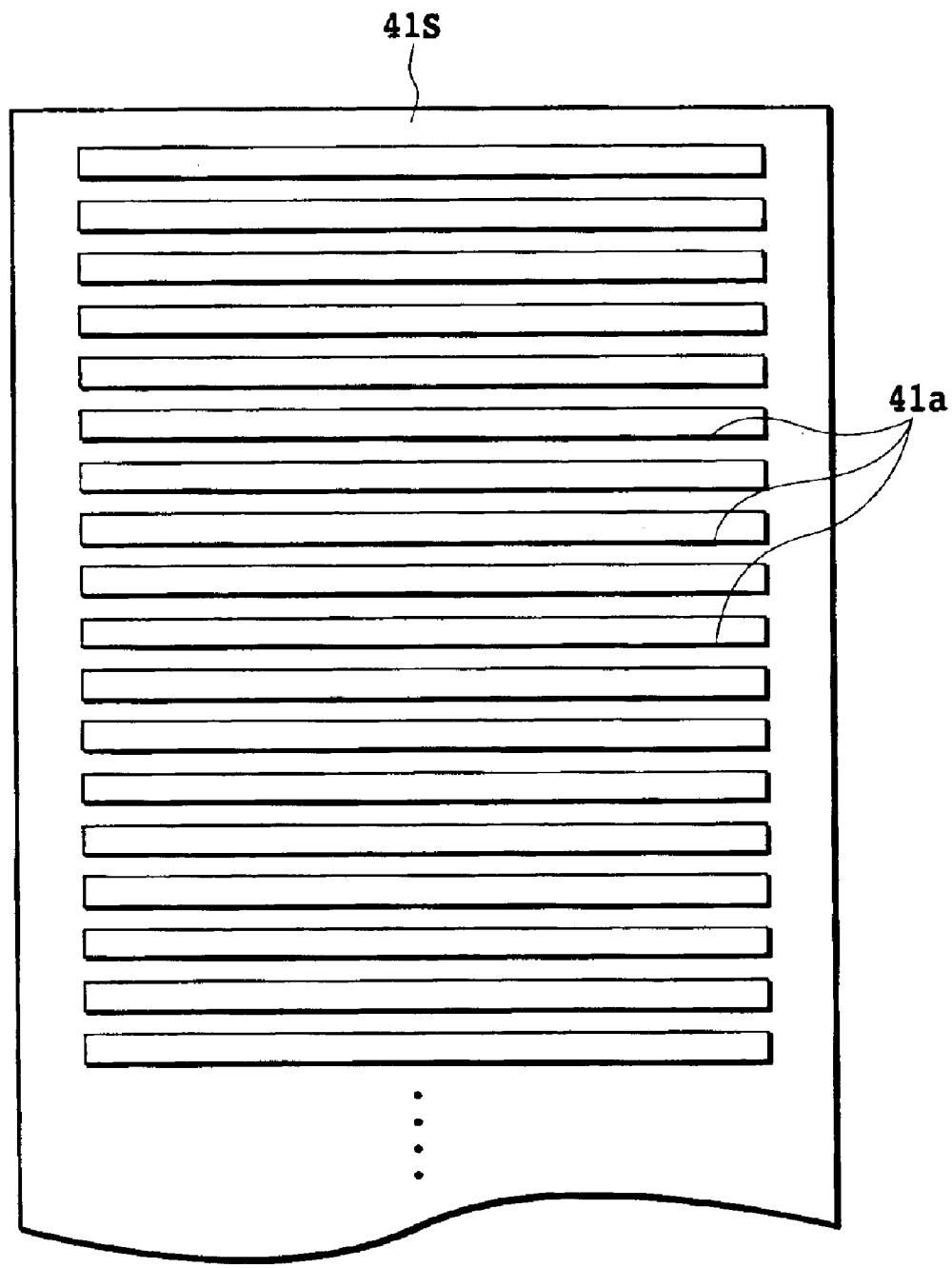
FIG. 23 is a plan illustrating the insulating layer sheet included in the absorption belt shown in FIG. 19.

As seen from FIG. 19, FIGS. 21 and 22, one end, covering a predetermined length of each of the electrodes 42a and 43b, has a larger thickness in order to provide each of the electrodes 42a and 42b with a positive feeding terminal or a negative feeding terminal. Besides, the full length of each absorption layer 44 is made shorter, by the length corresponding to the length of each of the feeding terminal 43a or 43b, than the full length of each of the electrodes 42a and 42b so that each of the positive feeding terminals 43a and the negative feeding terminals 43b can be exposed outside.

Thus, as seen from FIG. 19, the positive feeding terminal 43a of each positive electrode 42a is exposed outside on the side close to one of the longitudinal belt edges (on the side close to the left-hand side edge in FIG. 19). On the other hand, the negative feeding terminal 43b of each negative electrode 42b is exposed outside on the side close to the other side of the longitudinal belt edges (on the side close to the right-hand side edge in FIG. 19). In this way, a positive voltage from the power feeding member 17a (see FIG. 2) can be applied to the positive feeding terminal 43a of each positive electrode 42a, while a negative voltage from the power feeding member 17b (see FIG. 2) can be applied to the negative feeding terminal 43b of each negative electrode 42b. In other words, a positive power and a negative power are supplied alternately from the charged brush unit 16 (see FIG. 1) to each of the electrodes 42a and 42b of the absorption belt 40.

Further, in the absorption belt 40, the volume resistivities of the layers 41, 44 and 45, and the electrodes 42a and 42b are set for the following relationship.

$$R_{41} \geq R_{45} > R_{44} > R_{42a,\,42b},$$

Further, at least the volume resistivity $R_{44}$ of the absorption layer 44 is smaller than the volume resistivity $R_{41}$ of the insulating layer 41. The volume resistivity $R_{45}$ of the under-electrode layer 45 is smaller than the volume resistivity $R_{41}$ of the insulating layer 41 but larger than the volume resistivity $R_{44}$ of the absorption layer 44.

Next, the method for producing the above-mentioned absorption belt 40 will be described. In manufacturing the absorption belt 40, there need to be provided are an insulating layer sheet 41S to constitute the insulating layer 41, an electrode sheet 42S to constitute the positive electrode 42a and the negative electrode 42b, an absorption layer sheet 44S to constitute the absorption layer 44, and an under-electrode layer sheet 45S to constitute the under-electrode layer 45. In the present embodiment, the PVdF resin formed into the film is used for the sheets 41S, 42S, 44S and 45S.

In the present embodiment, the insulating layer sheet 41S is about 150 μm thick, 945 mm in full length (length in longitudinal direction of the belt) and 270 mm wide (the length orthogonal to the longitudinal direction of the belt) The insulating layer sheet 41S has a volume resistivity of $1.0 \times 10^{15}$ Ω·cm. Further, a plurality of oblong openings 41a are provided on the insulating layer sheet 41S extending in the width direction thereof. The openings 41a are arranged along the longitudinal direction of the sheet. Each of the openings 41a is about 6 mm wide (in longitudinal direction of the belt) and about 200 mm in full length (in the direction orthogonal to the longitudinal direction of the belt). Further, the interval between the adjacent openings 41a is set to about 3 mm. The openings 41a are formed by using the punching pattern or the film setting jig (not shown).

The electrode sheet 42S is basically formed to a strip having the width of about 6 mm and the full length of about 200 mm. Further, the electrode sheet 42S has a volume resistivity of about $1.0 \times 10^2$ Ω·cm. However, in the case of the electrode sheet 42S, the thickness of one end portion, covering a predetermined length (about 15 mm in the present embodiment), is made about 100 μm, while the thickness of the remainder is made about 50 μm (see FIGS. 21 and 22).

In order to provide such a portion having a larger thickness to form the positive power feeding terminal 43a or the negative power feeding terminal 43b, a thermoplastic sheet of about 100 μm in thickness maybe partially depressed. Further, a thermoplastic sheet shorter, in full length, than the other narrow thermoplastic sheet to serve as a base may be fused to have them joined with each other. In this case, the narrow thermoplastic sheet to constitute the base layer and the shorter sheet to be fused together are desired to have the same volume resistivities, but minor difference in the volume resistivity is permissible.

The absorption layer sheet 44S is formed into a belt form having the thickness of about 50 μm, the width of about 6 mm and the full length of about 185 mm (200 mm−15 mm). The absorption layer sheet 44S has a volume resistivity of about $1.0 \times 10^{10}$ Ω·cm. The under-electrode layer sheet 45S is also formed into a belt form and is about 50 μm thick, about 6 mm wide and about 20 mm in full length. Further, the under-electrode layer sheet 45S has a volume resistivity of about $1.0 \times 10^{12}$ Ω·cm.

When the sheets 41S through 45S, having the above-mentioned dimensions and volume resistivities are provided, the under-electrode layer sheet 45S, the electrode sheet 42S and the absorption layer sheet 44S are fit in the openings 41a of the insulating layer sheet 41S in the order mentioned, and the adjacent sheets are temporarily fixed with one another.

More specifically, first the insulating layer sheet 41S is placed on a hot press machine (not shown), and a narrow belt-form under-electrode layer sheet 45S is fit into each of the openings 41a of the insulating layer sheet 41S. Then, the electrode sheet 42S is fit in each of the openings 41a of the insulating layer sheet 41S so as to cover the each of the under-electrode layer sheet 45S. In the present embodiment, the electrode sheets 42a are fit in the openings 41a so that the thicker portions of the electrode sheets 42a are arranged alternately on the side of one longitudinal edge side and on the side of the other longitudinal edge side of the insulating layer sheet 41S.

Further, the above-mentioned narrow strip-form absorption layer sheets 44S are fit in the openings 41a, while the absorption layer sheets 44S are arranged on the portion of each electrode sheet 43S other than the thicker portion thereof. After arranging the sheets 41S through 45S in the manner described above, the sheets 41S through 45S undergo the processing by the hot press machine to temporarily fix the adjacent sheets with each other. By inserting the sheets into the openings 41a of the insulating sheet 41S, it is possible to align each of the sheets correctly. Further, since the adjacent sheets are temporarily fixed with each other, the sheets are easily wound around the outer circumferential surface of the columnar member 18 and easily inserted into the cylindrical member 19. Thus, it is possible to improve the yield and a performance of the absorption belt and to cut down on costs of the belt.

Figure 24:
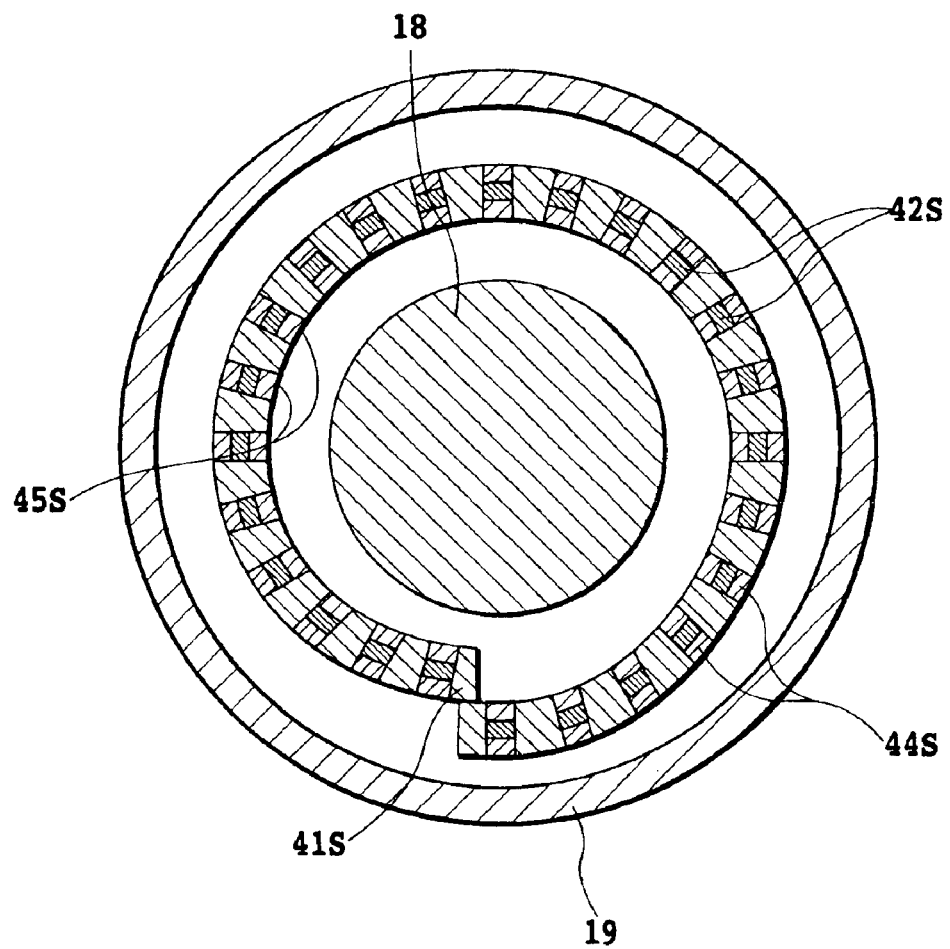
FIG. 24 is a sectional view illustrating the manufacturing process of the absorption belt shown in FIG. 19.

In this way, the insulating layer sheet 41S, to which the electrode sheet 42S, absorption layer sheet 44S and the under electrode layer sheet 45S are temporarily fixed, undergoes the heating process and the cooling process together with the columnar member 18 and the cylindrical member 19 (Refer to FIG. 24). By so doing, the sheets 41S through 45S are joined with one another and formed into an endless body.

In the third embodiment, a solid aluminum columnar member 18 having the diameter of 300.0 mm, the full length of 300.0 mm and the thermal expansion coefficient of $2.4 \times 10^{-5}$ (/° C.) is employed. Further, the cylindrical member 19 has the inside diameter permitting the insertion of the columnar member 18. In the present embodiment, for the cylindrical member 19, a stainless steel cylindrical member having the inside diameter of 300.75 mm, the outside diameter of 320 mm, the full length of 300 mm and the thermal expansion coefficient of $1.5 \times 10^{-5}$ (/° C.) is employed.

In this embodiment, in order to have the sheets 41S through 45S joined securely and firmly with one another to be formed into an endless body, the thermal expansion coefficient of the columnar member 18 (to be made from the aluminum in the case of the present embodiment) is set to be larger than the thermal expansion coefficient of the cylindrical member 19 (to be made from the stainless steel in the case of the present embodiment). Further, a cylindrical member may be substituted for a solid columnar member, i.e., the columnar member 18.

In the present embodiment, the insulating layer sheet 41S, with which the electrode sheet 42S, the absorption layer sheet 44S and the under electrode layer sheet 45S are temporarily fixed, is wound (about once) on the outer circumferential surface of the columnar member 18 so that the both ends of the joined sheets overlap with each other as illustrated in FIG. 24. When the insulating layer sheet 41S wound on the columnar member 18, the columnar member 18 and the sheets 41S through 45S wound thereon are substantially coaxially inserted into the cylindrical member 19. By so doing, the surface of the insulating layer sheet 41S and (the surface of) the absorption layer sheet 44S are covered with the cylindrical member 19 as illustrated in FIG. 2. Then, the cylindrical member 19, the sheets 41S through 45S and the columnar member 18 are placed in the heating apparatus (heating furnace) 100 for undergoing the heating process.

Figure 25:
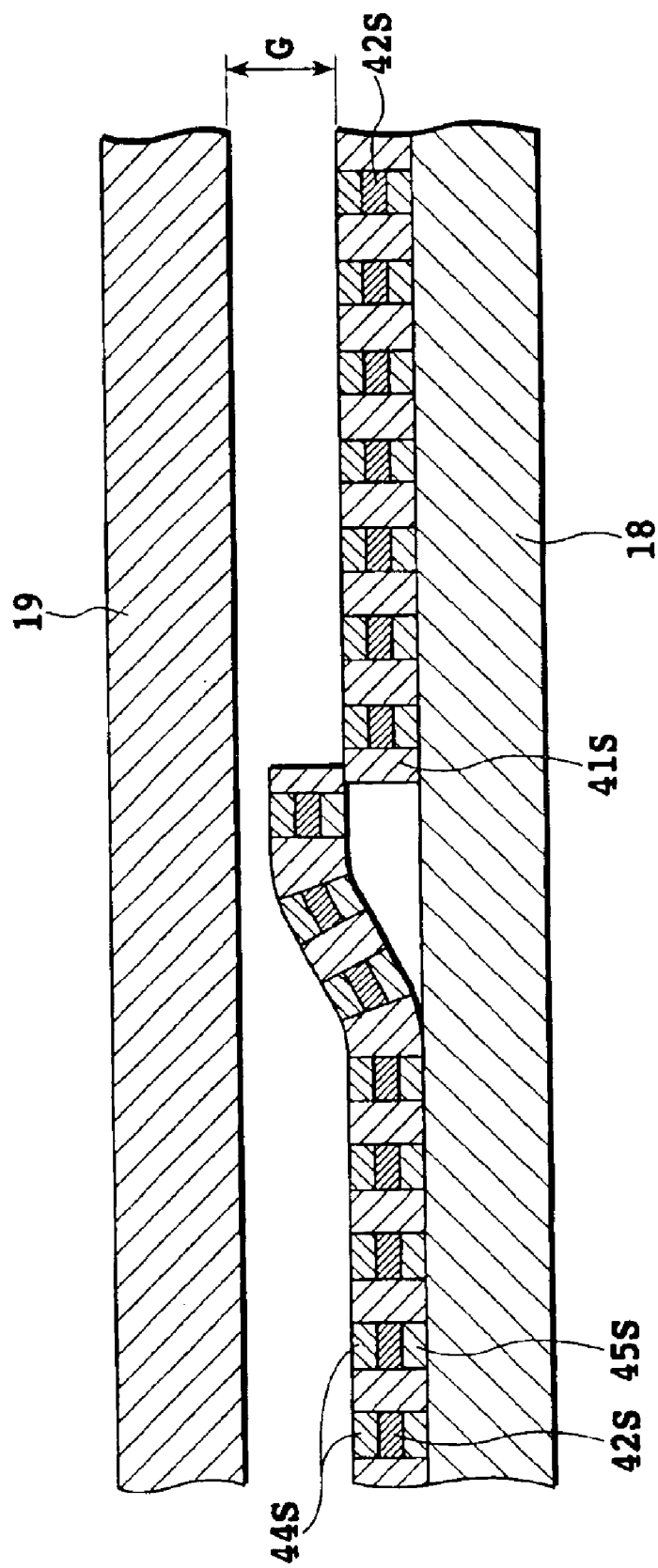
FIG. 25 is a sectional view illustrating the manufacturing process of the absorption belt shown in FIG. 19.
Figure 26:
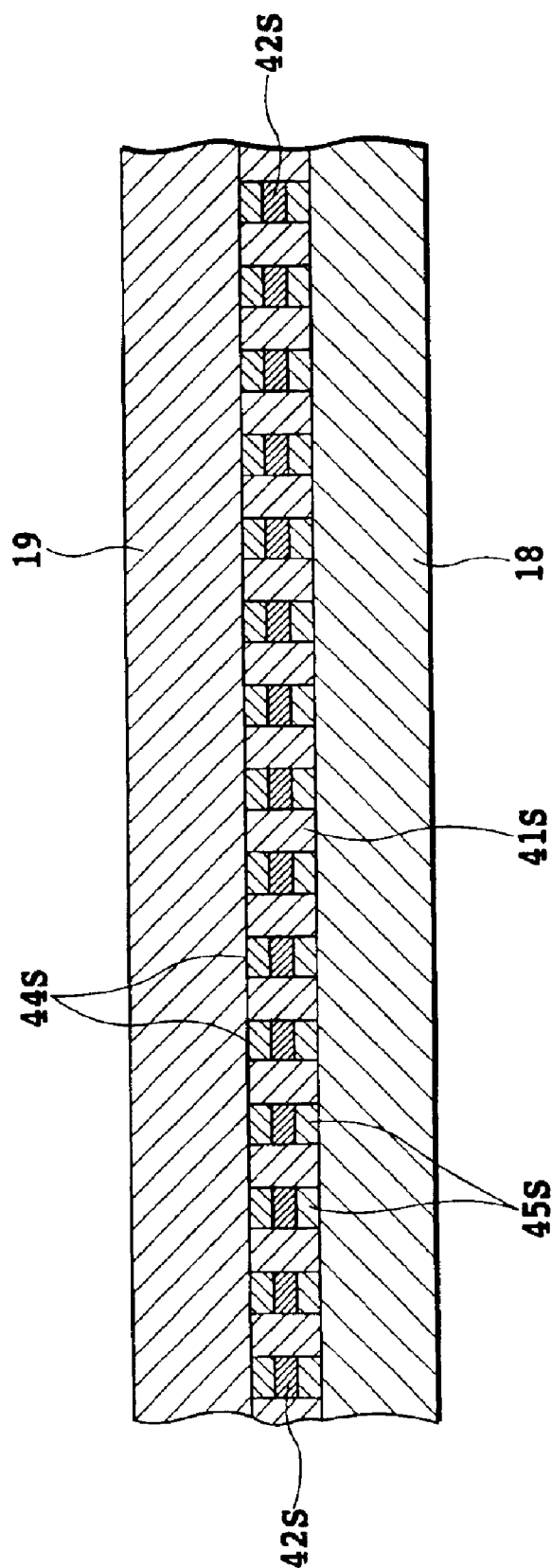
FIG. 26 is a sectional view illustrating the manufacturing process of the absorption belt shown in FIG. 19.

In the present embodiment, the heating conditions in the heating apparatus 100, i.e., the heating temperature is set to 210±5° C., while the heating time is set to 60 min.±1 min. The heating time is decided in consideration of the fusing temperature of the thermoplastic sheet and the thermal deterioration of the film. The conditions of the sheets 41S through 45S vary as illustrated in FIGS. 25 and 26 by undergoing the heating process in the heating apparatus 100. Further, for brevity, the curvatures of the columnar member 18, the sheets, 41S through 45S, and the cylindrical member 19 are disregarded in FIGS. 25 and 26.

In the present embodiment, the sheets 41S through 45S are placed in the gap between the columnar member 18 and the cylindrical member 19 when placed in the heating apparatus 100. Further, the initial gap G (see FIG. 25) between the outer circumferential surface of the columnar member 18 and the inner circumferential surface of the cylindrical member 19 is about 375 μm. Under such a condition, when heated in the heating apparatus 100, the temperatures of the cylindrical member 19, and the sheets 41S through 45S, and the columnar member 18 rise respectively.

In this way, the columnar member 18 and the cylindrical member 19 start to expand respectively according to their respective thermal expansion coefficients, while the sheets 41S through 45S begin to soften as the temperature rises. In this case, as described previously, since the thermal expansion coefficient of the aluminum constituting the columnar member 18 is larger than the thermal expansion coefficient of the stainless steel constituting the cylindrical member 19, the columnar member 18 expands more than does the cylindrical member 19. Thus, the gap between the outer circumferential surface of the columnar member 18 and the inner circumferential surface of the cylindrical member 19 decreases gradually as the heating time progresses.

As the gap between the outer circumferential surface of the columnar member 18 and the inner circumferential surface of the cylindrical member 19 decreases with the progress of the heating, the sheets 41S through 45S interposed between the two members soften further. Then, as shown in FIG. 26, as the softening of the sheets 41S through 45S progress, the overlapped portions of the sheet 41S are not only extended along the outer circumferential surface of the columnar member 18 corresponding to the decrease of the above-mentioned gap G but also fused to join with each other. Then, being made from the same thermoplastic sheet, the sheets 41S through 45S are fused to have closer contact with one another. Consequently, through the heating process, the adjacent sheets among the sheets 41S through 45S and the overlapped portions of the sheet 41S (overlapped portions of the sheet) can be made to join with one another.

Further, in this embodiment, the gap between the columnar member 18 and the cylindrical member 19 becomes substantially equal to the finally desired thickness of the belt, thereby eliminating the unevenness of the surface of the electrode sheet 42S (FIG. 26). In carrying out this heating process, the induction heating apparatus or the lamp heater may be substituted for the heating apparatus 100.

After the lapse of the heating time (about 60 min.) as is described above, the heating is discontinued, and the cylindrical member 19, the integrated sheets 41S through 4S, and the columnar member 18 undergo the cooling process. For the purpose of this cooling treatment (cooling process), the cylindrical member 19, the integrated sheets 41S through 45S and the columnar member 18 may be left to the natural cooling, but, in the case of the present embodiment, these members (and the integrated sheets) are immersed in the cooling medium 102 contained in the cooling tank 101 shown in FIG. 10 and cooled rapidly at the rate of about 200° C./min. By so doing, the cooling time can be reduced largely.

Then, the cylindrical member 19, the integrated sheets 41S through 45S and the columnar member 18 are taken out from the cooling tank 101 and are left in the normal temperature (room temperature) for a predetermined period of time, and this process is followed by the removal of the integrated sheets 41S through 45S, (i.e., the absorption belt 40 having the structure illustrated in FIGS. 19 through 22) from the gap between the columnar member 18 and the cylindrical member 19. The endless absorption belt 40 obtained by the method described above was not only made free of the unevenness of the surface resulting from the presence of the overlapped portions but also was made to provide the sheets 41S through 45S joined securely and firmly with one another. Further, it was found that the present embodiment is capable of providing a substantially uniform thickness such as about 150 μm (±10 μm at the overlapped portion) throughout the absorption belt 40.

In the absorption belt 40 of the third embodiment described above, the under-electrode layer 45, having a volume resistivity larger than that of the insulating layer 41 but smaller than that of the absorption layer 44, is laid under each of the electrodes, 42a and 42b, thereby enabling the absorption belt 40 to exert its attractive force on the opposite side of the absorption surface 40a. Thus, in using the absorption belt 40 as a transfer means for the printing medium P, when the member such as the platen 9 (see FIG. 1) is arranged opposing to the each under-electrode layer 45, the attitude of the absorption belt 40 or the transfer condition of the printing medium P can be kept proper and stable.

Further, in the absorption belt 40, the absorption layer 44, having a volume resistivity smaller than that of the insulating layer 41, is disposed over each of the plurality of electrodes 42a and 42b, arranged alternately by the positive and negative polarities, while the under-electrode layer 45, having a volume resistivity smaller than that of the insulating layer 41 but larger than that of the absorption layer 44, is laid under each of the electrodes 42a and 42b. Thus, the leakage current from each of the electrodes 42a and 42b is oriented to the absorption layer 44 on each of the electrodes, 42a and 42b, and also to the under-electrode layer 45 of the electrodes 42a and 42b, to thereby substantially increase the value of the resistance between adjacent electrodes among the electrodes 42a and 42b. By so doing, in the absorption belt 40, the leakage current between the adjacent electrodes, having opposite polarities, is reduced, there by suppressing the deterioration of the belt caused by the leakage current and the increase of the power consumption while maintaining a good attracting ability.

Thus, with the absorption belt 40, not only the reliability of the belt itself can be improved but also the energy consumption can be reduced while maintaining the performance and the operation of the belt itself at higher levels. In other words, with the absorption belt 40, not only the reliability of the absorption belt itself can be improved but also the energy consumption can be reduced. Further, when the present absorption belt 40 as a means for transfer is incorporated into the ink jet printing apparatus 1, the quality of the printed image can be improved by having the printing medium P transferred with higher accuracy. More specifically, as mentioned previously, when the member such as the platen is placed opposing to each of the under-electrode layers 45, the absorption belt 40 or the transfer condition of the printing medium P can be kept in so desirable and stable condition that the distances between each of the print heads 10K, 10C, 10M and 10Y, and the printing medium P can be reduced to improve the quality of the printed image.

Further, according to the method of the present embodiment, the absorption belt 40, having a high reliability and an energy saving ability can be manufactured at low cost, with ease and efficiently, while fulfilling the requirements for a good attracting ability and the requirements for suppressing the deterioration of the belt caused by the leakage current and the increase in the power consumption.

Further, some absorption belts are experimentally manufactured according to the method of the above-mentioned third embodiment with the volume resistivities of the absorption layer sheet 44S and the under-electrode layer 45S set as indicated in Table 3. Then, the voltage of ±1.0 kV is applied to each experimentally manufactured belt to measure the value of steady current in the belt after the lapse of 10 seconds from a standstill, i.e., the value of the current when not attracting the printing medium P, is measured. Further, the manufacturing conditions, other than the volume resistivities of the absorption layer sheet 44S and the under-electrode layer sheet 45S, are set to the same values as are mentioned above.

TABLE 3

| | Under-electrode layer | Absorption layer | Value of current |
|---|---|---|---|
| Experimentally manufactured belt X3 | $1.0 \times 10^{12}$ Ω·cm | $1.0 \times 10^{8}$ Ω·cm | 0.15 μA |
| Experimentally manufactured belt Y3 | $1.0 \times 10^{13}$ Ω·cm | $1.0 \times 10^{11}$ Ω·cm | Less than 0.1 μA |
| Experimentally manufactured belt Z3 | $1.0 \times 10^{14}$ Ω·cm | $1.0 \times 10^{12}$ Ω·cm | Less than 0.1 μA |

As seen from the results given in Table 3, all the experimentally manufactured belts show small values of the current when not attracting the printing medium proving to have the energy saving ability. These results indicate that the volume resistivity of the absorption layer to be laid on each of the electrodes 42a and 42b is within the range of $1.0 \times 10^{8}$ Ω·cm–$1.0 \times 10^{12}$ Ω·cm, while the volume resistivity of the under-electrode layer 45 to be laid under each of the electrodes 42a and 42b is within the range of $1.0 \times 10^{10}$ Ω·cm–$1.0 \times 10^{14}$ Ω·cm, and that a satisfactory result for practical use can be obtained when the volume resistivity of the absorption layer 41 is $1.0 \times 10^{13}$ Ω·cm or more.

Further, in the case of the present embodiment, the transfer test for the printing medium P was conducted by using the platen 9 including a ABS resin body and a PVdF resin sheet having a volume resistivity of 1×10⁻⁹ Ω·cm. During this test both the absorption belt 40 and the experimentally manufactured belts X3 through Z3 have proved to have a good attracting ability respectively, and no fluttering (of the belts) during the transfer operation was not observed. Thus, when the absorption belt 40 according to the present embodiment incorporated into the ink jet printing apparatus 1, it possible to use the resin platen 9.

Further, in the above-mentioned manufacturing process, the under-electrode sheet 45S, the electrode sheet 42S and the absorption layer sheet 44S are fit in the openings 41a of the insulating layer sheet 41S in the order mentioned, but the present invention is not limited to this. More specifically, the under-electrode layer sheet 45S, the electrode sheet 42S and the absorption layer sheet 44S may be integrated into a single laminate either by the thermal fusion by heating or temporarily fixed with one another by the hot press prior to the fitting in the openings 41a of the insulating layer sheet 41S. The employment of such a process permits the contribution to the suppression of the positional disagreement among the sheets 41S through 45S, the resulting reduction of defective products and the manufacture of the absorption belt 40 at lower cost.

[The Fourth Embodiment]

Figure 27:
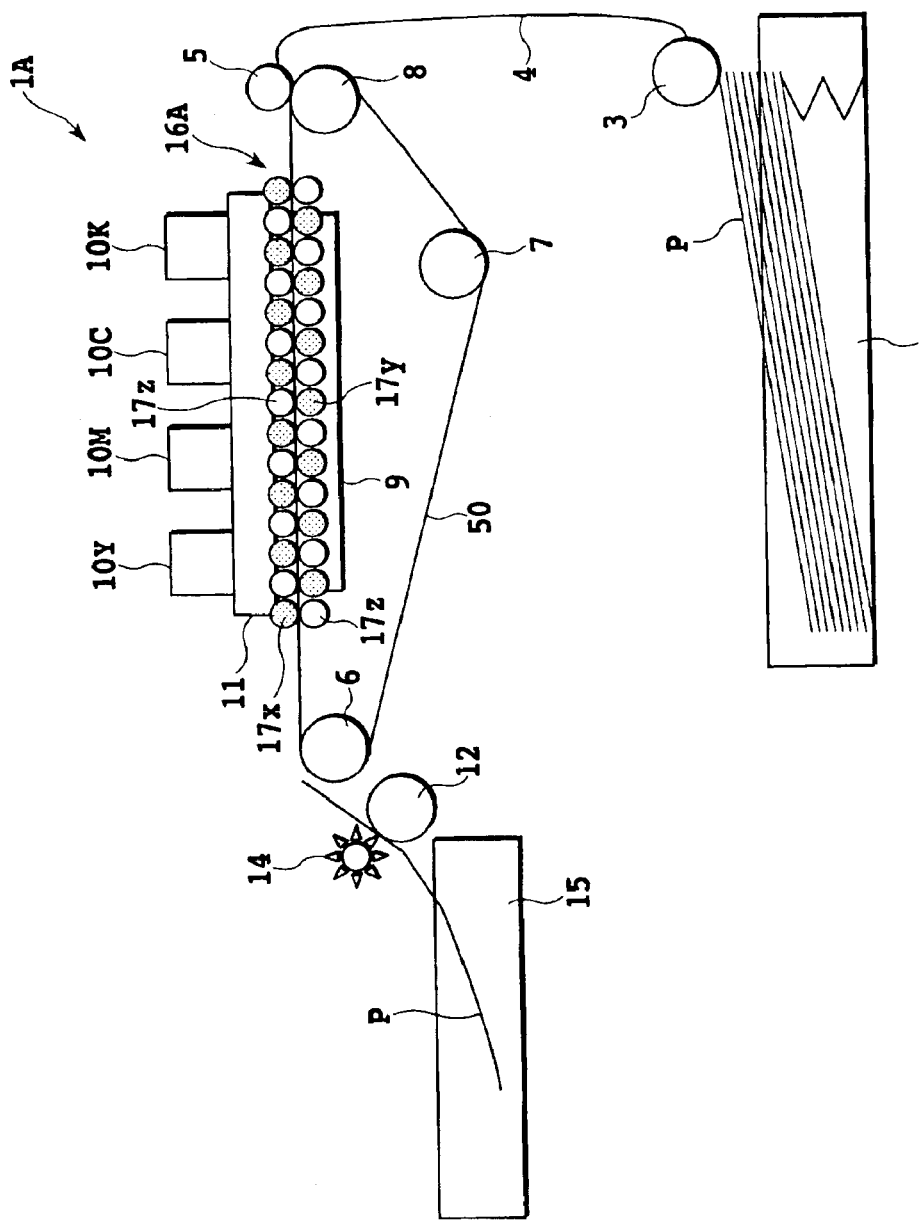
FIG. 27 is a schematic diagram illustrating the image forming apparatus relating to the fourth embodiment of the present invention.
Figure 28:
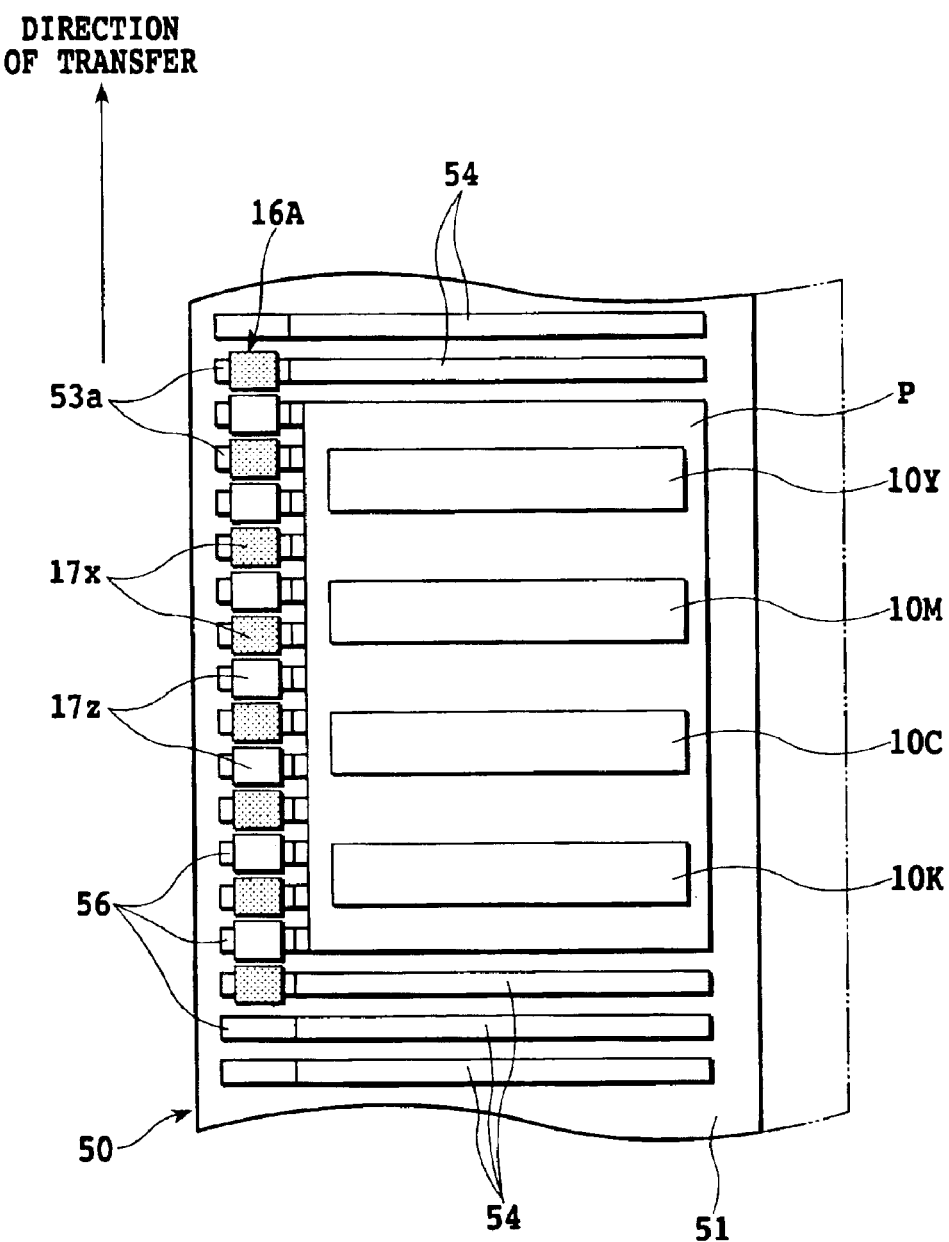
FIG. 28 is an enlarged view of the image forming apparatus shown in FIG. 27.
Figure 29:
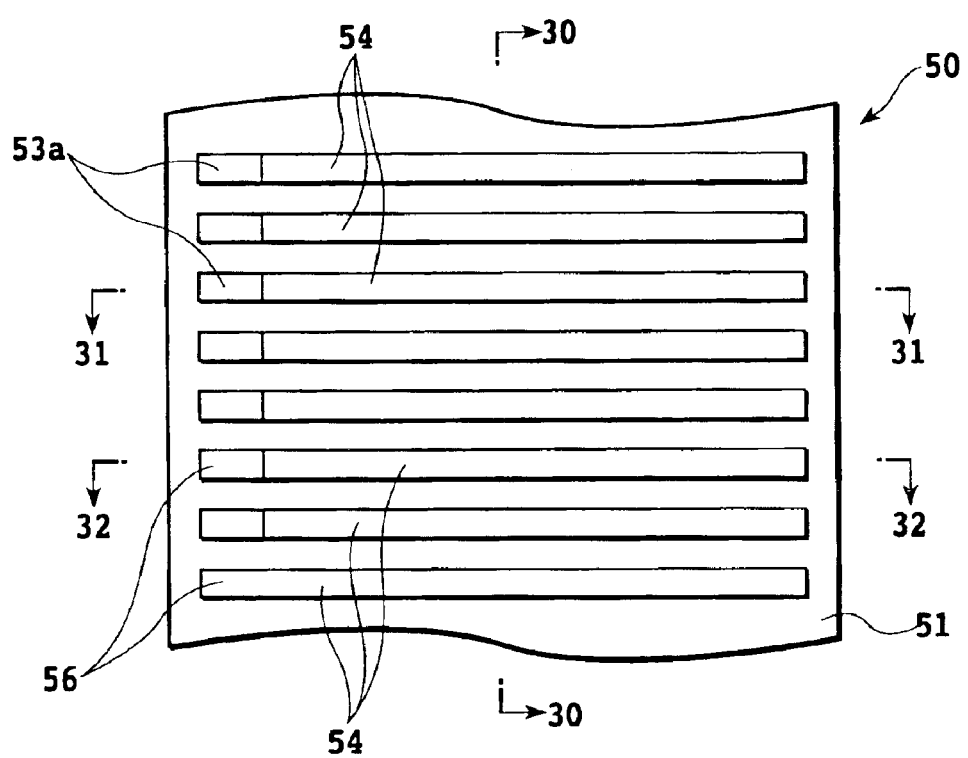
FIG. 29 is a plan of the absorption belt incorporated into the image forming apparatus shown in FIG. 27.

FIGS. 27 and 28 are schematic diagrams illustrating an image forming apparatus relating to the fourth embodiment of the present invention. The same elements as those described with reference to the above-mentioned first embodiment are denoted by the same numerals and any overlapping description will be omitted.

The ink jet printing apparatus shown in FIGS. 27 and 28 includes an absorption belt 50 according to the fourth embodiment of the present invention and a charged brush unit 16A for applying a high voltage to the absorption belt 50 to generate a static electrical force thereon. The charged brush unit 16A is placed on one side of each of the print heads 10K, 10C, 10M and 10Y (head holder 11) and includes a plurality of feed rollers 17x placed above the absorption belt 50, a plurality of feed rollers 17y placed under the absorption belt, and the grounding member (not shown). In the present embodiment, the feed rollers 17x and 17y are formed from the metal material and have the diameter of about 2 mm respectively. Each of the feed rollers 17x may be subjected, for example, to the positive voltage, whereas each of the feed rollers 17y maybe subjected, for example, to the negative voltage or the voltage having the polarity opposite the polarity of the voltage applied to the feed rollers 17x, and the grounding member is grounded.

Further, interposed between adjacent feed rollers 17x and between adjacent feed rollers 17y are insulation rollers 17z formed from the resin such as the polyacetals or the like. The feed rollers 17x are arranged opposing to the insulation rollers 17z, which are arranged under the absorption belt 50, whereas the feed rollers 17y are arranged opposing to the insulation rollers 17z, which are arranged above the absorption belt 50. When such an arrangement is employed, should the absorption belt 50 be broken, the shorting between the feed roller 17x charged positively and the feed roller 17y charged negatively can be prevented without fail even when the both come into contact with each other.

In the ink jet printing apparatus 1A configured as described above, an image is printed by the print heads 10K, 10C, 10M and 10Y while the printing medium P is attracted by and transferred by the absorption belt 50, which is provided with the power by the charged brush unit 16A. Even when the voltage of ±0.3–3.0 kV (±0.8 kV in the case of the present embodiment) is applied to the absorption belt 50 of this embodiment, the value of the steady current after the laps of 10 seconds from a standstill or the value of the current when the absorption belt is not attracting the printing medium P is about 0.1 μA, the detection limit. In other words, the ink jet printing apparatus 1A incorporating the absorption belt 50 according to the present embodiment also shows a high energy saving ability.

Figure 30:
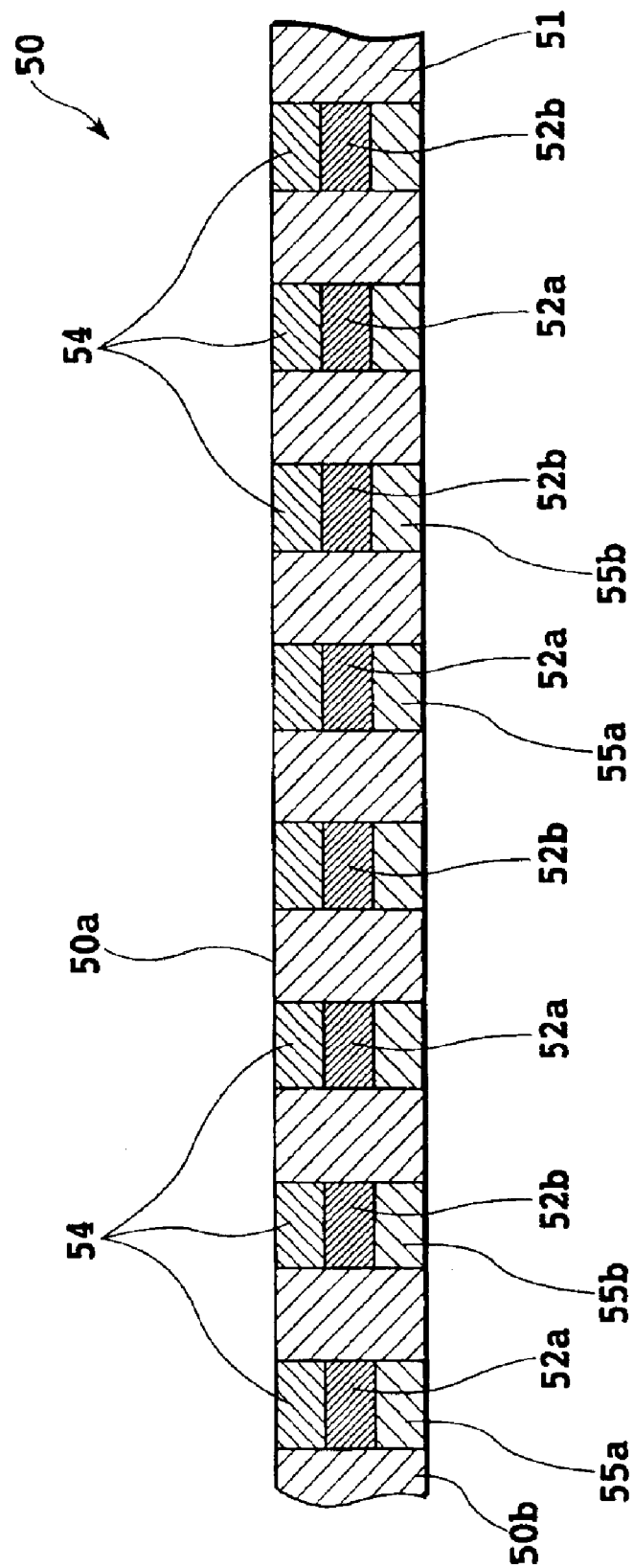
FIG. 30 is a sectional view taken on line 30—30 of FIG. 29.
Figure 31:
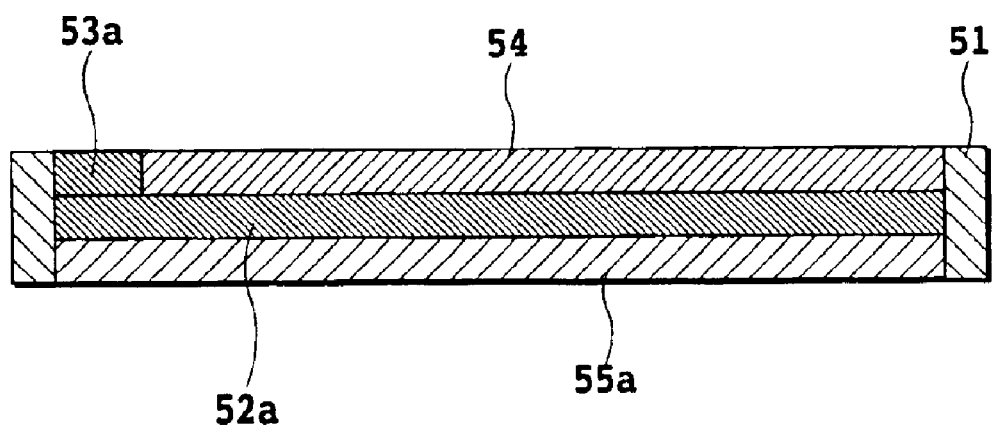
FIG. 31 is a sectional view taken on line 31—31 of FIG. 29.
Figure 32:
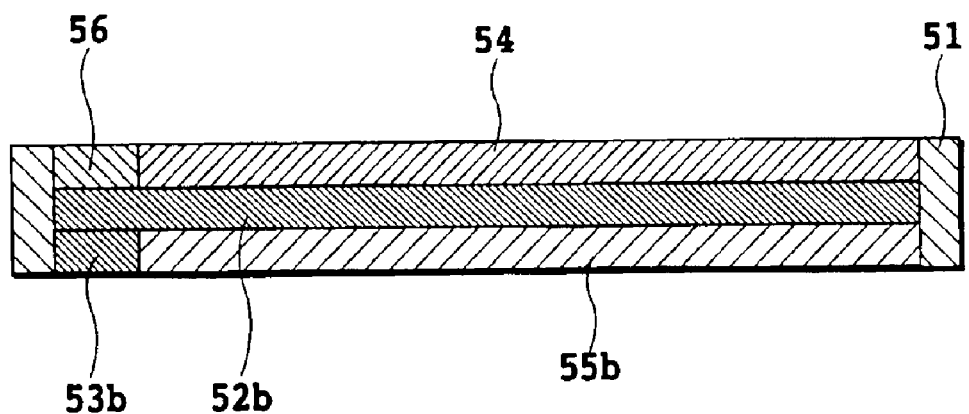
FIG. 32 is a sectional view taken on line 32—32 of FIG. 29.

The absorption belt 50 according to the fourth embodiment applied to the above-mentioned ink jet printing apparatus 1A includes an insulating layer 51 formed from the thin thermoplastic sheet material made from the thermoplastic resin as illustrated in FIG. 30 through FIG. 32. Arranged (embedded) alternately at predetermined intervals with respect to the insulating layer 51 are the positive electrodes 52a and the negative electrodes 52b as shown in FIG. 31.

As seen from FIGS. 31 and 32, one end, covering a predetermined length, of each of the electrodes 52a and electrodes 52b is made to have a larger thickness than that of the remainder to thereby form the positive feeding terminal layer 53a or the negative feeding terminal layer 53b. Each of the feeding terminal layers 53a and 53b is placed on the side of one of the longitudinal edges of the belt (see FIG. 28, FIG. 31 through FIG. 32). Then, the feeding terminal layer 53a, for applying the positive voltage, may extend towards either the surface or the back of the belt (i.e., towards the absorption surface 50a in this case) (see FIG. 30), whereas the feeding terminal layer 53b, for applying the negative voltage, may also extend towards the either surface (i.e., towards the back 50b in this case) of the belt (see FIG. 30).

In the absorption belt 50 according to the fourth embodiment, as shown in FIG. 31, a narrow strip-form absorption layer 54, whose full length is shorter by the length of the positive feeding terminal layer 53a, is laid on the portion of each positive electrode 52a not including the positive feeding terminal layer 53a. Further, under each positive electrode 52a there is laid the narrow strip-form under-electrode layer 55a whose length is substantially equal to that of the positive electrode 52a.

On the other hand, as shown in FIG. 32, laid on each negative electrode 52b are the second insulating layer 56, having the length substantially equal to that of the negative feeding terminal layer 53b, and the narrow strip-form absorption layer 54, whose full length is shorter, by the length of the second insulating layer 56, than each negative electrode 52b. The second insulating layer 56 is placed on the opposite side (or the back side on the basis of the direction along the thickness) of the negative feeding terminal layer 53b. Further, under the down side of each negative electrode 52b (the thinner portion), not including the negative feeding terminal layer 53b, there is laid the narrow-strip form under-electrode layer 55b, whose full length is shorter by the length of the negative feeding terminal layer 53b than each negative electrode 52b. Further, in this embodiment, the under-electrode layer 55a and the under-electrode layer 55b are formed from the same thermoplastic sheet.

The surface of the insulating layer 51 and the surface of each absorption layer 54 are made substantially flush with each other, whereby, as shown in FIGS. 30 and 31, the insulating layer 51 and the absorption layer 54 appear alternately on the surface of the absorption belt 50, i.e., the absorption surface 50a, along the longitudinal direction of the belt. Further, on the absorption surface 50a of the absorption belt 50, along one of the longitudinal edges of the belt (on the left-hand side edge in FIG. 28, FIGS. 31 and 32) the surfaces of the positive feeding terminal layers 53a are exposed at predetermined intervals. On the other hand, the back of the insulating layer 51 and the back of each of the under-electrode layers 55a and 55b are made substantially flush with each other, so that the insulating layer 51 and the under-electrode layer 55a or 55b appear alternately on the back 50b of the absorption belt 50 along the longitudinal direction of the belt. Further, on the back 50b of the absorption belt 50, the surfaces of the negative feeding terminals 53b are exposed alternately at predetermined intervals on one of the longitudinal edge sides of the belt (the left-hand edge side in FIG. 28, FIGS. 31 and 32).

In the absorption belt 50, it becomes possible not only to apply the positive voltage to each of the positive feeding terminals 53a of the positive electrodes 52a from the power feed rollers 17x (see FIGS. 27 and 28) arranged on the surface of the absorption belt 50 but also to apply the negative voltage to each of the negative feeding terminals 53b of the negative electrodes 52b from the power feed rollers 17y (see FIGS. 27 and 28) arranged on the back of the absorption belt 50. In other words, the positive power and the negative power are supplied alternately to the electrodes 52a and 52b of the absorption belt 50 from charged brush unit 16A (see FIG. 27).

Further, in the absorption belt 50, the volume resistivities of the layers 51, 54, 55a, 55b and the electrodes 52a and 52b are set for the relationship.

$$R_{51} \geq R_{55a, 55b} > R_{54} > R_{52a, 52b}$$

Further, at least the volume resistivity $R_{54}$ of the absorption layer 54 is smaller than the volume resistivity $R_{51}$ of the insulating layer 51, while the volume resistivity $R_{55}$ of the under-electrode layers 55a and 55b is smaller than the volume resistivity $R_{51}$ of the insulating layer 51 but larger than the volume resistivity $R_{54}$ of the absorption layer 54. The volume resistivity of the second insulating layer 56 is set, for instance, for $R_{51} \geq R_{56} = R_{55}$.

Next, the method for producing above-mentioned absorption belt 50 will be described. In manufacturing the absorption belt 50, there first need to be provided are an insulating layer sheet 51S to constitute the insulating layer 51, an electrode sheet 52S to constitute the positive electrode 52a and the negative electrode 52b, a feeding terminal layer sheet 53S to constitute the positive feeding terminal layer 53a of the positive electrode 52a and a negative feeding terminal layer 53b of the negative electrode 52b, an absorption layer sheet 54S to constitute the absorption layer 54, an under-electrode sheets 55Sa and 55Sb to constitute the under-electrode layers 55a and 55b, and a second insulating layer sheet 56S to constitute the second insulating layer 56. In this embodiment, the PVdF resin formed into the film is used for each of the sheets 51S through 56S.

Figure 33:
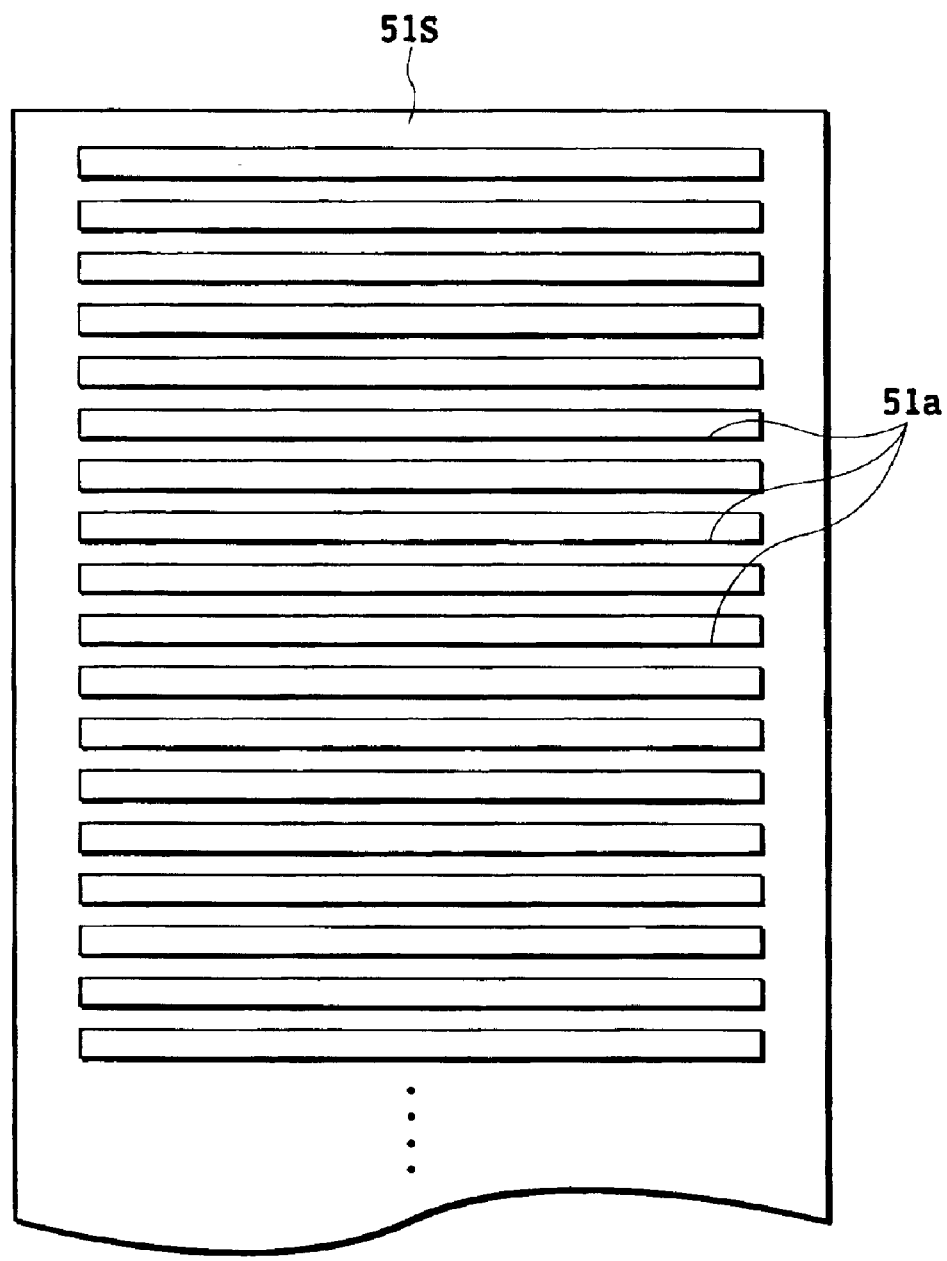
FIG. 33 is a plan illustrating the insulating layer sheet included in the absorption belt shown in FIG. 29.

In the present embodiment, the insulating layer sheet 51S is 150 μm thick, 945 mm in full length (as the length in the longitudinal direction of the belt) and 240 mm wide (as length orthogonal to the longitudinal direction of the belt), while the volume resistivity ($R_{51}$) thereof is about $1.0 \times 10^{15}$ Ω·cm. Further, as shown in FIG. 33, the insulating layer sheet 51S is provided with a plurality of narrow oblong openings (78 openings in the case of the present embodiment), which extend in the direction of the width (of the belt). The openings 51a are arranged so that the both ends thereof are aligned respectively along the longitudinal direction of the sheet. Each of the openings 51a is about 8 mm wide (as the length in the longitudinal direction of the belt) and about 200 mm in full length (as the length in the direction of the width of the belt). Further, the distance between the adjacent openings 51a is set to about 4 mm.

Each of the openings 51a is formed by using a punching machine or a film setting jig (not shown).

The electrode sheet 52S is about 50 μm thick, about 350 mm in full length and about 220 mm wide, while the volume resistivity ($R_{52}$) thereof is about $1.0 \times 10^2$ Ω·cm. Further, the feeding terminal layer sheet 53S is about 50 μm thick, about 350 mm in full length and about 10 mm wide, while the volume resistivity thereof is similar to that of the electrode sheet 52S, i.e., about $1.0 \times 10^2$ Ω·cm. Further, the absorption layer sheet 54S is about 50 μm thick, about 350 mm in full length and about 10 mm wide, while the volume resistivity ($R_{54}$) thereof is about $1.0 \times 10^{11}$ Ω·cm.

The under-electrode layer sheet 55Sa is about 50 μm thick, about 350 mm in full length and about 220 mm wide, while the volume resistivity ($R_{55}$) thereof is about $1.0 \times 10^{14}$ Ω·cm. On the other hand, the under-electrode layer sheet 55Sb is about 50 μm thick, about 350 mm in full length and about 210 mm wide, whereas the volume resistivity ($R_{55}$) thereof is about $1.0 \times 10^{14}$ Ω·cm. Furthermore, the second insulating layer sheet 56S is about 50 μm thick, about 350 mm in full length and about 10 mm wide, while the volume resistivity thereof is about $1.0 \times 10^{14}$ Ω·cm.

Figure 34:
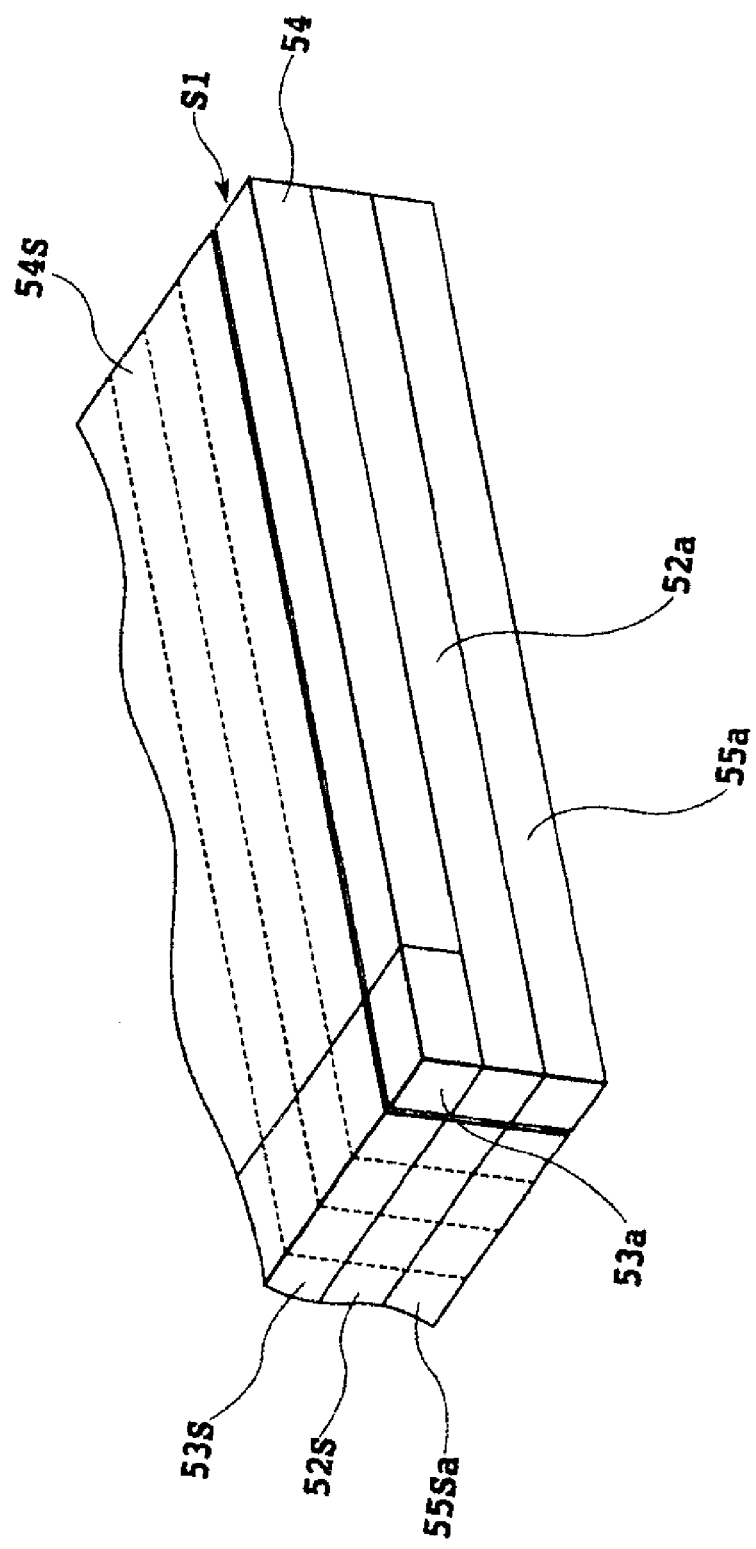
FIG. 34 is a perspective view illustrating a first lamination included in the absorption belt shown in FIG. 29.
Figure 35:
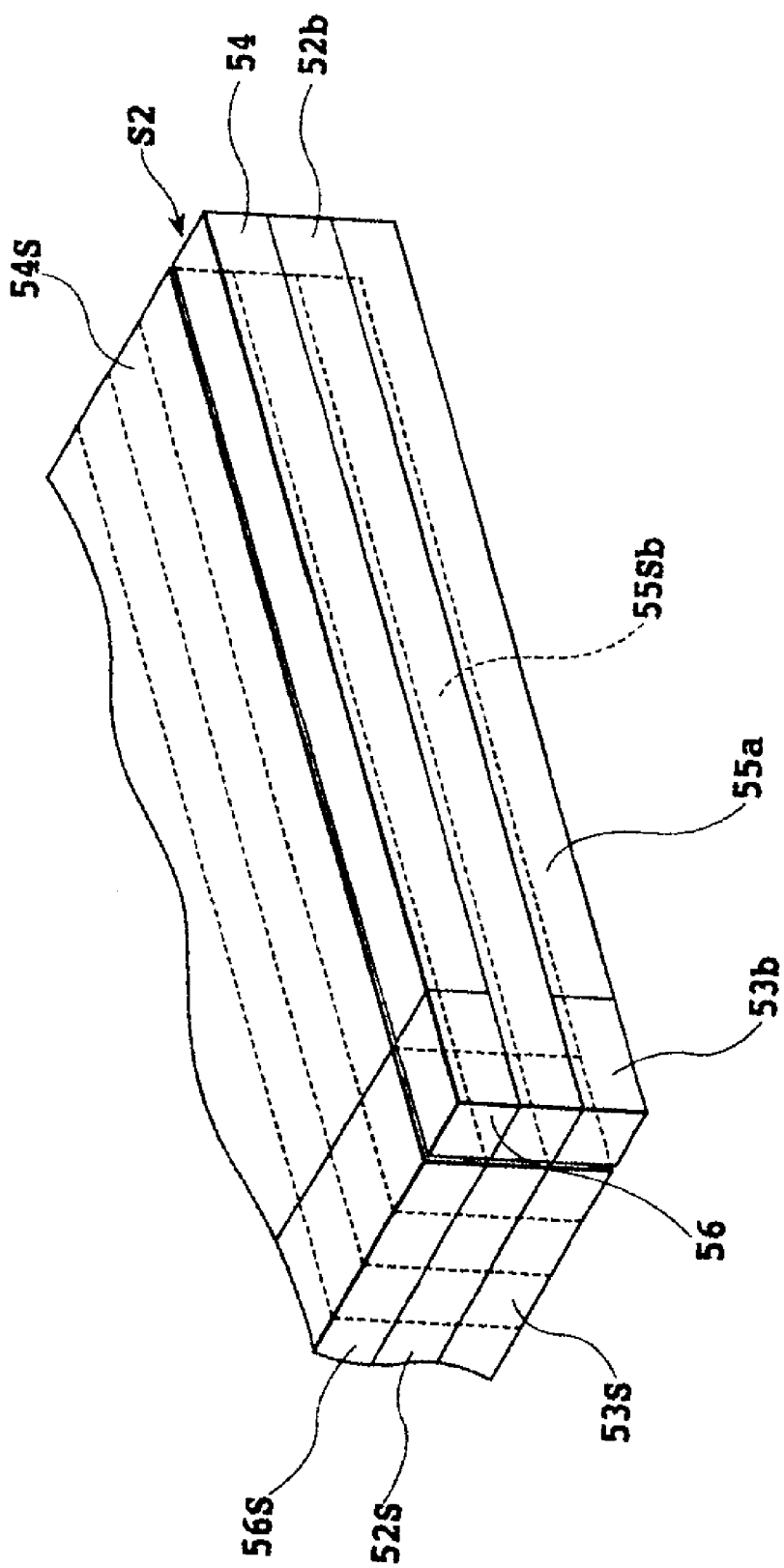
FIG. 35 is a perspective view illustrating a second lamination included in the absorption belt shown in FIG. 29.

When the sheets 51S through 56S having the predetermined dimensions and volume resistivities are made available, the manufacture of the first lamination SA shown in FIG. 34 and the second lamination SB shown in FIG. 35 can be started. The first lamination SA includes the positive electrode 52a, the positive feeding terminal layer 53a and the absorption layer 54, laid over the positive electrode 52a, and the under-electrode layer 55a, laid under the positive electrode 52a. Further, the second lamination SB includes the negative electrode 52b, the second insulating layer 56 and the absorption layer 54, laid over the negative electrode 52b, and the negative feeding terminal layer 53b and the under-electrode layer 55b, which are accumulated over the negative electrode 52b.

In forming the first lamination SA as is shown in FIG. 34, first the under-electrode sheet 55Sa, having the thickness of about 50 μm, full length of about 350 mm and the width of about 220 mm, are placed on the hot press (not shown), and then the electrode sheet 52S, having the thickness of about 50 μm, the full length of about 350 mm and the width of about 220 mm, is laid thereon. Next, to be laid on the electrode sheet 52S assuring accurate positional matching are the feeding terminal layer sheet 53S, having the thickness of about 50 μm, the full length of about 350 mm and the width of about 10 mm, and the absorption layer sheet 54S, having the thickness of about 50 μm, the full length of about 350 mm and the width of about 210 mm.

After placing the sheets 52S, 53S, 54S and 55Sa on the hot press, these sheets are thermally pressed by using the hot press so that each adjacent sheets among these sheets are temporarily fixed with each other. By so doing, a substantially 3-layer lamination of the sheets, having the thickness of about 150 μm, the full length of about 350 mm and the width of about 220 mm, can be formed. Then, a plurality of the above-mentioned first laminations SA, having the width of about 8 mm respectively, (39 pieces in the case of the present embodiment) are taken by being cut from the lamination.

In forming the second lamination SB as is shown in FIG. 35, first the feeding terminal layer sheet 53S, having the thickness of about 50 μm, the full length of about 350 mm and the width of about 10 mm, and the under-electrode layer sheet 55Sb, having the thickness of about 50 μm, the full length of about 350 mm and the width of about 210 mm, are placed on the hot press (not shown), assuring relative positional matching. Then, the electrode sheet 52S, having the thickness of about 50 μm, the full length of about 350 mm and the width of about 220 mm, is laid on the feeding terminal layer sheet 53S and the under-electrode layer sheet 55Sb. Further, to be laid on the electrode sheet 52S assuring the relative positional accuracy are the second insulating layer sheet 56S, having the thickness of about 50 μm, the full length of about 350 mm and the width of about 10 mm, and the absorption layer sheet 54S, having the thickness of about 50 μm, the full length of about 350 mm and the width of about 210 mm.

After placing the sheets 52S, 53S, 54S, 55S and 56S on the hot press, these sheets are thermally pressed so as to temporarily fix the adjacent sheets to each other. By so doing, a substantially 3-layer lamination of the sheets, having the thickness of about 150 μm, the full length of about 350 mm and the width of about 220 mm is formed. Then, a plurality (39 pieces in total in the case of the present embodiment) of above-mentioned second laminations SB, having the width of about 8 mm respectively, are taken by being cut form the lamination.

When the first lamination SA and the second lamination SB are formed according to the processes described in the foregoing, the first lamination SA and the second lamination SB are alternately fit in the openings 51a of the insulating layer sheet 51. In this embodiment, the first lamination SA and the second lamination SB are respectively fit in corresponding openings 51a so that the feeding terminal layers 53a and 53b are respectively arranged so as to alternatively come closer to one longitudinal edges of the insulating layer sheet 51. However, the first lamination SA is fit in the corresponding openings 51a so that the positive feeding terminal layer 53a comes to lie on one face (surface) of the insulating layer sheet 51S. On the other hand, the second lamination SB is fit in the openings 51a so that the negative feeding terminal layer 53b comes to lie on the other face (the back) of the insulating layer sheet 51S.

Figure 36:
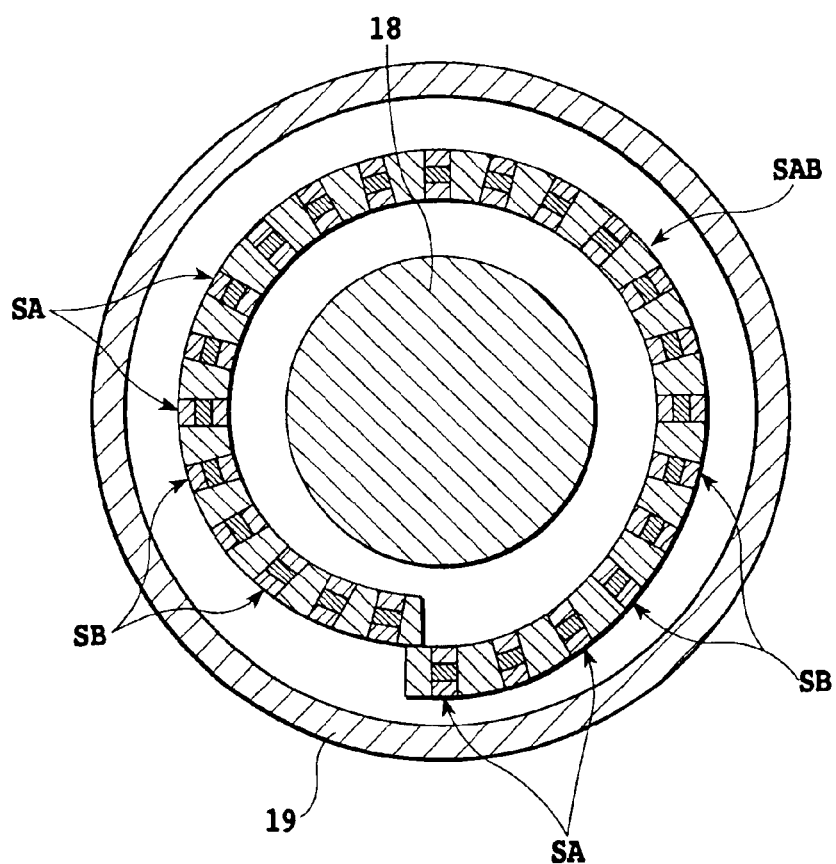
FIG. 36 is a sectional view illustrating a manufacturing process of the absorption belt shown in FIG. 29.

The insulating layer sheet 51S having the openings 51a, in which the first lamination SA and the second lamination SB are fit respectively in the manner described above, undergoes the hot press processing by the hot press, whereby the insulating layer sheet 51S, each of the first laminations SA and each of the second laminations SB are temporarily fixed to one another to obtain the sheet body SAB. Further, as shown in FIG. 36, the sheet body SAB undergoes the heating process and the cooling process together with the columnar member 18 and the cylindrical member 19. By so doing, the sheets 51S through 56S are joined with one another to form an endless body.

In the present embodiment, used for the columnar member 18 is a solid aluminum column having the diameter of 300.0 mm, the overall length of 300.0 mm and the thermal expansion coefficient of $2.4 \times 10^{-5}$ (/° C.). Further, the cylindrical member 19 has an inside diameter permitting the insertion of the columnar member 18. In the present embodiment, used for the cylindrical member 19 is a stainless steel cylindrical material having the inside diameter of 300.75 mm, the outside diameter of 320 mm, the overall length of 300 mm and the thermal expansion coefficient of $1.5 \times 10^{-5}$ (/° C.).

In this embodiment, in order for the sheets 51S through 56S to be securely and firmly joined with one another to form an endless body, the thermal expansion coefficient of the columnar member 18 (to be formed from the aluminum material in the case of the present embodiment) is set larger than the thermal expansion coefficient of the cylindrical member 19 (to be formed from the stainless steel in the case of the present embodiment). Further, a cylindrical member may be substituted for a solid columnar member, i.e., the columnar member 18.

Figure 7:
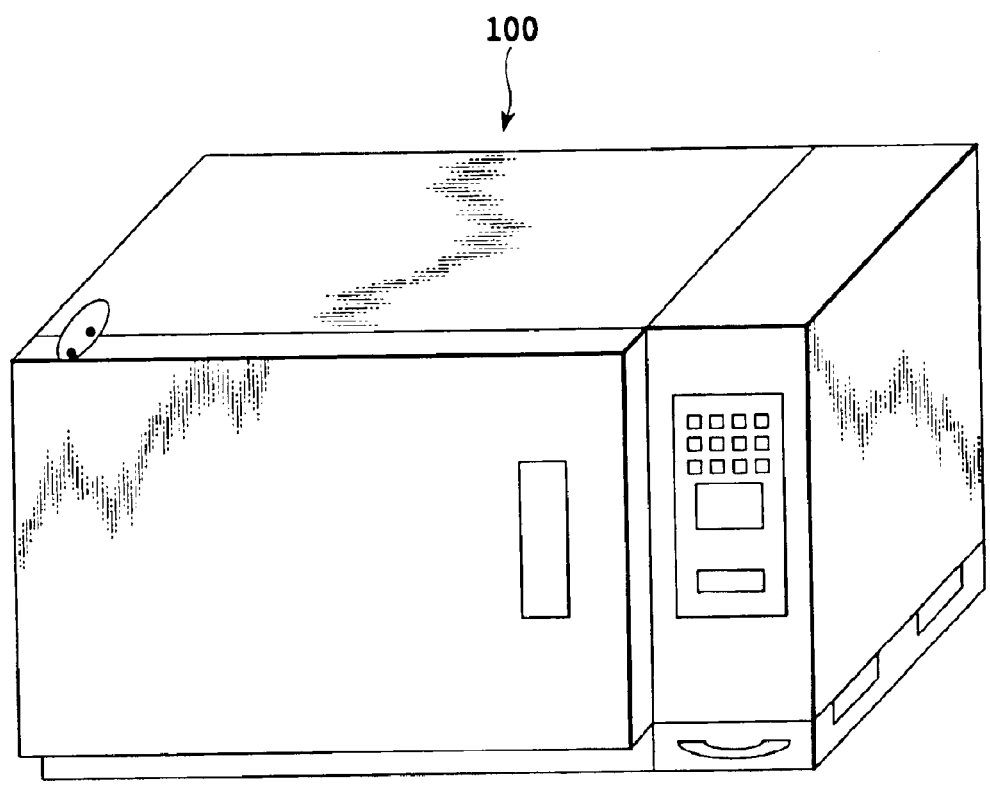
FIG. 7 is a perspective view of a heater used in producing the absorption belt shown in FIG. 3.

In this embodiment, as shown in FIG. 36, the sheet body SAB is wound (about once) on the outer circumferential surface of the columnar member 18 so that the end portions thereof overlap with each other. After winding the sheet body SAB on the columnar body 18, the columnar member 18 and the sheet body SAB wound thereon are substantially coaxially inserted into the cylindrical member 19. By so doing, as shown in FIG. 36, the sheet body SAB is covered by the cylindrical member 19. Later, the cylindrical member 19, the sheet body SAB and the columnar member 18 are placed in (or inserted into) a heating apparatus 100 (a heating furnace) as is shown in FIG. 7 to undergo the heating process.

Figure 37:
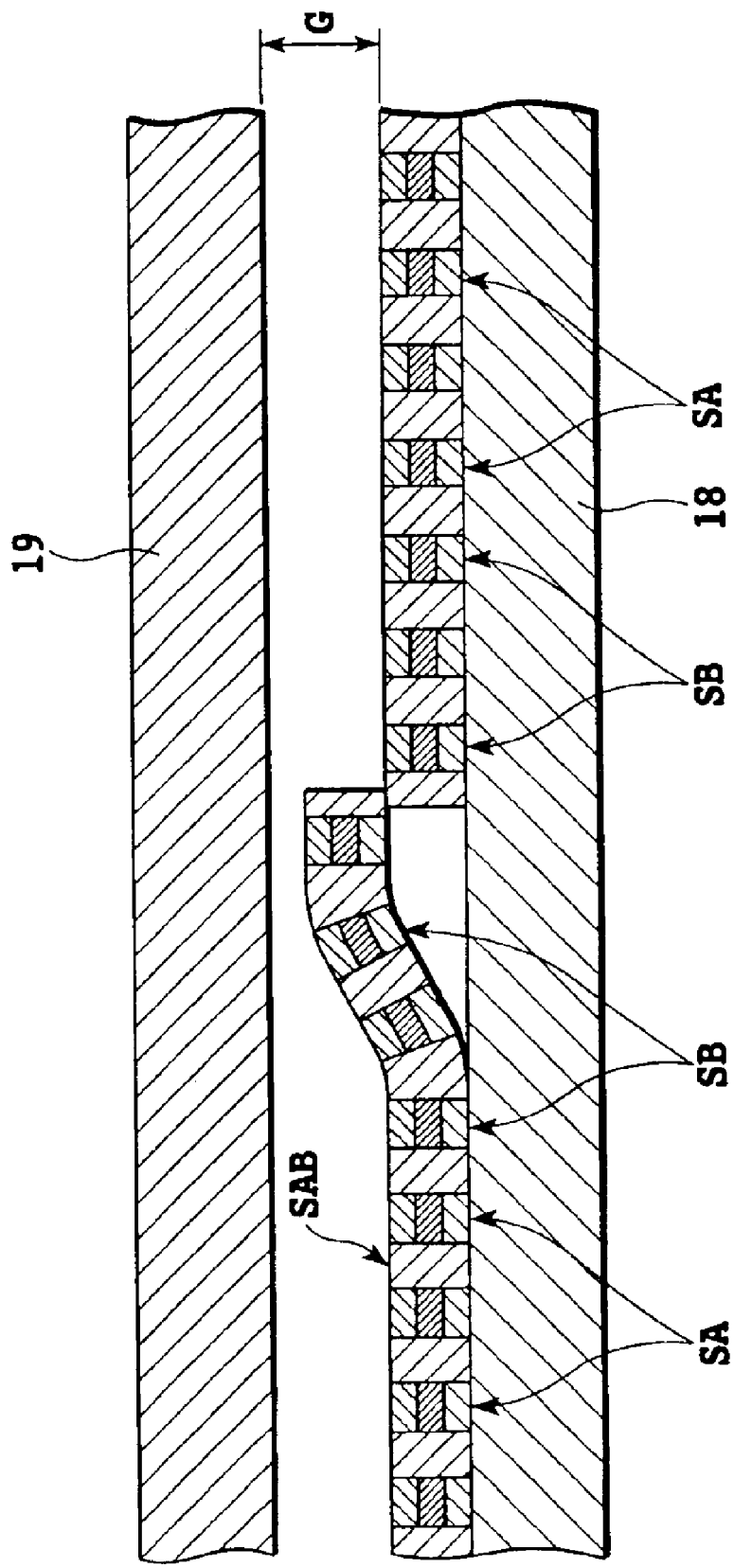
FIG. 37 is a sectional view illustrating a manufacturing process of the absorption belt shown in FIG. 29.
Figure 38:
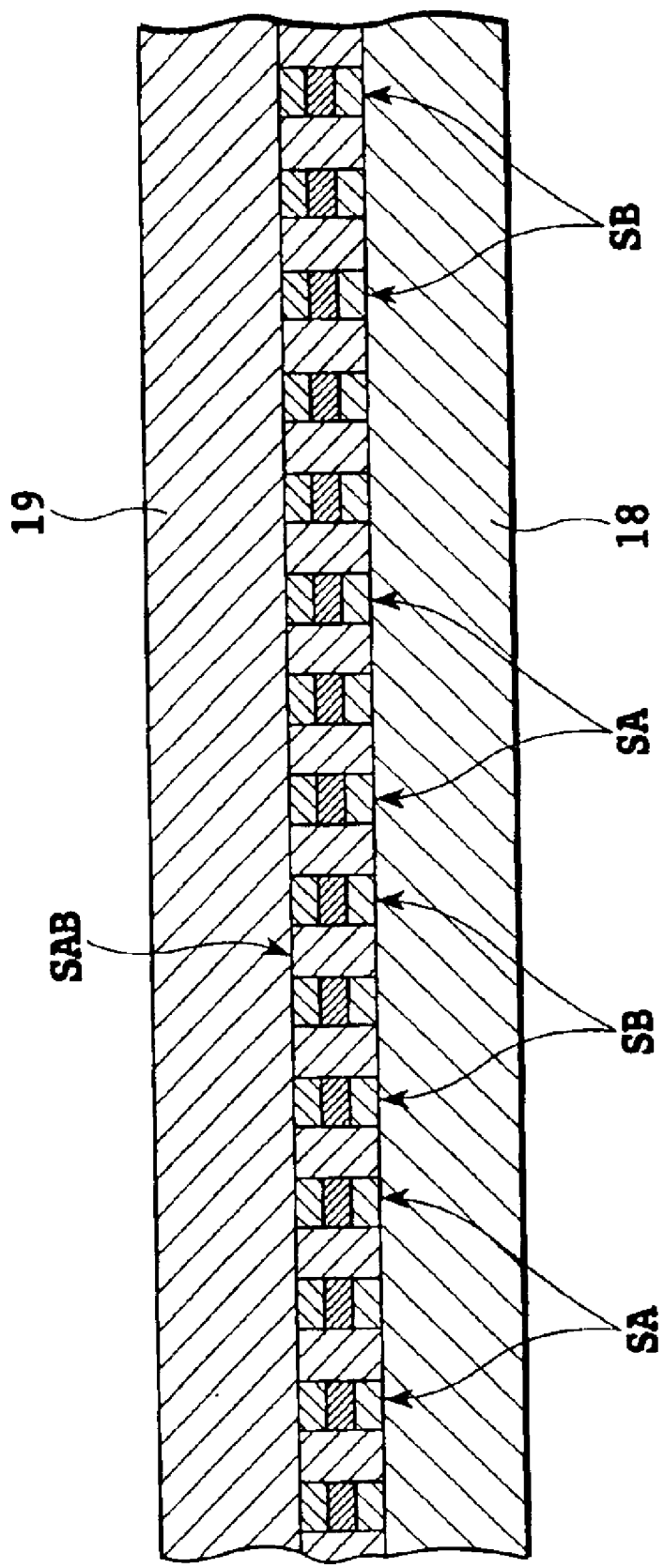
FIG. 38 is a sectional view illustrating a manufacturing process of the absorption belt shown in FIG. 29.

In the present embodiment, the heating temperature is set to 210±5° C., and the heating time is set to 60 min.±1 min. as the heading conditions. The heating time is set in consideration of the fusing temperature of the thermoplastic sheet and the thermal deterioration of the film. The condition of the sheet body SAB, when subjected to the heating process in the heating apparatus 100, varies as indicated in FIGS. 37 and 38. Further, for brevity, the conditions in FIGS. 37 and 38 are illustrated disregarding the curvatures of the columnar body 18, the sheet body SAB and the cylindrical member 19.

In the present embodiment, the sheet body SAB (the sheets 51S through 56S) is placed in the gap between the columnar member 18, as being a core member, and the cylindrical member 19 before being placed in the heating apparatus 100. Further, the initial gap G between the outer circumferential surface of the columnar member 18 and the inner circumferential surface of the cylindrical member 19 is set to about 375 μm . Under these conditions, when the heating in the heating apparatus 100 is started, the temperatures of the cylindrical member 19, the sheet body SAB (the sheets, 51S through 56S) and the columnar member 18 rise respectively.

By so doing, the columnar member 18 and the cylindrical member 19 start to expand according to their respective thermal expansion coefficients, and the sheet body SAB (sheets 51S through 56S) begin to soften as the temperature rises. In this case, as discussed previously, since the thermal expansion coefficient of the aluminum constituting the columnar member 18 is higher than the thermal expansion coefficient of the stainless steel constituting the cylindrical member 19, the columnar member 18 expands more than the cylindrical member 19. In consequence, as the heating time progresses the gap between the outer circumferential surface of the columnar member 18 and the inner circumferential surface of the cylindrical member 19 reduces gradually.

As the gap between the outer circumferential surface of the columnar member 18 and the inner circumferential surface of the cylindrical member 19 reduces with the progress of the heating process, the softening of the sheets 51S through 56S interposed between these two members also progresses. Further, as show in FIG. 38, as the softening of the sheets 51S through 56S progresses, the overlapped portions of the sheet body SAB is not only extended along the outer circumferential surface of the columnar member 18 but also fused to join with each other as the gap G reduces. Further, since the sheets 51S–56S are made from the same thermoplastic sheet, they can be fused to come into close contact with one another. In consequence, through this heating process the adjacent sheets among the sheets 51S–56S and the overlapped portions of the sheet body SAB (the overlapped portion of the sheets) can be joined with each other.

Further, in this case, the gap between the columnar member 18 and the cylindrical member 19 not only eventually become substantially equal to the thickness of the desired belt but also serves to eliminate the unevenness of the surface of the belt resulting from the overlapped portions of the sheets involved (FIG. 2). For this heating process the induction heating apparatus or the lamp heater type heating apparatus may be used as the substitutes for the heating apparatus 100.

When above-mentioned heating time (about 60 min.) has lapsed, the heating is stopped, and the cylindrical member 19, the integrated sheets 51S–56S, and the columnar member 19 undergo the cooling process. For the cooling process, the cylindrical member 19, the integrated sheets 51S–56S, and the columnar member 18 maybe left to the natural cooling, but, in the present embodiment, these members are immersed in the cooling medium 102 contained in the cooling tank 101 (shown in FIG. 10) for rapid cooling at the rate of 200° C./min. In this way, the cooling time can be reduced largely.

Later, the cylindrical member 19, the integrated sheets 51S–56S, and the columnar member 18 are taken out from the cooling tank 101, and, after having been left in the normal temperature (room temperature) for a predetermined period of time, the integrated sheets 51S–56S, i.e., the absorption belt 50, having the structure as is described in FIG. 29–FIG. 32, is taken outside. The endless absorption belt 50 obtained under the previously described manufacturing conditions is not only free of unevenness of the surface caused by the overlapped portions but also have the sheets 51S–56S joined securely and firmly. And, the thickness throughout the absorption belt 50 is uniformly about 150 μm (±10 μm at the overlapped portion).

With the above-mentioned manufacturing process according to the present embodiment, wherein the full width (of the belt) can easily be reduced, the absorption belt 50 can be manufactured at low cost, with ease and efficiently. In other words, in the absorption belt 50 according to the fourth embodiment, the positive and the negative feeding terminal layers 53a and 53b, which are connected to a plurality of electrodes 52a and 52b, and arranged alternately with respect to the insulating layer 51, are positioned on the side of one of the longitudinal edges of the belt; the positive feeding terminal layers 53a extend towards the absorption surface 50a; the negative feeding terminal layers 53b extend towards the back 50b of the absorption surface 50a. By so doing, the positive feeding terminal layers 53a for applying the positive voltage and the negative feeding terminal layers 53b for applying the negative voltage are separated for upside and for downside (along the direction of the thickness of the belt) for the insulation by the insulating layer 51 or the like, thereby making it unnecessary to separate the positive feeding terminal for applying the positive voltage and the negative feeding terminal for applying the negative voltage in vertical direction (or in the direction of thickness) of the belt as is required in the case of the conventional absorption belt. In consequence, the width of the absorption belt 50 can be reduced easily.

More specifically, in the case of the conventional absorption belt in which the positive feeding terminal and the negative feeding terminal are separated in the direction of the belt width, in order to obtain the effective attractive area of 210 mm wide (or in order to adopt the absorption layer 54 having the full length of 210 mm), it is necessary for the belt to have the width of at least 240 mm or so. In contrast, in the case of the absorption belt 50 according to the present embodiment, the width thereof can be trimmed to about 230 mm after having been taken out from the gap between the columnar member 18 and the cylindrical member 19. In this way, the full width of the belt can be reduced easily by the width indicated with an alternate long and two dashes line in FIG. 28.

Further, since the ink jet printing apparatus 1A according to the fourth embodiment is provided with the absorption belt 50, whose width can easily be reduced, as discussed previously, not only the feed rollers 17x for making the electrical contact with the individual positive feeding terminal layers 53a can be arranged on the surface side of the belt but also the feed rollers 17y for making the electrical contact with the individual negative feeding terminal layers can be arranged on the back side (of the belt). In this way, it becomes possible to make the ink jet printing apparatus 1A itself more compact.

Further, that the feed rollers 17x, for making the contact with the feeding terminal layers 53a for applying the positive voltage, are arranged on the surface side of the belt, and, that the feed rollers 17y, for making the contact with the feeding terminal layers for applying the negative voltage, are arranged on the back side of the belt, enable the distance from the power source to be optimized, the required length of wire to be reduced and the consumption of the resources to be reduced. Further, using the absorption belt 50 according to the present embodiment as a transfer means for the printing medium P contributes to the improvement in the maintenance process of the ink jet printing apparatus 1A.

Further, in the case of the absorption belt 50 according to the fourth embodiment, the absorption layer 54, having a volume resistivity smaller than that of the insulating layer 51, is laid over a plurality of electrodes 52a and 52b, which arranged so that the positive electrode and the negative electrode come alternately against the insulating layer 51, while the under-electrode layers 55a and 55b whose volume resistivities are smaller than that of the insulating layer 51 but larger than that of the absorption layer 54, are laid under the individual electrodes, 52a and 52b. Thus, similarly to the case of the absorption belt 40 according to the third embodiment, the present absorption belt 50 can exert the attractive force on the opposite side 50b thereof. Further, in the case of the absorption belt 50, the leakage current between two adjacent electrodes 52a and 52b having opposite polarities can be reduced, thereby contributing to suppression of the deterioration of the belt resulting from the leakage current and the increase in the power consumption while maintaining a good attracting ability.

Further, it is obvious that the structure of the present embodiment is also applicable to the cases of the absorption belts 20, 30 and 40 according to the first embodiment through the third embodiment; the structure according to the present embodiment is characterized by that the individual feeding terminals 53a and 53b are arranged on the side of one of the longitudinal sides of the belt, and, among the feeding terminal layers 53a and 53b, the positive feeding terminal layer 53a is extended towards either the surface or the back of the belt, while the negative feeding terminal layer 53b is extended towards unused edge side of the belt.

[A Variation of the Fourth Embodiment]

In this variation of the fourth embodiment, the conditions such as the dimensions and the volume resistivities of the insulating layer sheet 51S, the electrode sheet 52S, the feeding terminal layer sheet 53S, the absorption layer sheet 54S, the under-electrode layer sheets 55Sa and 55Sb, the second insulating layer sheet 56S, the columnar member 18 and the cylindrical member 19 are differentiated from those of the fourth embodiment to manufacture a variation of the original absorption belt according to the fourth embodiment. Used in the case of the present variation is a columnar member 18, made from a solid aluminum column and having the diameter of 200.0 mm, the full length of 280.0 mm and the thermal expansion coefficient of $2.4 \times 10^{-5}$ (/° C.). Further, used for a cylindrical member 19 is a stainless steel cylindrical member having the internal diameter of 200.75 mm, the outside diameter of 220 mm, the full length of 280 mm and the thermal expansion coefficient of $1.5 \times 10^{-5}$ (/° C.).

Further, in the case of the present variation, the insulating layer sheet 51S is about 150 μm thick, about 631 mm in full length (the length in the longitudinal direction of the belt), 240 mm wide (the length orthogonal to the longitudinal direction of he belt) and has a volume resistivity ($R_{51}$) of $1.0 \times 10^{15}$ Ω·cm. Further, the insulating layer sheet 51S is provided with 70 oblong openings, extending towards the direction of the width thereof. Each of the openings 51a is about 6 mm wide (the length in the longitudinal direction of the belt) and about 220 mm in full length, and the distance between the adjacent openings 51a is set to about 3 mm.

In this variation, in forming the first lamination SA, an under-electrode sheet, having the thickness of about 50 μm, the full length of about 350 mm, the width of about 220 mm and the volume resistivity of $1.0 \times 10^{14}$ Ω·cm is set on a hot press (not shown). Then, laid over the under-electrode layer sheet 55Sa is an electrode sheet 52S having the thickness of about 50 μm, the full length of about 350 mm, the width of about 220 mm and the volume resistivity of $1.0 \times 10^{2}$ Ω·cm. Next, laid over the electrode sheet 52S assuring relative positional accuracy are a feeding terminal sheet, having the thickness of about 50 μm, and the volume resistivity of $1.0 \times 10^{3}$ Ω·cm, the full length of about 350 mm, the width of about 10 mm, and a absorption layer sheet 54S, having the thickness of 50 μm, the full length of about 350 mm, the width of about 210 mm and the volume resistivity of $1.0 \times 10^{11}$ Ω·cm. In other words, in the case of this variation, an electrode sheet whose volume resistivity is higher to some extent than that of the feeding terminal layer sheet 53S is adopted.

In the present variation, after placing the sheets 52S, 53S, 54S and 55S on a hot press, these sheets are thermally pressed to temporarily fix the adjacent sheets to each other. Formed in this way is a substantially 3-layer sheet lamination having the thickness of about 150 μm, the full length of about 350 mm and the width of about 220 mm. Then, 35 pieces of the first lamination SA in total, each having the width of 6 mm, were taken by being cut from the sheet lamination.

In the present variation, in forming the second lamination SB as is shown in FIG. 35, the feeding terminal layer sheet 53S, having the thickness of about 50 μm, the full length of about 350 mm, the width of about 10 mm and the volume resistivity of $1.0 \times 10^{3}$ Ω·cm, and the under-electrode layer sheet, having the thickness of about 50 μm, the full length of about 350 mm, the width of about 210 mm and the volume resistivity of $1.0 \times 10^{14}$ Ω·cm, whose relative positional accuracy is assured, are placed on a hot press. Then, an electrode sheet 52S, having the thickness of about 50 μm, the full length of about 350 mm and the width of about 220 mm, is laid over the feeding terminal layer sheet 53S and the under-electrode layer sheet 55Sb. Further, laid over the electrode sheet 52S assuring relative positional accuracy are the second insulating layer sheet 56S, having the thickness of about 50 μm, the full length of about 350 mm, the width of about 10 mm and the volume resistivity of $1.0 \times 10^{14}$ Ω·cm, and the absorption layer sheet 54S, having the thickness of about 50 μm, the full length of about 350 mm, the width of about 210 mm and the volume resistivity of $1.0 \times 10^{11}$ Ω·cm.

In the present variation, after placing the sheets 52S, 53S, 54S, 55S and 56S on a hot press, these sheets are thermally pressed to temporarily fix the adjacent sheets to each other. In this way, a substantially 3-layer sheet lamination having the thickness of about 150 μm, the full length of about 350 mm and the width of about 220 mm is formed. Then, 35 pieces of the second lamination SB in total, having the width of about 6 mm, were taken by being cut form the lamination.

Then, the absorption belt according to the present variation was manufactured by the manufacturing process including the heating process and the cooling process. In the present absorption belt, similarly to the previously mentioned case, good mechanical characteristics such as the freedom from the unevenness of the thickness were obtained, so that the absorption belt according to the present variation can also contribute to the further compactness of the ink jet printing apparatus.

Further, in the present variation too, a good result for the practical use can be obtained when the volume resistivities of the absorption layer 54 to be laid over the electrodes 52a and 52b, is within the range of $1.0 \times 10^{8}$ Ω·cm–$1.0 \times 10^{12}$ Ω·cm; the volume resistivity of the of the under-electrode layers 55a and 55b, to be laid under the electrodes 52a and 52b, is within the range of $1.0 \times 10^{10}$ Ω·cm–$1.0 \times 10^{14}$ Ω·cm; and the volume resistivity of the insulating layer 51 is $1.0 \times 10^{13}$ Ω·cm or more. Further, the volume resistivities of the positive and the negative feeding terminal layers 53a and 53b are sufficient when being approximate to the volume resistivities of the electrodes 52a and 52b and are permissible when either being larger or smaller. Further, the volume resistivity of the second insulating layer 56 produces a good result in practical application as long as satisfying the condition that $R_{51} \geq R_{56}$.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An absorption belt capable of absorbing an object, comprising:

a base layer;

an insulating layer on said base layer;

a plurality of electrodes embedded alternately with positive and negative in said insulating layer; and a plurality of layers for covering each of said electrodes, at least two of said layers having different volume resistivities, said plurality of layers including a first layer directly covering said plurality of electrodes and said insulating layer and a second layer disposed above said first layer, said second layer having a volume resistivity Ra2 smaller than a volume resistivity Ra1 of said first layer, a volume resistivity of a resin which is a main ingredient of said second layer before a control of resistance being $1.0 \times 10^{16}$ Ω·cm or less, wherein a surface of each of said plurality of electrodes, which faces in a direction of a thickness of said absorption belt, is in contact with said first layer or said base layer, a surface of each of said plurality of electrodes, which faces in a direction perpendicular to the direction of the thickness of said absorption belt, is in contact with said insulating layer, said plurality of electrodes and said insulating layer are arranged alternately with each other in the direction perpendicular to the direction of the thickness of said absorption belt, and respective volume resistivities of said insulating layer and said base layer are larger than that of said first layer.

2. An absorption belt capable of absorbing an object, comprising:

a base layer;

an insulating layer on said base layer;

a plurality of electrodes embedded alternately with positive and negative in said insulating layer; and a plurality of layers for covering each of said electrodes, at least two of said layers having different volume resistivities and including a first layer directly covering said plurality of electrodes and said insulating layer and a second layer disposed above said first layer, said second layer having a volume resistivity Ra2 smaller than a volume resistivity Ra1 of said first layer, an uppermost layer of said layers including a fluoride resin.

3. The absorption belt according to claim 1, wherein said volume resistivity Ra1 of said first layer directly disposed on each of said electrodes is within the range of $1.0\times10^{11}$ Ω·cm–$1.0\times10^{14}$ Ω·cm, and said volume resistivity Ra2 of said second layer disposed above said first layer is within the range of $1.0\times10^{8}$ Ω·cm–$1.0\times10^{12}$ Ω·cm, and wherein said volume resistivity Ra1 is larger than said volume resistivity Ra2 (Ra1>Ra2).

4. The absorption belt according to claim 2, wherein said volume resistivity Ra1 of said first layer directly disposed on each of said electrodes is within the range of $1.0\times10^{11}$ Ω·cm–$1.0\times10^{14}$ Ω·cm, and said volume resistivity Ra2 of said second layer disposed above said first layer is within the range of $1.0\times10^{8}$ Ω·cm–$1.0\times10^{12}$ Ω·cm, and wherein said volume resistivity Ra1 is larger than said volume resistivity Ra2 (Ra1>Ra2).

5. The absorption belt according to claim 3, wherein a volume resistivity Ri of said insulating layer positioned between said electrodes is $1.0\times10^{13}$ Ω·cm or more, and a volume resistivity Rb of said base layer is within the range of $1.0\times10^{11}$ Ω·cm–$1.0\times10^{13}$ Ω·cm, and wherein the relationship that Ri≧Rb>Ra1>Ra2 is satisfied.

6. The absorption belt according to claim 4, wherein a volume resistivity Ri of said insulating layer positioned between said electrodes is $1.0\times10^{13}$ Ω·cm or more, and a volume resistivity Rb of said base layer is within the range of $1.0\times10^{11}$ Ω·cm–$1.0\times10^{13}$ Ω·cm, and wherein the relationship that Ri≧Rb>Ra1>Ra2 is satisfied.

7. A method for producing an absorption belt capable of absorbing an object, comprising the steps of:

(a) winding a base layer sheet on a core member so that the both ends of said base layer sheet overlap with each other;

(b) providing an insulating layer sheet having a plurality of openings;

(c) winding said insulating layer sheet on said base layer sheet;

(d) disposing an electrode sheet with respect to each of said openings of said insulating layer sheet, so that a surface of said electrode sheet, which faces in a direction perpendicular to a direction of the thickness of said insulating layer sheet, is in contact with said insulating layer sheet;

(e) winding a first sheet for an absorption layer on said insulating layer sheet so that the both ends of said first sheet overlap with each other and each electrode sheet is covered with said first sheet;

(f) winding a second sheet for said absorption layer on said first sheet so that the both ends of said second sheet overlap with each other, said second sheet having a volume resistivity Ra2 smaller than a volume resistivity Ra1 of said first sheet, a volume resistivity of a resin which is a main ingredient of said second sheet before a control of resistance begin $1.0\times10^{16}$ Ω·cm or less;

(g) covering a circumferential surface of said second sheet with a cylindrical member; and (h) thermally joining adjacent sheets and said overlapped portions, wherein respective volume resistivities of said insulating layer sheet and said base layer sheet are larger than that of said first sheet.

8. A method for producing an absorption belt capable of absorbing an object, comprising the steps of:

(a) winding a base layer sheet on a core member so that the both ends of said base layer sheet overlap with each other;

(b) providing an insulating layer sheet having a plurality of openings;

(c) winding said insulating layer sheet on said base layer sheet;

(d) disposing an electrode sheet with respect to each of said openings of said insulating layer sheet, so that a surface of said electrode sheet, which faces in a direction perpendicular to a direction of the thickness of said insulating layer sheet, is in contact with said insulating layer sheet;

(e) winding first sheet for an absorption layer on said insulating layer sheet so that the both ends of said first sheet overlap with each other and each electrode sheet is covered with said first sheet;

(f) winding a second sheet for said absorption layer on said first sheet so that the both ends of said second sheet overlap with each other, said second sheet having a volume resistivity Ra2 smaller than a volume resistivity Ra1 of said first sheet, said second sheet including a fluoride resin;

(g) covering a circumferential surface of said second sheet with a cylindrical member; and (h) thermally joining adjacent sheets and said overlapped portions, wherein respective volume resistivities of said insulating layer sheet and said base layer sheet are larger than that of said first sheet.

9. A method for producing an absorption belt capable of absorbing an object, comprising the steps of:

(a) winding a base layer sheet on a core member so that the both ends of said base layer sheet overlap with each other;

(b) providing an insulating layer sheet having a plurality of openings;

(c) winding said insulating layer sheet on said base layer;

(d) disposing an electrode sheet with respect to each of said openings of said insulating layer sheet, so that a surface of said electrode sheet, which faces in a direction perpendicular to a direction of the thickness of said insulating layer sheet, is in contact with said insulating layer sheet;

(e) winding first sheet for an absorption layer on said insulating layer sheet so that the both ends of said first sheet overlap with each other and each electrode sheet is covered with said first sheet;

(f) winding second sheet for said absorption layer on said first sheet so that the both ends of said second sheet overlap with each other, said second sheet having a volume resistivity Ra2 smaller than a volume resistivity Ra1 of said first sheet;

(g) covering a circumferential surface of said second sheet with a cylindrical member; and (h) thermally joining adjacent sheets and said overlapped portions, wherein respective volume resistivities of said insulating layer sheet and said base layer are larger than that of said first sheet.

10. The method according to claim 9, wherein the relationship that $Ri \geq Rb > Ra1 > Ra2$ is satisfied where Ri is a volume resistivity of said insulating layer sheet and Rb is a volume resistivity of said base layer sheet.

11. An absorption belt having an absorption surface and capable of absorbing an object on said absorption surface, comprising:

an insulating layer;

a plurality of electrodes embedded alternately with positive and negative in said insulating layer at a predetermined interval; and an absorption layer disposed on each of said electrodes and having a volume resistivity different from a volume resistivity of said insulating layer;

wherein a surface of each of said plurality of electrodes, which faces in a direction of a thickness of said absorption belt, is in contact with said absorption layer or said base layer, a surface of each of said plurality of electrodes, which faces in a direction perpendicular to the direction of the thickness of said absorption belt, is in contact with said insulating layer, said plurality of electrodes and said insulating layer are arranged alternately with each other in the direction perpendicular to the direction of the thickness of said absorption belt, and respective volume resistivities of said insulating layer and said base layer are larger than that of said absorption layer.

12. The absorption belt according to claim 11, wherein said volume resistivity of said absorption layer is smaller that of said insulating layer.

13. The absorption belt according to claim 11, wherein said volume resistivity of said absorption layer is within the range of $1.0 \times 10^8$ Ω·cm–$1.0 \times 10^{14}$ Ω·cm, and wherein said volume resistivity of said insulating layer is $1.10 \times 10^{13}$ Ω·cm, and wherein said volume resistivity of said insulating layer is $1.0 \times 10^{13}$ Ω·cm or more.

14. An image forming apparatus for forming an image on a printing medium, comprising the absorption belt according to claim 11 as a means for transferring said printing medium.

15. A method for producing an absorption belt capable of absorbing an object, comprising the steps of:

(a) winding a base layer sheet on a core member so that the both ends of said base layer sheet overlap with each other;

(b) providing an insulating layer sheet having a plurality of openings;

(c) winding said insulating layer sheet on said base layer sheet;

(d) disposing an electrode sheet with respect to each of said openings of said insulating layer sheet, so that a surface of said electrode sheet, which faces in a direction perpendicular to a direction of the thickness of said insulating layer sheet, is in contact with said insulating layer sheet;

(e) disposing absorption layer sheet for covering each electrode sheet with respect to each of said openings of said insulating layer sheet;

(f) covering a circumferential surface of said insulation layer sheet with a cylindrical member; and (g) thermally joining adjacent sheets and said overlapped portions, wherein respective volume resistivities of said insulating layer sheet and said base layer sheet are larger than that of said first sheet.

16. The method according to claim 15, wherein the relation that $Ri \geq Rb > Ra$ is satisfied where Rb is a volume resistivity of said base layer sheet, Ri is a volume resistivity of said insulating layer sheet and Ra is a volume resistivity of said absorption layer sheet.

17. An absorption belt having an absorption surface and capable of absorbing an object on said absorption surface, comprising:

an insulating layer;

a plurality of electrodes embedded alternately with positive and negative in said insulating layer at a predetermined interval; and an absorption layer disposed on each of said electrodes and having a volume resistivity smaller than a volume resistivity of said insulating layer; and an under-electrode layer disposed under each of said electrodes and having a volume resistivity smaller than that of said insulating layer but larger than that of said absorption layer;

wherein said insulating layer and said absorption layer appear alternately on said absorption layer, and wherein said insulating layer and said under-electrode layer appear alternately on the opposite surface of said absorption surface, and wherein a surface of each of said plurality of electrodes, which faces in a direction of a thickness of said absorption belt, is in contact with said absorption layer or said base layer, a surface of each of said plurality of electrodes, which faces in a direction perpendicular to the direction of the thickness of said absorption belt, is in contact with said insulating layer, said plurality of electrodes and said insulating layer are arranged alternately with each other in the direction perpendicular to the direction of the thickness of said absorption belt, and respective volume resistivities of said insulating layer and said base layer are larger than that of said absorption layer.

18. The absorption belt according to claim 17, wherein said volume resistivity of said absorption layer is within the range of $1.0 \times 10^8$ Ω·cm–$1.0 \times 10^{12}$ Ω·cm, said volume resistivity of said under-electrode layer is within the range of $1.0 \times 10^{10}$ Ω·cm–$1.0 \times 10^{14}$ Ω·cm, and said volume resistivity of said insulating layer is $1.0 \times 10^{13}$ Ω·cm or more.

19. An image forming apparatus for forming an image on a printing medium, comprising the absorption belt according to claim 17 as a means for transferring said printing medium.

20. A method for producing an absorption belt capable of absorbing an object, comprising the steps of:

(a) providing an insulating layer sheet having a plurality of openings and disposing an under-electrode layer sheet, an electrode sheet and an absorption layer sheet in each of said openings of said insulating layer sheet in turn;

(b) temporarily fixing adjacent sheets to each other;

(c) winding said insulating layer sheet on a core member so that the both ends of said insulating layer sheet overlap with each other;

(d) covering a circumferential surface of said insulating layer sheet with a cylindrical member; and (e) thermally joining adjacent sheets and said overlapped portion, wherein a surface of said electrode sheet, which faces in a direction of a thickness said absorption belt, is in contact with said absorption layer sheet or a base layer sheet, a surface of said electrode sheet, which faces in a direction perpendicular to the direction of the thickness of said absorption belt, is in contact with said insulating layer sheet, said electrode sheet and said insulating layer sheet are arranged alternately with each other in the direction perpendicular to the direction of the thickness of said absorption belt, and respective volume resistivities of said insulating layer sheet and said base layer sheet are larger than that of said absorption layer sheet.

21. The method according to claim 20, wherein said volume resistivities of said sheets are selected so that the relationship that $Ri \geq R1 > Ra > Re$ is satisfied where Ri is a volume resistivity of said insulating layer sheet, R1 is a volume resistivity of said under-electrode layer sheet, Re is a volume resistivity of said electrode sheet, Ra is a volume resistivity of said absorption layer sheet.

22. An absorption belt capable of absorbing an object, comprising:

an insulating layer;

a plurality of electrodes arranged alternately with positive and negative with respect to said insulating layer; and a plurality of terminals, each of said feeding terminals connected with each of said electrodes and disposed on the side of said belt, said terminals for feeding positive voltage to the electrode exposed outside one of a first surface, to which the object is absorbed, and a second surface opposite to the first surface, said terminals for feeding negative voltage to the electrode exposed outside of other of said first surface and second surface.

23. An image forming apparatus for forming an image on a printing medium, comprising the absorption belt according to claim 22 as a means for transferring said printing medium.

24. A method for producing an absorption belt capable of absorbing an object, comprising the steps of:

(a) forming a first lamination by laminating a first feeding terminal layer sheet and a first absorption layer sheet over a first electrode sheet and laminating a first under-electrode layer sheet under said first electrode sheet;

(b) forming a second lamination by laminating a second feeding terminal layer sheet and a second absorption layer sheet over a second electrode sheet and laminating a second under-electrode layer sheet under said second electrode sheet;

(c) providing an insulating layer sheet having a plurality of openings and alternately disposing said first lamination formed in step (a) and said second lamination formed in step (b) in said openings of said insulating layer sheet;

(d) winding said insulating layer sheet on a core member so that the both ends of said insulating layer sheet overlap with each other;

(e) covering a circumferential surface of said insulating layer sheet with a cylindrical member; and (f) thermally joining adjacent sheets and said overlapped portions, wherein a surface of said first electrode sheet, which faces in a direction of a thickness of said absorption belt, is in contact with said first absorption layer sheet or a base layer sheet, a surface of said second electrode sheet, which faces in the direction of a thickness of said absorption belt, is in contact with said second absorption layer sheet or a base layer sheet, respective surfaces of said first and second electrode sheets, which faces in a direction perpendicular to the direction of the thickness of said absorption belt, are contact with said insulating layer sheet, said first electrode sheet or said second electrode sheet and said insulating layer sheet are arranged alternately with each other in the direction perpendicular to the direction of the thickness of said absorption belt, and a volume resistivity of said insulating layer sheet is larger than that of said first and second absorption layer sheets.

25. An absorption belt capable of absorbing an object, comprising:

a base layer;

an insulating layer on said base layer;

a plurality of electrodes embedded alternately with positive and negative in said insulating layer; and a plurality of layers for directly covering each of said electrodes and said insulating layer, at least two of said layers having different volume resistivities, wherein a surface of each of said plurality of electrodes, which faces in a direction of a thickness of said absorption belt, is contact with one of said plurality of layers, a surface of each of said plurality of electrodes, which faces in a direction perpendicular to the direction of the thickness of said absorption belt, is in contact with said insulating layer, said plurality of electrodes and said insulating layer are arranged alternately with each other in the direction perpendicular to the direction of the thickness of said absorption belt, and a volume resistivity of said insulating layer is larger than that of said one of plurality of layers.

26. The absorption belt according to claim 25, wherein volume resistivities of said plurality of layers disposed on each of said electrodes are set to decrease in accordance with a distance from each of said electrodes.

* * * * *

UNITED STATES PATENT AND TRADEMARK OFFICE
CERTIFICATE OF CORRECTION

PATENT NO. : 7,007,943 B2
APPLICATION NO. : 10/670566
DATED : March 7, 2006
INVENTOR(S) : Osamu Kanome et al.

It is certified that error appears in the above-identified patent and that said Letters Patent is hereby corrected as shown below:

COVER PAGE AT ITEM [56] RC:
U.S. Patent Documents, "6,167,761 1/2001 Hanzazwa et al." should read
--6,164,761 12/2000 Numata--.

COVER PAGE AT ITEM [56] RC:
Foreign Patent Documents, "JP 52-58872 12/1982" should read
--JP 57-58872 12/1982--.

COLUMN 7:
Line 62, "of" should be deleted.

COLUMN 12:
Line 38, "there of" should read --thereof--.

COLUMN 25:
Line 16, "the" (1$^{st}$ occurrence) should be deleted.

COLUMN 27:
Line 64, "there by" should read --thereby--.

COLUMN 28:
Line 67, "a" should read --an--.

COLUMN 29:
Line 8, "it" should read --it is--.
Line 59, "the" should read --they--.

COLUMN 34:
Line 18, "heading" should read --heating--.

UNITED STATES PATENT AND TRADEMARK OFFICE
CERTIFICATE OF CORRECTION

PATENT NO. : 7,007,943 B2
APPLICATION NO. : 10/670566
DATED : March 7, 2006
INVENTOR(S) : Osamu Kanome et al.

It is certified that error appears in the above-identified patent and that said Letters Patent is hereby corrected as shown below:

COLUMN 41:
Line 45, "smaller" should read --smaller than--.
Line 51, "Ω·cm, and wherein said volume resistivity of said insulating" should read -- Ω·cm --.
Line 52, "layer is 1.0 x $10^{13}$ Ω·cm or more." should read --or more.--.

Signed and Sealed this

Twenty-eighth Day of November, 2006

JON W. DUDAS
*Director of the United States Patent and Trademark Office*